(12) United States Patent
Hatoh et al.

(10) Patent No.: US 7,611,786 B2
(45) Date of Patent: Nov. 3, 2009

(54) POLYMER ELECTROLYTE FUEL CELL POWER GENERATION SYSTEM

(75) Inventors: Kazuhito Hatoh, Osaka (JP); Hiroki Kusakabe, Sakai (JP); Shinsuke Takeguchi, Takatsuki (JP); Yasuhiro Seki, Moriguchi (JP)

(73) Assignee: Panasonic Corporation, Osaka (JP)

( * ) Notice: Subject to any disclaimer, the term of this patent is extended or adjusted under 35 U.S.C. 154(b) by 876 days.

(21) Appl. No.: 11/320,126

(22) Filed: Dec. 28, 2005

(65) Prior Publication Data

US 2006/0251943 A1    Nov. 9, 2006

(30) Foreign Application Priority Data

Dec. 28, 2004    (JP)    ............................. 2004-381510

(51) Int. Cl.
*H01M 8/04* (2006.01)
*H01M 8/10* (2006.01)
*H01M 8/24* (2006.01)

(52) U.S. Cl. .............................. 429/24; 429/25; 429/26; 429/32; 429/38

(58) Field of Classification Search ........................ None
See application file for complete search history.

(56) References Cited

U.S. PATENT DOCUMENTS 5,846,668 A    12/1998    Watanabe (Continued)

FOREIGN PATENT DOCUMENTS

JP    03-102774 A    4/1991

(Continued)

OTHER PUBLICATIONS

O.Yamazaki, et al., "Evaluation Study of PEFC using Single Cell at Osaka Gas", *The 8th FCDIC Fuel Cell Symposium Proceedings*, pp. 61-64, (2001).

*Primary Examiner*—Robert Hodge
(74) *Attorney, Agent, or Firm*—Panitch Schwarze Belisario & Nadel LLP

(57) ABSTRACT

A polymer electrolyte fuel cell power generation system is disclosed which comprises:

a fuel cell having a plurality of cells each having a polymer electrolyte membrane and an anode and cathode that are formed so as to sandwich the polymer electrolyte membrane therebetween, a fuel gas path formed so as to guide fuel gas from an inlet of the fuel gas to the anode of each cell and discharge the fuel gas to the outside therefrom, an oxidizing gas path formed so as to guide oxidizing gas from an inlet of the oxidizing gas to the cathode of each cell and discharge the oxidizing gas to the outside therefrom, and a cooling fluid path formed so as to guide a cooling fluid from an inlet of the cooling fluid to a cooling fluid supply manifold and then to a region opposite to power generation regions constituted by the anodes and cathodes of the plurality of cells and discharge the cooling fluid to the outside therefrom through an outlet of the cooling fluid, the fuel cell being configured to generate electric power accompanied with heat generation by a reaction between the fuel gas and the oxidizing gas within the power generation regions;

a fuel gas supply apparatus for feeding the fuel gas to the inlet of the fuel gas of the fuel cell;

an oxidizing gas supply apparatus for feeding the oxidizing gas to the inlet of the oxidizing gas of the fuel cell;

a cooling fluid supply system for causing the cooling fluid to flow through the cooling fluid path of the fuel cell, thereby cooling the fuel cell; and a control unit, wherein the control unit controls, during the power generation, the temperature of the cooling fluid at the inlet of the cooling fluid 401 though the cooling fluid supply system so as to satisfy $T1 \geq T2+1°$ C. where T1 is a corresponding dew-point temperature of at least either the fuel gas or oxidizing gas at the inlet thereof and T2 is the temperature of the cooling fluid at the inlet of the cooling fluid 401.

25 Claims, 30 Drawing Sheets

U.S. PATENT DOCUMENTS 6,329,090 B1 * 12/2001 McElroy et al. ............... 429/13
2004/0126634 A1     7/2004 Hatoh et al.

FOREIGN PATENT DOCUMENTS

| | | |
|---|---|---|
| JP | 06-096789 | 4/1994 |
| JP | 06-132038 | 5/1994 |
| JP | 2000-113899 | 4/2000 |
| JP | 2000-251913 | 9/2000 |
| JP | 2002-343395 | 11/2002 |
| JP | 2003-17105 | 1/2003 |
| JP | 2003-017105 | 1/2003 |
| JP | 2004-031073 | 1/2004 |
| JP | 2004-185938 | 7/2004 |
| JP | 3596332 | 9/2004 |
| WO | 00/65678 | 11/2000 |
| WO | 02/47190 | 6/2002 |

\* cited by examiner

| MEASUREMENT EXAMPLE | CURRENT DENSITY | X | | Y | |
|---|---|---|---|---|---|
| | | CATHODE | ANODE | CATHODE | ANODE |
| MEASUREMENT EXAMPLE SHOWN IN FIG. 11 | 0.160 | 1.0 | 2.0 | 0.020 | 0.020 |
| MEASUREMENT EXAMPLE SHOWN IN FIG. 20 | 0.160 | 1.5 | 2.5 | 0.027 | 0.023 |

Fig. 27

| MEASUREMENT EXAMPLE | CURRENT DENSITY | X | | Y | |
|---|---|---|---|---|---|
| | | CATHODE | ANODE | CATHODE | ANODE |
| MEASUREMENT EXAMPLE SHOWN IN FIG. 12 | 0.180 | 2.8 | 3.8 | 0.020 | 0.025 |
| MEASUREMENT EXAMPLE SHOWN IN FIG. 21 | 0.300 | 3.3 | 4.1 | 0.013 | 0.013 |
| MEASUREMENT EXAMPLE SHOWN IN FIG. 22 | 0.250 | 3.1 | 3.8 | 0.015 | 0.015 |
| MEASUREMENT EXAMPLE SHOWN IN FIG. 23 | 0.160 | 2.9 | 3.7 | 0.022 | 0.0185 |
| MEASUREMENT EXAMPLE SHOWN IN FIG. 24 | 0.116 | 2.9 | 3.9 | 0.033 | 0.022 |
| MEASUREMENT EXAMPLE SHOWN IN FIG. 25 | 0.078 | 3.0 | 4.2 | 0.031 | 0.030 |
| MEASUREMENT EXAMPLE SHOWN IN FIG. 26 | 0.050 | 2.8 | 3.9 | 0.028 | 0.028 |

Fig. 28

POLYMER ELECTROLYTE FUEL CELL POWER GENERATION SYSTEM

BACKGROUND OF THE INVENTION

The present invention relates to a fuel cell power generation system for use in a portable power source, electric car power source, cogeneration system etc. and more particularly relates to a fuel cell power generation system using polymer electrolyte membranes.

As a typical example of fuel cells, polymer electrolyte fuel cells are known. In a known polymer electrolyte fuel cell, an anode and a cathode are formed so as to sandwich a polymer electrolyte membrane therebetween, and the anode and the cathode are respectively supplied with fuel gas containing hydrogen and oxidizing gas containing oxygen such as air (hereinafter, the fuel gas and oxidizing gas are sometimes collectively referred to as "reactive gas"). While hydrogen ions are created, in the anode, through the liberation of electrons from the hydrogen atoms contained in the fuel gas caused by the electrode reaction, these electrons reach the cathode after passing through the external circuit (load). Meanwhile, the hydrogen ions reach the cathode after passing through the polymer electrolyte membrane. In the cathode, the hydrogen ions, the electrons and the oxygen contained in the oxidizing gas are combined, thereby producing water. During this reaction, electric power and heat are generated at the same time.

As the polymer electrolyte membrane, a perfluorocarbon sulfonic acid material is used. Since this polymer electrolyte membrane elicits ion conductivity when it contains moisture, the reactive gas is usually humidified and then supplied to the fuel cell.

Excessive humidification of the reactive gas may, on one hand, cause flooding because water is generated in the cathode. On the other hand, it is desirable to supply the reactive gas that has been humidified so as to have a relative moisture of 100%, because the ion conductivity of the polymer electrolyte membrane needs to be increased in order to improve the performance of the fuel cell. In addition, it has been found that if the reactive gas having a dew point equal to or lower than the operative temperature of the fuel cell, the electrolyte made of perfluorocarbon sulfonic acid decomposes so that fluoride ions liquate out from the polymer electrolyte membrane, resulting in degradation of the polymer electrolyte membrane.

With the intention of increasing the service life of the fuel cell by inhibiting the degradation of the polymer electrolyte membrane, there have been made several attempts to perform the so-called "full humidification operation" in which the fuel cell is supplied with the reactive gas having the dew point equal to cell temperature, while preventing the flooding (e.g. The 8$^{th}$ FCDIC Fuel Cell Symposium Proceedings (pp 61-64) (hereinafter referred as nonpatent literature 1) (see the operating conditions stated in the captions of FIGS. 3, 4)).

Another known fuel cell system is such that the degradation of the polymer electrolyte membrane and flooding are inhibited by providing the electric cells with gas passage and/or electrode configuration which varies from cell to cell and distributing reactive gas having the same degree of humidification etc. to the respective electric cells (e.g., Japanese Patent Gazette No. 3596332 (hereinafter referred as patent literature 1)).

BRIEF SUMMARY OF THE INVENTION

The technique disclosed in the above nonpatent literature 1 has not proved successful in satisfactorily inhibiting the degradation of the polymer electrolyte membrane nor in sufficiently improving the service life of the fuel cell.

The fuel cell system of the above patent literature 1 has revealed the problem that the need for providing the electric cells with gas passage and/or electrode configuration which varies from cell to cell brings about complicated configuration.

The invention is directed to overcoming the foregoing drawbacks and a primary object of the invention is therefore to provide a polymer electrolyte fuel cell power generation system having a polymer electrolyte fuel cell that is satisfactorily improved in service life by sufficiently inhibiting the degradation of the polymer electrolyte membrane of the polymer electrolyte fuel cell without providing the electric cells with gas passage or electrode configuration which varies from cell to cell.

To accomplish the above object, the inventors have intensively studied. Above all, they have recently attempted to prevent the degradation of electrolyte by operating the cell with gas having a dew point equal to cell temperature, particularly in tests conducted on stand-alone electric cells. In the case where an electric cell was used as a stand-alone cell, cell temperature was often kept to a constant value using a sheet-type heater and therefore it was difficult to evaluate the temperature distribution on the surface of the electric cell. In such a case, a test was made in a condition in which gas having a dew point of 80° C. was supplied to the cell whose temperature was kept to a constant temperature of e.g. 80° C. and the temperature of the gas was kept to about 85 to 90° C. that was slightly higher than the dew point. When conducting tests on a cell stack in which cell temperature is controlled by use of a cooling fluid, the inlet temperature and outlet temperature of the cooling fluid were set to, for instance, 80° C. and 85° C. respectively and gas having a dew point of 80° C. was supplied. In this case, the dew point of the electric cell rises toward the downstream side in its distribution on the ground that water is produced by electric power generation at the cathode side whereas hydrogen is consumed by the reaction at the anode side so that the total amount of gas flowing in the anode drops toward the outlet for the gas, as far as the flowing directions of the fluids in the flowing pattern of the cooling fluid and in the flowing pattern of the supplied gas are macroscopically the same even though the temperature of the cooling fluid is distributed so as to rise toward its outlet. For this reason, full humidification was thought to be possible over the entire area of the gas passage within the cells provided that full humidification is maintained at the inlet, unless the outlet temperature of the cooling fluid is made extremely high. However, the inventors have found the following fact after careful investigation on the temperature distribution of the inside of the cell stack. That is, the gas to be supplied to the stack is generally fed to the manifold once and then uniformly distributed from the manifold to the respective cells. While the gas is once being fed to the manifold and passing through the manifold, the gas exchanges heat with the electric cell within the manifold. By the time the gas is actually introduced into each cell, the temperature of the gas has already increased by about 1 to 2° C. and therefore, full humidification does not take place in the region immediately close to the area where the gas is introduced into the electrode of the gas passage. Incidentally, the meaning of "full humidification" will be later explained in the preferred embodiments.

According to the invention, there is provided a polymer electrolyte fuel cell power generation system comprising:

a fuel cell having a plurality of cells each having a polymer electrolyte membrane and an anode and cathode that are formed so as to sandwich the polymer electrolyte membrane therebetween, a fuel gas path formed so as to guide fuel gas from an inlet of the fuel gas to the anode of each cell and discharge the fuel gas to the outside therefrom, an oxidizing gas path formed so as to guide oxidizing gas from an inlet of the oxidizing gas to the cathode of each cell and discharge the oxidizing gas to the outside therefrom, and a cooling fluid path formed so as to guide a cooling fluid from an inlet of the cooling fluid to a cooling fluid supply manifold and then to a region opposite to power generation regions constituted by the anodes and cathodes of the plurality of cells and discharge the cooling fluid to the outside therefrom through an outlet of the cooling fluid, the fuel cell being configured to generate electric power accompanied with heat generation by a reaction between the fuel gas and the oxidizing gas within the power generation regions;

a fuel gas supply apparatus for feeding the fuel gas to the inlet of the fuel gas of the fuel cell;

an oxidizing gas supply apparatus for feeding the oxidizing gas to the inlet of the oxidizing gas of the fuel cell;

a cooling fluid supply system for causing the cooling fluid to flow through the cooling fluid path of the fuel cell, thereby cooling the fuel cell; and a control unit, wherein the control unit controls, during the power generation, the temperature (hereinafter referred to as "cooling fluid inlet temperature") of the cooling fluid at the inlet of the cooling fluid though the cooling fluid supply system so as to satisfy $T1 \geq T2+1°$ C. where $T1$ is a dew-point temperature (hereinafter referred to as "inlet corresponding dew-point temperature") into which the total amount of moisture of at least either the fuel gas or oxidizing gas at the inlet thereof is converted and $T2$ is the cooling fluid inlet temperature.

In the above arrangement, the inlet corresponding dew-point temperature of at least either the fuel gas or oxidizing gas takes account of a temperature rise in the fuel cell due to a temperature rise in the cooling fluid caused by the cooling fluid supply manifold. Therefore, it becomes possible to inhibit drying of the gas to be fed to the fuel cell due to the temperature rise of the cooling fluid caused by the cooling fluid supply manifold.

This polymer electrolyte fuel cell power generation system may further comprise a dew point adjusting device for adjusting the inlet corresponding dew-point temperature of at least either of the fuel gas and the oxidizing gas.

The polymer electrolyte fuel cell power generation system may be formed:

such that the cells each have an MEA having the polymer electrolyte membrane, the anode and the cathode, an electrically-conductive, thermally-conductive plate-like anode-side separator which is disposed on one side of the MEA such that the front face of the anode-side separator is in contact with the anode and which has a groove-like fuel gas passage in a region of the front face, the region being in contact with the anode and an electrically-conductive, thermally-conductive plate-like cathode-side separator which is disposed on the other side of the MEA such that the front face of the cathode-side separator is in contact with the cathode and which has a groove-like oxidizing gas passage in a region of the front face, the region being in contact with the cathode, such that the fuel cell includes a cell stack having the plurality of cells stacked therein, a fuel gas supply manifold, a fuel gas discharge manifold, an oxidizing gas supply manifold, an oxidizing gas discharge manifold, the cooling fluid supply manifold and a cooling fluid discharge manifold, these manifolds being disposed within the cell stack so as to extend in a stacking direction of the cells, such that the fuel gas passage of each of the cells is formed so as to connect the fuel gas supply manifold to the fuel gas discharge manifold, such that the oxidizing gas passage of each of the cells is formed so as to connect the oxidizing gas supply manifold to the oxidizing gas discharge manifold, such that a cooling fluid passage is formed for every specified number of said cells so as to connect the cooling fluid supply manifold to the cooling fluid discharge manifold in a region located on the back face of at least either the anode-side separator or the cathode-side separator, the region overlapping the power generation regions when viewed in the stacking direction of the cells, such that the upstream end of the fuel gas supply manifold is communicated with the inlet of the fuel gas and the downstream end of the fuel gas discharge manifold is communicated with the outside, such that the upstream end of the oxidizing gas supply manifold is communicated with the inlet of the oxidizing gas and the downstream end of the oxidizing gas discharge manifold is communicated with the outside, such that the upstream end of the cooling fluid supply manifold is communicated with the inlet of the cooling fluid and the downstream end of the cooling fluid discharge manifold is communicated with the outlet of the cooling fluid, such that the fuel gas supply manifold, the fuel gas passage and the fuel gas discharge manifold constitute the fuel gas path, such that the oxidizing gas supply manifold, the oxidizing gas passage and the oxidizing gas discharge manifold constitute the oxidizing gas path, and such that the cooling fluid supply manifold, the cooling fluid passage and the cooling fluid discharge manifold constitute the cooling fluid path.

The polymer electrolyte fuel cell power generation system may be formed:

such that the cooling fluid passage is formed on the back face of at least either of the anode-side separator and cathode-side separator of each cell, and such that the control unit controls, during the power generation, the cooling fluid inlet temperature so as to satisfy the requirement in which $T1 \geq T2+(X° C.+Y° C.\times(N-1)\times \Delta T/8°$ C.) is established where $T3$ is a temperature of the cooling fluid at the outlet of the cooling fluid, $\Delta T$ is $T3-T2$, and N is the number of cells stacked in the cell stack and in which X is a value ranging from 1 to 2.5 and Y is a value ranging from 0.02 to 0.027.

In this arrangement, the inlet corresponding dew-point temperature of at least either of the fuel gas and the oxidizing gas takes account of the difference in temperature between both ends of the cell stack caused by the difference in temperature between both ends of the cooling fluid supply manifold and therefore, the gas at its inlet leading to each cell can be maintained in a full humidification or over-humidification condition. The meaning of "over-humidification" will be later explained in the preferred embodiments.

The polymer electrolyte fuel cell power generation system may be formed:

such that the fuel gas supply manifold, the oxidizing gas supply manifold, and the cooling fluid supply manifold are formed on the periphery of one half of the cell stack when viewed in the stacking direction of the cells, whereas the fuel gas discharge manifold, the oxidizing gas discharge manifold, and the cooling fluid discharge manifold are formed on the periphery of the other half of the cell stack when viewed in the stacking direction of the cells, and such that the requirement for the gas flowing in one of the fuel gas supply manifold and the oxidizing gas supply manifold, which is closer to the cooling fluid supply manifold, is such that X is a value ranging from 1.0 to 1.5 and Y is a value ranging from 0.02 to 0.027, whereas the requirement for the gas flowing in the other one of the fuel gas supply manifold and the oxidizing gas supply manifold, which is farther from the cooling fluid supply manifold, is such that X is 2.5 and Y is 0.023.

Since the preferable inlet corresponding dew-point temperatures of the fuel gas and oxidizing gas are determined by the positional relationship between the fuel gas supply manifold/the oxidizing gas supply manifold and the cooling fluid supply manifold, this arrangement makes it possible to maintain the gasses at their inlets of each cell in a more desirable full humidification or over-humidification condition.

The polymer electrolyte fuel cell power generation system may be formed:

such that the cooling fluid passage is formed on the back face of at least either of the anode-side separator and cathode-side separator for every two cells, and such that the control unit controls, during the power generation, the cooling fluid inlet temperature so as to satisfy the requirement in which $T1 \geq T2+(X° C.+Y° C.\times(N-1)\times\Delta T/8° C.)$ is established where T3 is the temperature of the cooling fluid at the outlet of the cooling fluid, $\Delta T$ is T3−T2, and N is the number of cells stacked in the cell stack and in which X is a value ranging from 2.8 to 4.2 and Y is a value ranging from 0.013 to 0.033.

The polymer electrolyte fuel cell power generation system may be formed:

such that the fuel gas supply manifold, the oxidizing gas supply manifold, and the cooling fluid supply manifold are formed on the periphery of one half of the cell stack when viewed in the stacking direction of the cells, whereas the fuel gas discharge manifold, the oxidizing gas discharge manifold, and the cooling fluid discharge manifold are formed on the periphery of the other half of the cell stack when viewed in the stacking direction of the cells, and such that the requirement for the gas flowing in one of the fuel gas supply manifold and the oxidizing gas supply manifold, which is closer to the cooling fluid supply manifold, is such that X is a value ranging from 2.8 to 3.3 and Y is a value ranging from 0.013 to 0.033, whereas the requirement for the gas flowing in the other one of the fuel gas supply manifold and the oxidizing gas supply manifold, which is farther from the cooling fluid supply manifold, is such that X is a value ranging from 3.7 to 4.2 and Y is a value ranging from 0.013 to 0.030.

Since the preferable inlet corresponding dew-point temperatures of the fuel gas and oxidizing gas are determined by the positional relationship between the fuel gas supply manifold/the oxidizing gas supply manifold and the cooling fluid supply manifold, this arrangement makes it possible to maintain the gasses at their inlets of each cell in a more desirable full humidification or over-humidification condition.

The control unit may further control a temperature of the cooling fluid at the outlet of the cooling fluid (hereinafter referred to as "outlet of the cooling fluid temperature") during the power generation so as to satisfy $T3-T2 \leq 15° C.$ where T3 is the cooling fluid outlet temperature.

The polymer electrolyte fuel cell power generation system may be formed:

such that the respective most upstream portions of the fuel gas passage and the oxidizing gas passage and the most upstream portion of the cooling fluid passage are located at approximately the same position when viewed from the stacking direction of the cells, and such that the respective most downstream portions of the fuel gas passage and the oxidizing gas passage and the most downstream portion of the cooling fluid passage are located at approximately the same position when viewed from the stacking direction of the cells.

This makes it possible to maintain the full humidification or over-humidification condition over the entire area of the power generation regions.

The polymer electrolyte fuel cell power generation system may further comprise:

a dew-point adjusting device for making a total enthalpy heat exchange at least between the fuel gas supplied to the fuel cell (hereinafter referred to as "supply fuel gas") and the fuel gas discharged from the fuel cell (hereinafter referred to as "discharge fuel gas") or between the oxidizing gas supplied to the fuel cell (hereinafter referred to as "supply oxidizing gas") and the oxidizing gas discharged from the fuel cell (hereinafter referred to as "discharge oxidizing gas"), so that the inlet corresponding dew-point temperature of the gas that has been subjected to the total enthalpy heat exchange is adjusted.

This allows the inlet corresponding dew-point temperature of at least either the supply fuel gas or the supply oxidizing gas to vary in conjunction with the outlet temperature of the cooling fluid, so that control of the inlet corresponding dew-point temperature is facilitated.

The inlet corresponding dew-point temperature of at least either the fuel gas or the oxidizing gas, the cooling fluid inlet temperature and the cooling fluid outlet temperature may have values that satisfy $T2 \leq T1 \leq T3$ during the power generation.

The dew-point adjusting device may be configured so as to satisfy $T3-T1 \geq 1° C.$ during the power generation.

The dew-point adjusting device may be configured so as to satisfy $T3-T1 \geq 2° C.$ during the power generation.

The dew-point adjusting device may make a total enthalpy heat exchange at least between the supply fuel gas and the discharge fuel gas or between the supply oxidizing gas and the discharge oxidizing gas and then make a total enthalpy heat exchange between the gas that has been subjected to the total enthalpy heat exchange and the cooling fluid discharged from the fuel cell to supply the fuel cell with the gas that has exchanged total enthalpy heat with the cooling fluid.

The dew-point adjusting device may be configured so as to satisfy $T3-T1 \geq 4° C.$ during the power generation.

The dew-point adjusting device may make a total enthalpy heat exchange at least between the supply fuel gas and the discharge fuel gas or between the supply oxidizing gas and the discharge oxidizing gas and then make simply a heat exchange between the gas that has been subjected to the total enthalpy heat exchange and the cooling fluid discharged from the fuel cell to supply the fuel cell with the gas that has exchanged heat with the cooling fluid.

The dew-point adjusting device may make a total enthalpy heat exchange at least between the supply fuel gas and the cooling fluid discharged from the fuel cell or between the supply oxidizing gas and the cooling fluid discharged from the fuel cell to supply the fuel cell with the gas that has been subjected to the total enthalpy heat exchange.

The cooling fluid supply system may comprise:

a cooling fluid circulation passage connected to both ends of the cooling fluid path of the fuel cell so as to form a closed passage;

a cooling fluid circulator for causing the cooling fluid to circulate through the closed passage, the cooling fluid circulator being provided within the cooling fluid circulation passage; and a radiator placed between the outlet of the cooling fluid of the fuel cell and the cooling fluid circulator within the cooling fluid circulation passage, for emitting the heat of the cooling fluid.

The control unit may control, during the power generation, the cooling fluid outlet temperature so as to satisfy $T4 \geqq T3$ where $T4$ is a dew-point temperature (hereinafter referred to as "outlet corresponding dew-point temperature") into which the total amount of moisture of at least either the fuel gas or oxidizing gas at its outlet of the fuel cell is converted.

The fuel gas passage, the oxidizing gas passage and the cooling fluid passage may be respectively formed so as to allow a fluid to flow therein without defying gravity.

The control unit may control, during the power generation, the cooling fluid inlet temperature so as to satisfy $50° C. \geqq T2 \geqq 70° C$. The reason for this is that unless the utilization factor of the oxidizing gas is 65% or more when the inlet corresponding dew-point temperature is 70° C., the outlet corresponding dew-point temperature does not become 80° C. (+10° C. higher than the inlet corresponding dew-point temperature $T2$), and it is an impractical operating condition that the utilization factor of the oxidizing gas is 65% or more.

The control unit may control, during the power generation, the cooling outlet fluid temperature so as to satisfy $5° C. \leqq T3-T2$. This enables a total enthalpy heat exchange between the fuel gas/oxidizing gas supplied to the fuel cell and the fuel gas or oxidizing gas or the cooling water discharged from the fuel cell. In addition, if the heat received by the cooling fluid is utilized for hot water supply, the temperature of the hot water can be maintained at 60° C. or more.

The control unit may control, during the power generation, the flow of the cooling fluid through the cooling fluid supply system such that the power generation regions are entirely over-humidified or full humidified.

The control unit may control, during the power generation, the fuel gas supply apparatus such that the fuel gas is supplied with its flow velocity at an outlet of the fuel gas passage being not less than 1.8 m/s nor more than 4.1 m/s.

This prevents occurrence of flooding caused by the power generation regions being kept in an over-humidification condition.

The control unit may control, during the power generation, the supply of the fuel gas such that the pressure loss of the fuel gas in the fuel gas path is not less than 2 kPa nor more than 10 kPa.

The fuel gas passage may be composed of a plurality of passage grooves and the equivalent diameter of the passage grooves may be not less than 0.78 mm nor more than 1.30 mm.

The control unit may control, during the power generation, the oxidizing gas supply apparatus such that the oxidizing gas is supplied with its flow velocity at an outlet of the oxidizing gas passage being not less than 2.8 m/s nor more than 7.7 m/s.

This prevents occurrence of flooding caused by the power generation regions being kept in the over-humidification condition.

The control unit may control, during the power generation, the supply of the oxidizing gas such that the pressure loss of the oxidizing gas in the oxidizing gas path is not less than 2 kPa nor more than 10 kPa.

The oxidizing gas passage may be composed of a plurality of passage grooves and the equivalent diameter of the passage grooves may be not less than 0.78 mm nor more than 1.30 mm.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 19 is views showing separators that constitute the fuel cell with humidifier of FIG. 18, wherein

FIG. 27 is a table showing a constant X and coefficient Y of a conditional expression together with current density, which conditional expression should be satisfied by a corresponding dew-point temperature T1 when cooling is done for each cell.

FIG. 28 is a table showing a constant X and coefficient Y of a conditional expression together with current density, which conditional expression should be satisfied by the corresponding dew-point temperature T1 when cooling is done for every two cells.

DETAILED DESCRIPTION OF THE INVENTION

Referring now to the accompanying drawings, preferred embodiment of the invention will be described below.

FIRST EMBODIMENT

Figure 1:
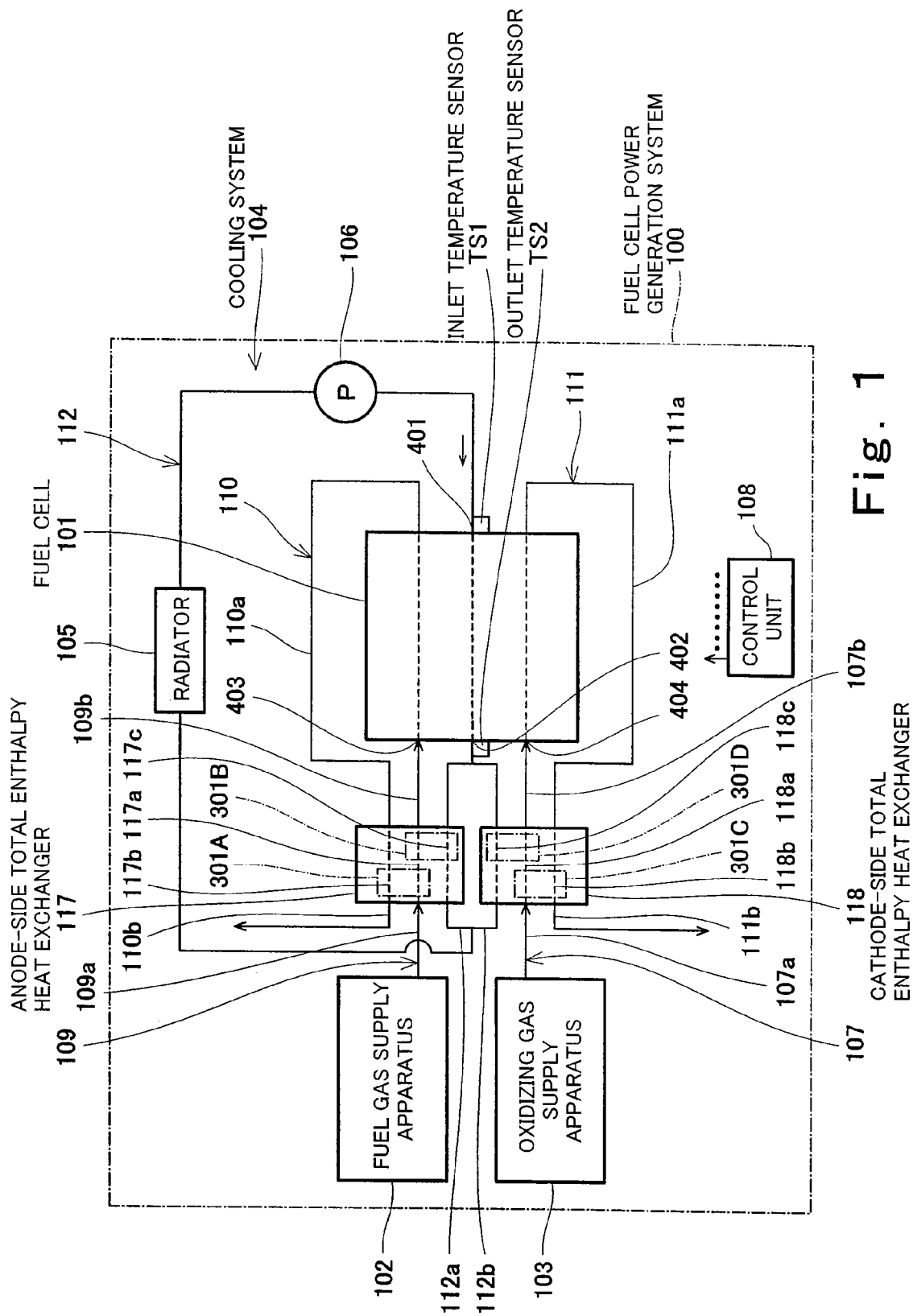
FIG. 1 is a block diagram diagrammatically showing a configuration of a polymer electrolyte fuel cell power generation system according to a first embodiment of the invention.

FIG. 1 is a block diagram that diagrammatically shows a configuration of a polymer electrolyte fuel cell power generation system according to a first embodiment of the invention.

The polymer electrolyte fuel cell power generation system (hereinafter referred to as "fuel cell power generation system") of this embodiment includes a polymer electrolyte fuel cell (hereinafter referred to as "fuel cell") 101. The fuel cell 101 has a fuel gas inlet 403 through which a fuel gas is fed to an anode, and a fuel gas supply apparatus 102 is connected to the fuel gas inlet 403 through a fuel gas supply passage 109. The fuel gas supply apparatus 102 feeds the fuel gas to the anode of the fuel cell 101. As the fuel gas, hydrogen gas, reformed gas produced by reforming hydrocarbon gas, or the like is used. In this embodiment, the fuel gas supply apparatus 102 is comprised of a hydrogen generator for producing reformed gas from raw gas as the fuel gas. As the raw gas, natural gas is used herein.

The fuel cell 101 has an oxidizing gas inlet 404 through which an oxidizing gas is fed to a cathode and an oxidizing gas supply apparatus 103 is connected to the oxidizing gas inlet 404 through an oxidizing gas supply passage 107. The oxidizing gas supply apparatus 103 feeds the oxidizing gas to the cathode of the fuel cell 101. As the oxidizing gas, air is used herein. The oxidizing gas supply apparatus 103 is comprised of an air blower in this embodiment. The fuel gas and oxidizing gas which have been fed to the anode and cathode of the fuel cell 101 chemically react thereat and this chemical reaction causes generation of electric power and heat (herein referred to as "exhaust heat"). The fuel cell 101 has a fuel gas outlet (not shown in FIG. 1) through which the fuel gas from the anode is discharged and a fuel gas discharge passage 110 is connected to the fuel gas outlet. Excessive fuel gas, which does not contribute to the above chemical reaction, is discharged from the anode to the fuel gas discharge passage 110 for proper disposal. For instance, the excessive fuel gas discharged to the fuel gas discharge passage 110 may be used as a fuel for heating the reformer of the hydrogen generator that constitutes the fuel gas supply apparatus 102, burnt by a burner for its exclusive use, or discharged to the atmosphere after proper dilution.

The fuel cell 101 has an oxidizing gas outlet (not shown in FIG. 1) through which the oxidizing gas is discharged from the cathode, and an oxidizing gas discharge passage 111 is connected to the oxidizing gas outlet. Excessive oxidizing gas, which does not contribute to the above chemical reaction, is discharged from the cathode to the atmosphere through the oxidizing gas discharge passage 111.

This fuel cell power generation system 100 is provided with a cooling water circulation passage 112 that passes through the fuel cell 101 and serves as the cooling fluid circulation path. Water (hereinafter referred to as "cooling water") circulates as the cooling fluid within the cooling water circulation passage 112. Antifreeze liquid, for instance, may be used as the cooling fluid. Disposed in the cooling water circulation passage 112 are a radiator 105 and a circulating pump 106. The cooling water circulation passage 112, the radiator 105 and the circulating pump 106 constitute a cooling system 104. The radiator 105 causes the heat, which has been transmitted from the fuel cell 101 to the cooling water, to be released from the cooling water. The radiator 105 is comprised of, for instance, an exhaust heat reuse system that receives exhaust heat from the cooling water to reuse it, or a wind-chill system that includes a cooling water passage with walls having a fin formed thereon and a fan for sending a current of air to the fin. In the cooling system 104, the circulating pump 106 causes the cooling water to circulate in the direction of arrow shown in FIG. 1, passing through the cooling water circulation passage 112, so that the radiator 105 discharges the exhaust heat that the cooling water has received from the fuel cell 101. Thereby, the fuel cell 101 is cooled. In this case, the amount of heat radiation per unit flow of the cooling water can be adjusted in the radiator 105. Meanwhile, a flow rate of the cooling water can be adjusted in the cooling water circulating pump 106. Accordingly, the radiator 105 and the cooling water circulating pump 106 each determine the heat radiation amount of the cooling water, functioning as a cooling water temperature adjusting means.

In addition, the fuel cell power generation system 100 has an anode-side total enthalpy heat exchanger 117 and a cathode-side total enthalpy heat exchanger 118.

Formed inside the anode-side total enthalpy heat exchanger 117 are a supply-side fuel gas passage 117a, a discharge-side fuel gas passage 117b, and a cooling water passage 117c. The supply-side fuel gas passage 117a and the discharge-side fuel gas passage 117b are formed so as to allow a total enthalpy heat exchange between the gases flowing in the passages 117a and 117b, respectively. Concretely, the supply-side fuel gas passage 117a and the discharge-side fuel gas passage 117b are partially adjacent to each other with a total enthalpy heat exchange membrane sandwiched therebetween. A solid polymer electrolyte membrane for use in the fuel cell 101, for instance, is used as the total enthalpy heat exchange membrane. In addition, the gas, which flows in the supply-side fuel gas passage 117a and has been subjected to the total enthalpy heat exchange, again exchanges total enthalpy heat with the cooling water flowing in the cooling water passage 117c. The supply-side fuel gas passage 117a is connected to the fuel gas supply passage 109 so as to be inserted into the passage 109, whereas the discharge-side fuel gas passage 117b is connected to the fuel gas discharge passage 110 so as to be inserted into the passage 110. The cooling water circulation passage 112 is partially composed of two split flow passages 112a, 112b (herein, the split ratio is 1:1). The cooling water passage 117c is connected to one split flow passage 112a of the cooling water circulation passage 112 so as to be inserted therein.

Thereby, the fuel gas flowing out from the fuel gas supply apparatus 102 is humidified and heated, in the anode-side total enthalpy heat exchanger 117, by the fuel gas discharged from the fuel cell 101 and further humidified and heated by the cooling water that has increased in temperature, receiving exhaust heat from the fuel cell 101, so that the fuel gas comes to have a specified corresponding dew-point temperature described later. The fuel gas having the specified corresponding dew-point temperature is fed to the anode after passing through the fuel gas inlet 403 of the fuel cell 101.

Formed inside the cathode-side total enthalpy heat exchanger 118 are a supply-side oxidizing gas passage 118a, a discharge-side oxidizing gas passage 118b and a cooling water passage 118c. The supply-side oxidizing gas passage 118a and the discharge-side oxidizing gas passage 118b are formed so as to allow a total enthalpy heat exchange between the gases flowing in the passages 118a and 118b, respectively. Concretely, the supply-side oxidizing gas passage 118a and the discharge-side oxidizing gas passage 118b are partially adjacent to each other with a total enthalpy heat exchange membrane sandwiched therebetween. A solid polymer electrolyte membrane for use in the fuel cell 101, for instance, is used as the total enthalpy heat exchange membrane. In addition, the gas, which flows in the supply-side oxidizing gas passage 118a and has been subjected to the total enthalpy heat exchange, again exchanges total enthalpy heat with the cooling water flowing in the cooling water passage 118c. The supply-side oxidizing gas passage 118a is connected to the oxidizing gas supply passage 107 so as to be inserted into the passage 107, whereas the discharge-side oxidizing gas passage 118b is connected to the oxidizing gas discharge passage 111 so as to be inserted into the passage 111. The cooling water passage 118 is connected to the other split-flow passage 112b of the cooling water circulation passage 112 so as to be inserted therein.

Thereby, the oxidizing gas flowing out from the oxidizing gas supply apparatus 103 is humidified and heated, in the cathode-side total enthalpy heat exchanger 118, by the oxidizing gas discharged from the fuel cell 101 and further humidified by the cooling water that has increased in temperature, receiving exhaust heat from the fuel cell 101, so that the oxidizing gas comes to have a specified corresponding dew-point temperature described later. The oxidizing gas having the specified corresponding dew-point temperature is fed to the cathode after passing through the oxidizing gas inlet 404 of the fuel cell 101.

Herein, in FIG. 1, the flowing directions of the gasses and cooling fluid flowing in the fuel cell 101 and the total enthalpy heat exchangers 117, 118 are only diagrammatically shown, and do not represent the interrelation (e.g., a parallel current flow and a counter current flow) between the flowing directions of the gasses and the cooling fluid. The same is applied to FIGS. 14 to 17.

The fuel cell power generation system 100 has an inlet temperature sensor TS1, an output temperature sensor TS2 and a control unit 108. The inlet temperature sensor TS1 and the output temperature sensor TS2 each consist of a thermistor. The sensors TS1, TS2 detect the temperature of the cooling water at the inlet 401 and outlet 402, respectively, of the fuel cell 101 (more specifically, a cell stack 1 described later) in the cooling water circulation passage 112 to output detected values to the control unit 108. The control unit 108 is constituted by an operation unit such as a microcomputer and controls desired elements of the fuel cell power generation system 100, thereby controlling the operation of the fuel cell power generation system 100. The control unit described in this specification may be not only a stand-alone control unit but also a group of control units for executing control in corporation with one another. Therefore, the control unit 108 is not necessarily constructed by a stand-alone control unit but may be a plurality of distributed control units which cooperatively control the operation of the fuel cell power generation system 100.

Concretely, the control unit 108 controls at least the fuel gas supply apparatus 102, the oxidizing gas supply apparatus 103, the radiator 105 and the cooling water circulating pump 109 and more particularly controls at least either of the radiator 105 and the cooling water circulating pump 109 based on the detected values of the inlet temperature sensor TS1 and the outlet temperature sensor TS2, thereby adjusting the temperature of the cooling water to a specified value.

Next, the structure of the fuel cell 101 will be described in detail.

Figure 2:
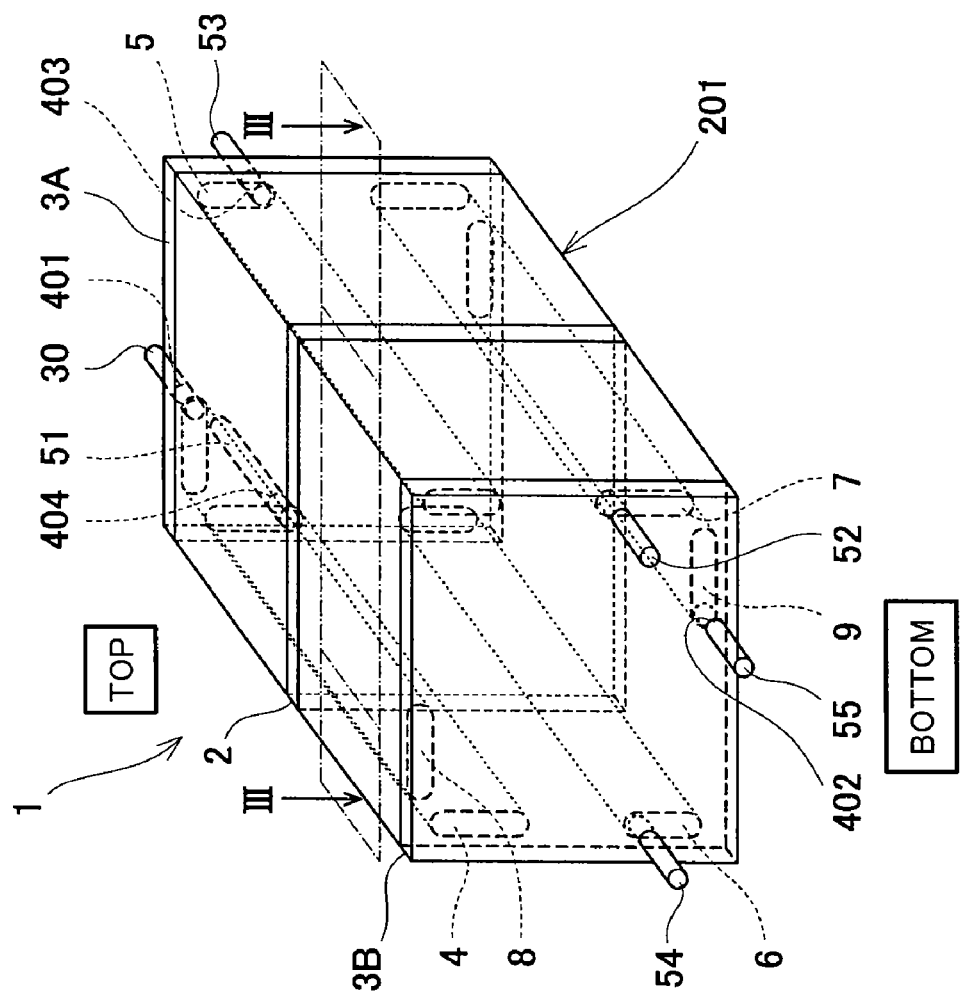
FIG. 2 is a perspective view showing a schematic configuration of the fuel cell shown in FIG. 1.
Figure 3:
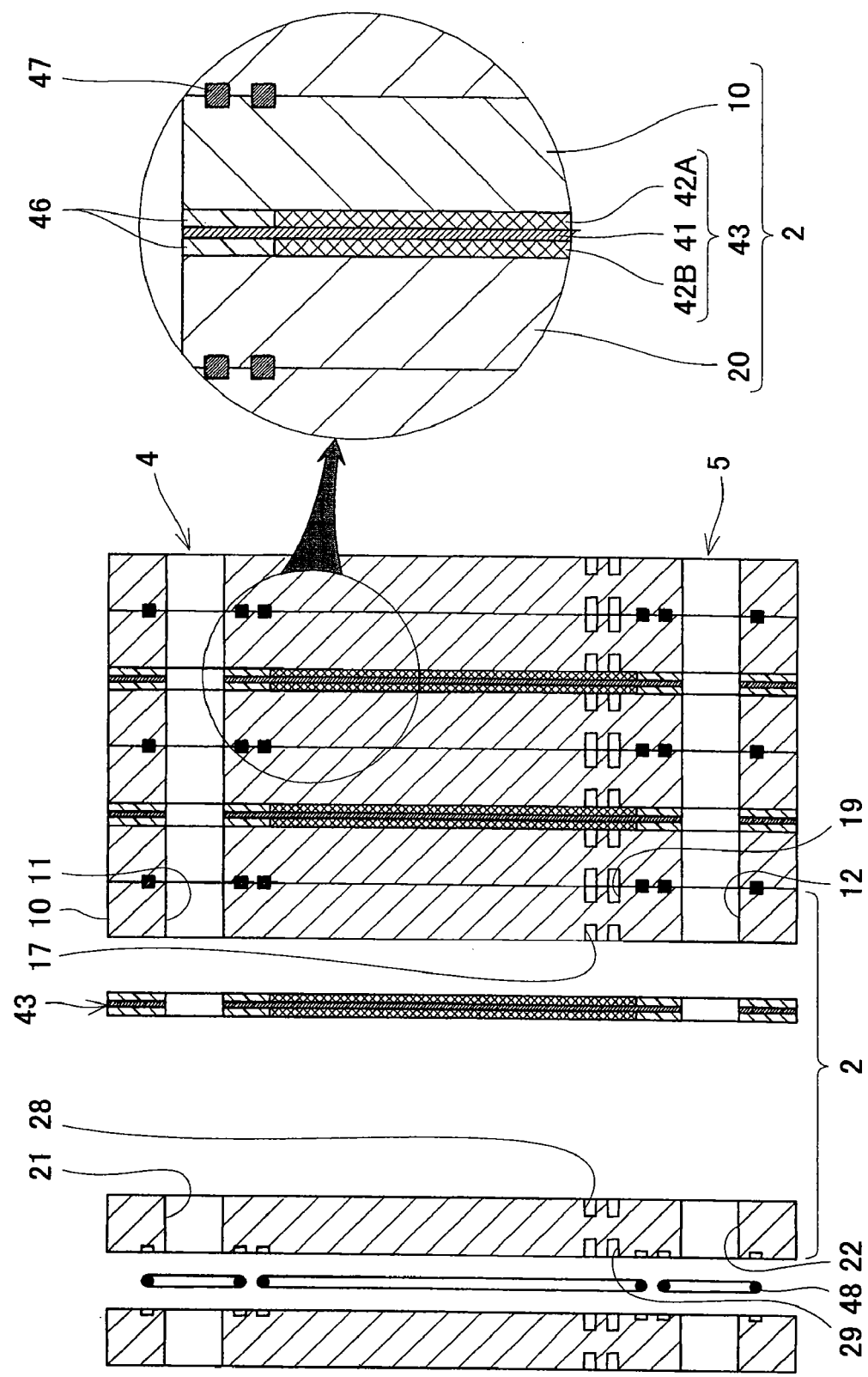
FIG. 3 is a sectional view taken along plane III-III of FIG. 2.

FIG. 2 is a perspective view showing a schematic structure of the fuel cell shown in FIG. 1. FIG. 3 is a sectional view taken along plane III-III of FIG. 2.

It should be understood that, in FIG. 2, the upper side and down side of the fuel cell are indicated by "top" and "bottom" in the drawing. The same is applied to FIGS. 4 to 7 described later.

As shown in FIG. 2, the fuel cell 101 has a cell stack 1. The cell stack 1 has (i) a cell laminate 201 in which plate-like cells 2 are stacked in the thickness-wise direction of the cells 2; (ii) a first end plate 3A and a second end plate 3B that are disposed at the ends of the cell laminate 201, respectively; and (iii) a fastening device (not shown) for fastening the cell laminate 201 and the first and second end plates 3A, 3B in the stacking direction of the cells 2 to one another. Although not shown in the drawings, the first and second end plates 3A, 3B are each provided with a corrector terminal. The plate-like cells 2 are arranged in parallel with a vertical plane and therefore the stacking direction of the cells 2 is a horizontal direction.

Formed on the upper part of one side (hereinafter referred to as "first side") of the cell laminate 201 is an oxidizing gas supply manifold 4 that passes through the cell laminate 201 in the stacking direction. One end of the oxidizing gas supply manifold 4 is communicated with a through hole defined in the first end plate 3A. Connected to the outer opening (oxidizing gas inlet 404) of this through hole is an oxidizing gas feed pipe 51 that constitutes the oxidizing gas supply passage 107 shown in FIG. 1. The other end of the oxidizing gas supply manifold 4 is closed by the second end plate 3B. Formed on the lower part of the other side (hereinafter referred to as "second side") of the cell laminate 201 is an oxidizing gas discharge manifold 7 that passes through the cell laminate 201 in the stacking direction. One end of the oxidizing gas supply manifold 7 is closed by the first end plate 3A. The other end of the oxidizing gas discharge manifold 7 is communicated with a through hole defined in the second end plate 3B. Connected to the outer opening (oxidizing gas outlet) of this through hole is an oxidizing gas discharge pipe 52 that constitutes the oxidizing gas discharge passage 111 shown in FIG. 1.

Formed on the upper part of the second side of the cell laminate 201 is a fuel gas supply manifold 5 that passes through the cell laminate 201 in the stacking direction. One end of the fuel gas supply manifold 5 is communicated with a through hole defined in the first end plate 3A. Connected to the outer opening (fuel gas inlet) 403 of this through hole is a fuel gas feed pipe 53 that constitutes the fuel gas supply passage 109 shown in FIG. 1. The other end of the fuel gas supply manifold 5 is closed by the second end plate 3B.

Formed on the lower part of the first side of the cell laminate 201 is a fuel gas discharge manifold 6 that passes through the cell laminate 201 in the stacking direction. One end of the fuel gas discharge manifold 6 is closed by the first end plate 3A. The other end of the fuel gas supply manifold 5 is communicated with a through hole defined in the second end plate 3B. Connected to the outer opening (fuel gas outlet) of this through hole is a fuel gas discharge pipe 54 that constitutes the fuel gas discharge passage 110 shown in FIG. 1.

Formed at the inner side of the upper part of the oxidizing gas supply manifold 4 is a cooling water supply manifold 8 that passes through the cell laminate 201 in the stacking direction. One end of the cooling water supply manifold 8 is communicated with a through hole defined in the first end plate 3A. Connected to the outer opening (cooling water inlet 401) of this through hole is a cooling water feed pipe 30 that constitutes the portion between the fuel cell 101 and the discharge port (not shown) of the circulating pump 106 disposed in the cooling water circulation passage 112 shown in FIG. 1. The other end of the cooling water supply manifold 8 is closed by the second end plate 3B.

Formed at the inner side of the lower part of the oxidizing gas discharge manifold 7 is a cooling water discharge manifold 9 that passes through the cell laminate 201 in the stacking direction. One end of the cooling water discharge manifold 9 is closed by the first end plate 3A. The other end of the cooling water discharge manifold 9 is communicated with a through hole defined in the second end plate 3B. Connected to the outer opening (cooling water outlet 402) of this through hole is a cooling water discharge pipe 31 that constitutes the portion between the fuel cell 101 and the suction port of the circulating pump 106 disposed in the cooling water circulation passage 112 shown in FIG. 1.

As shown in FIG. 3, the cells 2 are each composed of a plate-like MEA 43, a cathode-side separator 10 and an anode-side separator 20, these separators 10, 20 being disposed in contact with both sides of the MEA 43, respectively. The cells 2 are stacked such that, in every adjacent two cells 2, the back face of the cathode-side separator 10 of one cell 2 is in contact with the back face of the anode-side separator 20 of the other cell 2. The MEA 43, the cathode-side separator 10 and the anode-side separator 20 have the same dimension and same shape (here, rectangle). The MEA 43, the cathode-side separator 10 and the anode-side separator 20 respectively have, at their respective corresponding positions, an oxidizing gas inlet manifold aperture, an oxidizing gas outlet manifold aperture, a fuel gas inlet manifold aperture, a fuel gas outlet manifold aperture, a cooling water inlet manifold aperture and a cooling water outlet manifold aperture, these apertures piercing the MEA 43 and the separators 10, 20 in their thickness-wise direction. The oxidizing gas inlet manifold apertures, oxidizing gas outlet manifold apertures, fuel gas inlet manifold apertures, fuel gas outlet manifold apertures, cooling water inlet manifold apertures and cooling water outlet manifold apertures of the MEAs 43, cathode-side separators 10 and anode-side separators 20 of all the cells 2 are communicated respectively, thereby forming the oxidizing gas supply manifold 4, the oxidizing gas discharge manifold 7, the fuel gas supply manifold 5, the fuel gas discharge manifold 6, the cooling water supply manifold 8 and the cooling water discharge manifold 9.

An oxidizing gas passage 17 and a cooling water passage 19 are formed on the front and back faces, respectively, of the cathode-side separator 10. As described later, the oxidizing gas passage 17 is formed so as to connect the oxidizing gas inlet manifold aperture to the oxidizing gas outlet manifold aperture, whereas the cooling water passage 19 is formed so as to connect the cooling water inlet manifold aperture to the cooling water outlet manifold aperture. The cathode-side separator 10 is disposed with its front face being in contact with the MEA 43.

A fuel gas passage 28 and a cooling water passage 29 are formed on the front and rear faces, respectively, of the anode-side separator 20. As described later, the fuel gas passage 19 is formed so as to connect the fuel gas inlet manifold aperture to the fuel gas outlet manifold aperture, whereas the cooling water passage 29 is formed so as to connect the cooling water inlet manifold aperture to the cooling water outlet manifold aperture. The anode-side separator 20 is disposed with its front face being in contact with the MEA 43.

The passages 17, 19, 28, 29 are each constituted by grooves formed in the main face of the cathode-side separator 10 or the anode-side separator 20. Although the passages 17, 19, 28, 29 are constituted by two passages in FIG. 3, they may be formed from a multitude of passages. The cooling water passage 19 of the cathode-side separator 10 and the cooling water passage 29 of the anode-side separator 20, these separators 10, 20 being adjacent to each other, are formed so as to be aligned (be joined) to each other when the cells 2 are stacked so that the cooling water passages 19, 29 form a single cooling water passage.

Formed on the back faces of the cathode-side separator 10 and the anode-side separator 20 are O-ring storing grooves within which O-rings 47 are respectively accommodated. The O-ring storing grooves are formed so as to enclose the cooling water inlet manifold aperture, the cooling water outlet manifold aperture, the cooling water passage; the oxidizing gas inlet manifold aperture; the oxidizing gas outlet manifold aperture; the fuel gas inlet manifold aperture, and the fuel gas outlet manifold aperture. Thereby, the manifold apertures etc. are sealed with each other.

The MEA 43 has a polymer electrolyte membrane 41, a cathode 42A, an anode 42B and a pair of gaskets 46. The cathode 42A and the anode 42B are formed on both faces of the polymer electrolyte membrane 41 at other parts than its edges. The gaskets 46 are so formed on both faces of the edges of the polymer electrolyte membrane 41 as to enclose the cathode 42A and the anode 42B, respectively. The pair of gaskets 46, the cathode 42A, the anode 42B and the polymer electrolyte membrane 41 are integrally formed.

The polymer electrolyte membrane 41 is made from a material that can selectively transport hydrogen ions. Herein, the membrane 41 is formed from a perfluorocarbon sulfonic acid material. The cathode 42A and the anode 42B are formed on the opposite main faces, respectively, of the polymer electrolyte membrane 41, each being composed of a catalyst layer (not shown) and a gas diffusion layer (not shown) formed on the catalyst layer. The catalyst layer is mainly made from a carbonic powder that carries a platinum metal catalyst. The gas diffusion layer is made of nonwoven cloth or paper that has air permeability and electric conductivity.

The cathode 42A, the anode 42B, the area where the oxidizing gas passage 17 is formed in the cathode-side separator 10, the area where the cooling water passage 19 is formed in the cathode-side separator 10, the area where the fuel gas passage 28 is formed in the anode-side separator 20, and the area where the cooling water passage 29 is formed in the anode-side separator 20 substantially entirely overlap with one another when viewed in the stacking direction of the cells 2.

Next, the cathode-side separator and the anode-side separator will be described in detail.

Figure 4:
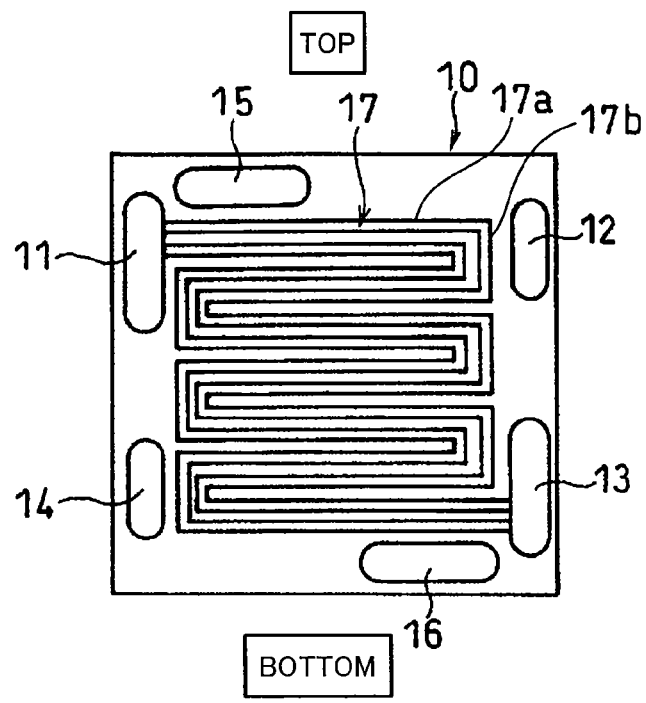
FIG. 4 is a front view of a cathode-side separator.
Figure 5:
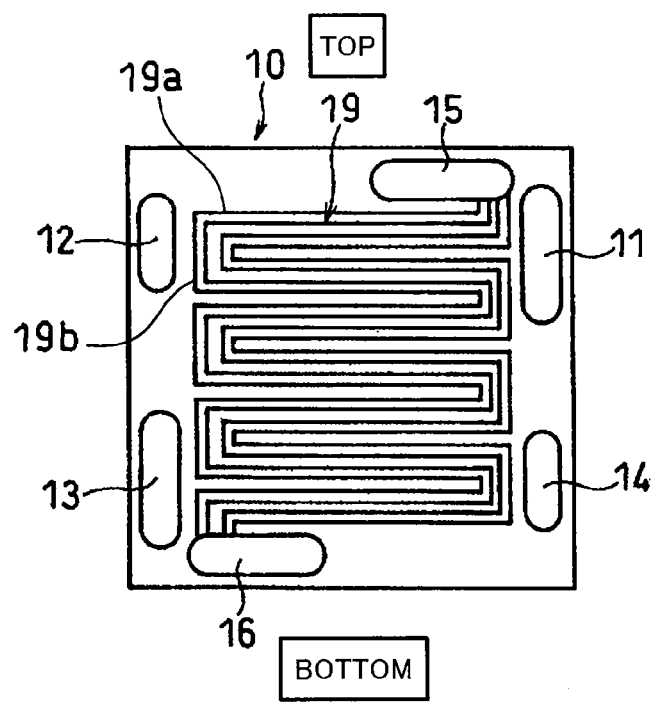
FIG. 5 is a rear view of the cathode-side separator.
Figure 6:
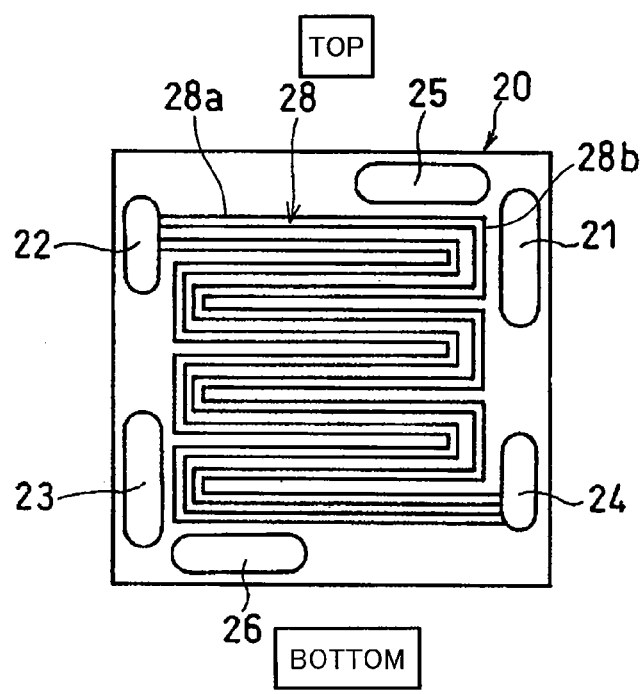
FIG. 6 is a front view of an anode-side separator.
Figure 7:
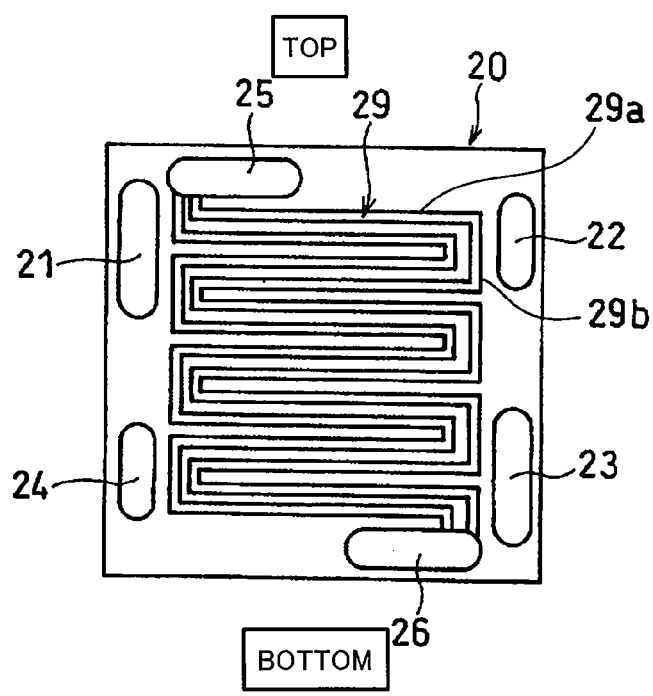
FIG. 7 is a rear view of the anode-side separator.

FIGS. 4, 5 are a front view and rear view, respectively, of the cathode-side separator and FIGS. 6, 7 are a front view and rear view, respectively, of the anode-side separator.

As shown in FIG. 4, the cathode-side separator 10 has the oxidizing gas inlet manifold aperture 11, oxidizing gas outlet manifold aperture 13, fuel gas inlet manifold aperture 12, fuel gas outlet manifold aperture 14, cooling water inlet manifold aperture 15 and cooling water outlet manifold aperture 16. The separator 10 further has, at its face opposed to the cathode, the gas passage 17 for connecting the oxidizing gas manifold apertures 11, 13 to each other and has, at its rear face, the passage 19 for connecting the cooling water manifold apertures 15, 16 to each other.

In FIG. 4, the oxidizing gas inlet manifold aperture 11 is located in the upper part of one side (the left side in FIG. 4: this side is hereinafter referred to as "first side") of the separator 10, whereas the oxidizing gas outlet manifold aperture 13 is located in the lower part of the other side (the right side in FIG. 4: this side is hereinafter referred to as "second side") of the separator 10. The fuel gas inlet manifold aperture 12 is located in the upper part of the second side of the separator 10, whereas the fuel gas outlet manifold aperture 14 is located in the lower part of the first side of the separator 10. The cooling water inlet manifold aperture 15 is located on the inner side of the upper part of the oxidizing gas inlet manifold aperture 11, whereas the cooling water outlet manifold aperture 16 is located on the inner side of the lower part of the oxidizing gas outlet manifold aperture 13. The oxidizing gas inlet manifold aperture 11, the oxidizing gas outlet manifold aperture 13, the fuel gas inlet manifold aperture 12 and the fuel gas outlet manifold aperture 14 each take the form of an oval elongated in a vertical direction. The cooling water manifold apertures 15, 16 each take the form of an oval elongated in a horizontal direction.

The oxidizing gas passage 17 is composed of two passages (passage grooves) in this embodiment. Of course, it may be composed of a desired number of passages. Each passage is substantially constituted by a horizontal portion 17a that extends in a horizontal direction and a vertical portion 17b that extends in a vertical direction. More specifically, each passage constituting the oxidizing gas passage 17 first horizontally extends from the upper part of the oxidizing gas inlet manifold aperture 11 to the second side of the separator 10 and then extends from there downward a certain distance. Then, the passage horizontally extends from there to the first side of the separator 10 and then extends from there downward a certain distance. After repeating the above-described extending pattern twice, the passage horizontally extends from this arrival point to the lower part of the oxidizing gas outlet manifold aperture 13. The horizontally extending part of each passage constitutes the horizontal portion 17a, whereas the downwardly extending part constitutes the vertical portion 17b. This arrangement allows the oxidizing gas to serpentine through the oxidizing gas passage 17 without defying gravity, passing through the horizontal portion 17a and the vertical portion 17b alternately. As a result, flooding is prevented.

Although each passage is composed of the horizontal portion 17a and the vertical portion 17b herein, it should just be formed so as extend horizontally and incline downward along the flowing direction of the gas (this downward inclination includes inclination perpendicular to the horizontal plane). By constructing each passage by the horizontal portion 17a and the vertical portion 17b, the oxidizing gas passage 17 can be formed in high density.

In FIG. 5, the cooling water passage 19 is composed of two passages (passage grooves). Each passage is substantially constituted by a horizontal portion 19a that extends in a horizontal direction and a vertical portion 19b that extends in a vertical direction. More specifically, each passage constituting the cooling water passage 19 first extends downward a certain distance from one end of the cooling water inlet manifold aperture 15 which end is closer to the oxidizing gas inlet manifold aperture 11 than the other end. Then, the passage horizontally extends from there to the second side (the left side in FIG. 5) of the separator 10 and then extends from there downward a certain distance. Then, the passage horizontally extends to the first side (the right side in FIG. 5). After repeating the above-described extending pattern twice and a half, the passage extends from this arrival point downward to one end of the cooling water outlet manifold aperture 16 which end is closer to the oxidizing gas outlet manifold aperture 13 than the other end. The horizontally extending part of each passage constitutes the horizontal portion 19a, whereas the downwardly extending part constitutes the vertical portion 19b. This arrangement allows the cooling water to serpentine through the cooling water passage 19 without defying gravity, passing through the horizontal portion 19a and the vertical portion 19b alternately.

What is important herein is that: the cooling water inlet manifold aperture 15 and the oxidizing gas inlet manifold aperture 11 are close to each other, whereas the cooling water outlet manifold aperture 16 and the oxidizing gas outlet manifold aperture 13 are close to each other, and the cooling water passage 18 and the oxidizing gas passage 17 substantially overlap each other when viewed in the thickness-wise direction of the separator 10, with the result that the cooling water and the oxidizing gas flow in substantially the same direction so as to sandwich the separator 10 therebetween. With this arrangement, the inlet for the oxidizing gas and the inlet for the cooling water, which are the lowest in relative humidity, can be made substantially coincident when viewed from the thickness-wise direction of the separator 10, so that the polymer electrolyte membrane can be prevented from drying and, in consequence, the service life of the polymer electrolyte membrane can be improved.

Although each passage is composed of the horizontal portion 19a and the vertical portion 19b herein, it should just be formed so as extend horizontally and incline downward along the flowing direction of the cooling water. By constructing each passage by the horizontal portion 19a and the vertical portion 19b, the cooling water passage 19 can be formed in high density.

As shown in FIG. 6, the anode-side separator 20 has an oxidizing gas inlet manifold aperture 21, an oxidizing gas outlet manifold aperture 23, a fuel gas inlet manifold aperture 22, a fuel gas outlet manifold aperture 24, a cooling water inlet manifold aperture 25 and a cooling water outlet manifold aperture 26. The separator 20 further has, at a face opposed to the anode, the gas passage 28 that connects the fuel gas manifold apertures 22, 24 to each other and has, at its rear face, the passage 29 that connects the cooling water manifold apertures 25, 26 to each other.

In FIG. 6, the oxidizing gas inlet manifold aperture 21 is located in the upper part of one side (the right side in FIG. 6: this side is hereinafter referred to as "first side") of the separator 20, whereas the oxidizing gas outlet manifold aperture 23 is located in the lower part of the other side (the left side in FIG. 6: this side is hereinafter referred to as "second side") of the separator 20. The fuel gas inlet manifold aperture 22 is located in the upper part of the second side of the separator 20, whereas the fuel gas outlet manifold aperture 24 is located in the lower part of the first side of the separator 20. The cooling water inlet manifold aperture 25 is located on the inner side of the upper part of the oxidizing gas inlet manifold aperture 21, whereas the cooling water outlet manifold aperture 26 is located on the inner side of the lower part of the oxidizing gas outlet manifold aperture 23. The oxidizing gas inlet manifold aperture 21, the oxidizing gas outlet manifold aperture 23, the fuel gas inlet manifold aperture 22 and the fuel gas outlet manifold aperture 24 each take the form of an oval elongated in a vertical direction. The cooling water manifold apertures 25, 26 each take the form of an oval elongated in a horizontal direction.

The fuel gas passage 28 is composed of two passages (passage grooves) in this embodiment. Each passage is substantially constituted by a horizontal portion 28a that extends in a horizontal direction and a vertical portion 28b that extends in a vertical direction. More specifically, each passage constituting the fuel gas passage 28 first horizontally extends from the upper part of the fuel gas inlet manifold aperture 22 to the first side of the separator 20 and then extends from there downward a certain distance. Then, the passage horizontally extends from there to the second side of the separator 20 and then extends from there downward a certain distance. After repeating the above-described extending pattern twice, the passage extends from this arrival point horizontally to the lower part of the fuel gas outlet manifold aperture 24. The horizontally extending part of each passage constitutes the horizontal portion 28a, whereas the downwardly extending part constitutes the vertical portion 28b. This arrangement allows the fuel gas to serpentine through the fuel gas passage 28 without defying gravity, passing through the horizontal portion 28a and the vertical portion 28b alternately. As a result, flooding is prevented.

Although each passage is composed of the horizontal portion 28a and the vertical portion 28b herein, it should just be formed so as extend horizontally and incline downward along the flowing direction of the gas (this downward inclination includes inclination perpendicular to the horizontal plane). It should however be noted that, by constructing each passage by the horizontal portion 28a and the vertical portion 28b, the fuel gas passage 28 can be formed in high density.

In FIG. 7, the cooling water passage 29 is so formed as to have a laterally reverse relationship with the cooling water passage 19 formed on the back face of the cathode-side separator 10 shown in FIG. 5. Each passage is substantially constituted by a horizontal portion 29a that extends in a horizontal direction and a vertical portion 29b that extends in a vertical direction. More specifically, each passage constituting the cooling water passage 29 first extends downward a certain distance from one end of the cooling water inlet manifold aperture 25 which end is closer to the oxidizing gas inlet manifold aperture 21 than the other end. Then, the passage horizontally extends from there to the second side (the right side in FIG. 7) of the separator 20 and then extends from there downward a certain distance. Then, the passage horizontally extends from there to the first side (the left side in FIG. 7). After repeating the above-described extending pattern twice and a half, the passage extends from this arrival point downward to one end of the cooling water outlet manifold aperture 26 which end is closer to the oxidizing gas outlet manifold aperture 23 than the other end. The horizontally extending part of each passage constitutes the horizontal portion 29a, whereas the downwardly extending part constitutes the vertical portion 29b. This arrangement allows the cooling water to serpentine through the cooling water passage 29 without defying gravity, passing through the horizontal portion 29a and the vertical portion 29b alternately.

What is important herein is that: the cooling water inlet manifold aperture 25 and the fuel gas inlet manifold aperture 22 are both formed on the upper part of the separator 20, whereas the cooling water outlet manifold aperture 26 and the fuel gas outlet manifold aperture 24 are both formed on the lower part of the separator 20, and the cooling water passage 29 and the fuel gas passage 28 substantially overlap each other when viewed in the thickness-wise direction of the separator 20, with the result that the cooling water and the fuel gas horizontally flow in opposite directions so as to sandwich the separator 20 therebetween, whereas they vertically flow in the same direction (i.e., from top to bottom) as a whole. With this arrangement, the most upstream part of the fuel gas passage 28 that is the lowest in relative humidity is located at the upper part of the separator 20 where the cooling water inlet part is located and which has the lowest in temperature in a vertical direction in the separator 20, so that the polymer electrolyte membrane can be prevented from drying and, in consequence, the service life of the polymer electrolyte membrane can be improved.

Although each passage is composed of the horizontal portion 29a and the vertical portion 29b herein, it should just be formed so as extend horizontally and incline downward along the flowing direction of the cooling water. It should however be noted that, by constructing each passage by the horizontal portion 29a and the vertical portion 29b, the cooling water passage 29 can be formed in high density.

As described earlier, the MEA is sandwiched between the cathode-side separator 10 and the anode-side separator 20, thereby forming a cell. Accordingly, in every adjacent cells, the cathode-side separator 10 and the anode-side separator 20 are arranged with their cooling water passages 19 and 29 opposed to each other, thereby forming a cooling section. In cases where the cooling section is provided for every plurality of cells, a single separator in which one face serves as a cathode-side separator while the other face serving as an anode-side separator is properly used in place of the composite separator described above.

In the fuel cell 101 of the above-described configuration, the fuel gas, the oxidizing gas and the cooling water flow in the following manner.

In FIGS. 1 to 7, the fuel gas is fed to the fuel gas supply manifold 5 of the cell stack 1 through the fuel gas feed pipe 43. This supplied fuel gas goes from the fuel gas supply manifold 5 into the fuel gas inlet manifold aperture 22 of each cell 2 and then flows in the fuel gas passage 28. During this time, the fuel gas is consumed, reacting with the oxidizing gas through the anode 42B, the polymer electrolyte membrane 41 and the cathode 42A. The fuel gas, which has not been consumed, flows out from the outlet manifold aperture 24 to the fuel gas discharge manifold 6 and is discharged from the cell stack 1 through the fuel gas discharge pipe 44.

On the other hand, the oxidizing gas is fed to the oxidizing gas supply manifold 8 of the cell stack 1 through the oxidizing gas feed pipe 41. This supplied oxidizing gas goes from the oxidizing gas supply manifold 4 into the oxidizing gas inlet manifold aperture 11 of each cell 2 and then flows in the oxidizing gas passage 17. During this time, the oxidizing gas is consumed, reacting with the fuel gas through the cathode, the polymer electrolyte membrane and the anode. The oxidizing gas, which has not been consumed, flows out from the outlet manifold aperture 13 to the oxidizing gas discharge manifold 7 and is discharged from the cell stack 1 through the oxidizing gas discharge pipe 42.

The cooling water is fed to the cooling water supply manifold 8 of the cell stack 1 through the cooling water feed pipe 30. This supplied cooling water goes from the cooling water supply manifold 8 into the cooling water inlet manifold apertures 15, 25 of each cell 2 and then flows in the cooling water passages 19, 29. During this time, the cooling water receives heat from the cathode and the anode while cooling them through the cathode-side separator 10 and the anode-side separator 20. Then, the cooling water flows into the cooling water discharge manifold 9 from the outlet manifold apertures 16, 26 and is discharged from the cell stack 1 by way of the cooling water discharge pipe 31.

In this process, the fuel gas and the oxidizing gas flow in the fuel gas passage 28 and the oxidizing gas passage 17 respectively, without defying gravity, so that flooding is prevented.

In each separator 10, 20, since the upper part of the fuel gas passage 28 or the oxidizing gas passage 17 which becomes the lowest in relative humidity is located in the vicinity of the inlet for the cooling water, the polymer electrolyte membrane is prevented from drying.

Next, there will be explained constitutional examples of the anode-side total enthalpy heat exchanger 117 and the cathode-side total enthalpy heat exchanger 118.

Figure 8:
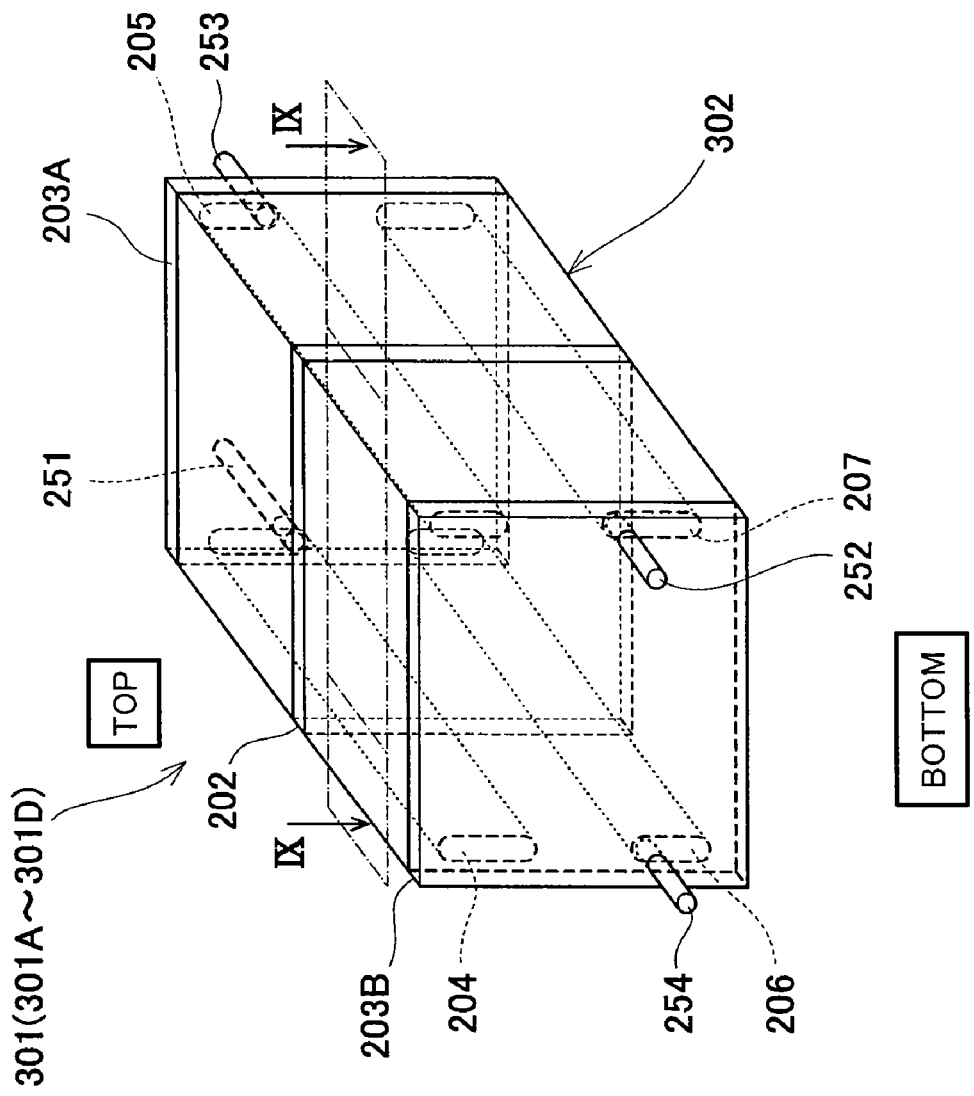
FIG. 8 is a perspective view showing a configuration of a total enthalpy heat exchange cell stack that constitutes the anode-side total enthalpy heat exchanger shown in FIG. 1.
Figure 9:
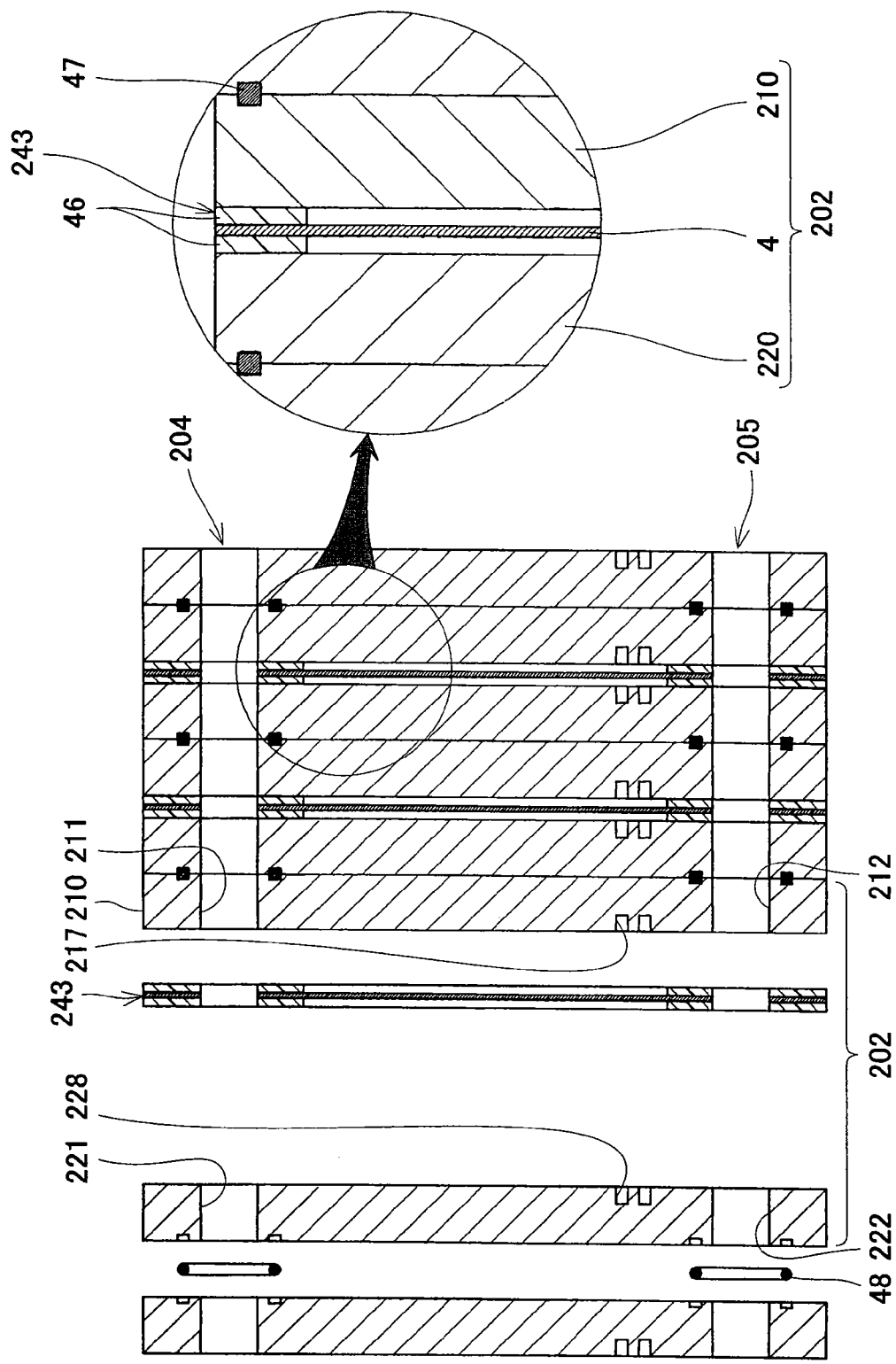
FIG. 9 is a sectional view taken along plane IX-IX of FIG. 8.

FIG. 8 is a perspective view showing a total enthalpy heat exchange cell stack that constitutes the anode-side total enthalpy heat exchanger 117 shown in FIG. 1. FIG. 9 is a sectional view taken along plane IX-IX of FIG. 8.

As shown in FIGS. 2, 3, 8, 9, the main part of the anode-side total enthalpy heat exchanger 117 is constituted by a total enthalpy heat exchange cell stack 301 having basically the same configuration as that of the cell stack 1 of the fuel cell 101. Therefore, the configuration of the anode-side total enthalpy heat exchanger 117 will be explained in comparison with the cell stack 1.

The total enthalpy heat exchange cell stack 301 has (i) a cell laminate 302 in which cells 202 having the shape of a plate as a whole are stacked in the thickness-wise direction of the cells 202; (ii) a first end plate 203A and a second end plate 203B that are disposed at the ends of the cell laminate 302, respectively; and (iii) a fastening device (not shown) for fastening the cell laminate 302, the first end plates 203A, and second end plates 203B to one another in the stacking direction of the cells 202.

The cell laminate 302 is provided with a first fluid supply manifold 204, a first fluid discharge manifold 207, a second fluid supply manifold 205 and a second fluid discharge manifold 206 which correspond to the oxidizing gas supply manifold 4, oxidizing gas discharge manifold 5, fuel gas supply manifold 7 and fuel gas discharge manifold 6, respectively, of the cell stack 1. The first and second fluid supply manifolds 204, 205 are connected to first and second fluid feed pipes 251, 253, respectively, via through holes defined in the end plate 203A. The first and second fluid discharge manifolds 207, 206 are connected to first and second fluid discharge pipes 252, 254, respectively, via through holes defined in the end plate 203B. Unlike the cell stack 1, the cell laminate 302 is not provided with a cooling water supply manifold nor a cooling water discharge manifold.

The total enthalpy heat exchange cells 202 each include a fake MEA 243 and a first separator 210 and a second separator 220 which sandwich the fake MEA 243 therebetween. The fake MEA 243 has the same configuration as the MEA 43 of the cell stack 201 except that the anode 42B and the cathode 42A of the MEA 43 of the cell stack 201 are omitted from the fake MEA 243. Therefore, the fake MEA 243 has a solid polymer electrolyte membrane similar to the MEA 43 of the cell stack 201. It should however be noted that the solid polymer electrolyte membrane of the fake MEA 243 functions as a total enthalpy heat exchange membrane.

The first and second separators 210, 220 are constructed similarly to the cathode-side separator 10 and anode-side separator 20 of the cell stack 201 except that the separators 210, 220 do not have cooling water passages on their back faces (outer faces). Accordingly, first fluid inlet manifold apertures 211, 221, first fluid outlet manifold apertures (not shown), second fluid inlet manifold apertures 212, 222, and second fluid outlet manifold apertures (not shown) are formed on the peripheries of the first separator 210 and the second separator 220, respectively. The first fluid inlet manifold aperture 211 and the second fluid inlet manifold aperture 212 are located on the opposite sides of the upper part of the first separator 210. The first fluid inlet manifold aperture 221 and the second fluid inlet manifold aperture 222 are defined on the opposite sides of the upper part of the second separator 220. The first fluid outlet manifold apertures and the second fluid outlet manifold apertures are defined on the opposite sides of the lower part of the first separator 210 and the opposite sides of the lower part of the second separator 220 respectively. The first fluid outlet manifold apertures are located under the second fluid inlet manifold apertures 212, 222. The second fluid outlet manifold apertures are located under the first fluid inlet manifold apertures 211, 221. Similarly to the cathode-side separator 10, a passage for the first fluid (hereinafter referred to as "first fluid passage") 217 is formed on the front face (inner face) of the first separator 210 so as to connect the first fluid inlet manifold aperture 211 to the first fluid outlet manifold apertures. Similarly to the anode-side separator 20, a passage for the second fluid (hereinafter referred to as "second fluid passage") 228 is formed on the front face (inner face) of the second separator 220 so as to connect the second fluid inlet manifold aperture 221 to the second fluid outlet manifold apertures. Defined in the periphery of the fake MEA 243 are a first fluid inlet manifold aperture (not shown), a first fluid outlet manifold aperture (not shown), a second fluid inlet manifold aperture (not shown) and a second fluid outlet manifold aperture (not shown) which correspond to the first fluid inlet manifold apertures 211, 221, first fluid outlet manifold apertures (not shown), second fluid inlet manifold apertures 212, 222 and second fluid outlet manifold apertures (not shown) of the first and second separators 210, 220, respectively.

The first fluid inlet manifold apertures, first fluid outlet manifold apertures, second fluid inlet manifold apertures and second fluid outlet manifold apertures of the fake MEAs 243, fist separators 210 and second separators 220 of all the total enthalpy heat exchange cells 202 are respectively connected, whereby the first fluid supply manifold 204, the first fluid discharge manifold 207, the second fluid supply manifold 205 and the second fluid discharge manifold 206 are respectively formed. It should be noted that the first separator 210 and the second separator 220 may be formed as one separator.

The anode-side total enthalpy heat exchanger 117 has a first total enthalpy heat exchange cell stack 301A and a second total enthalpy heat exchange cell stack 301B that are each constituted by the total enthalpy heat exchange cell stack 301.

In the first total enthalpy heat exchange cell stack 301A, the first fluid supply manifold 204, the first fluid passage 217 and the first fluid discharge manifold 207 constitute the upstream part of the supply-side fuel gas passage 117a of the anode-side total enthalpy heat exchanger 117, whereas the second fluid supply manifold 206, the second fluid passage 228 and the second fluid discharge manifold 205 constitute the discharge-side fuel gas passage 117b of the anode-side total enthalpy heat exchanger 117. The first fluid feed pipe 251 constitutes a portion 109a of the fuel gas supply passage 109 on the side of the fuel gas supply apparatus 102 and the first fluid discharge pipe 252 is connected to the inlet of the first fluid supply manifold of the second total enthalpy heat exchange cell stack 301B described later. The second fluid feed pipe 254 constitutes a portion 110a of the fuel gas discharge passage 110 on the side of the fuel cell 101 and the second fluid discharge pipe 253 constitutes a portion 110b of the fuel gas discharge passage 110 on the side of the atmosphere.

In the second total enthalpy heat exchange cell stack 301B, the first fluid supply manifold 204, the first fluid passage 217 and the first fluid discharge manifold 207 constitute the downstream part of the supply-side fuel gas passage 117a of the anode-side total enthalpy heat exchanger 117, whereas the second fluid supply manifold 206, the second fluid passage 228 and the second fluid discharge manifold 205 constitute the cooling water passage 117c of the anode-side total enthalpy heat exchanger 117. The first fluid feed pipe 251 constitutes the first fluid discharge pipe 252 of the first total enthalpy heat exchange cell stack, whereas the first fluid discharge pipe 252 constitutes a portion 109b of the fuel gas supply passage 109 on the side of the fuel cell 101. The second fluid feed pipe 254 constitutes a portion of the split-flow passage 112a of the cooling water circulation passage 112 which portion is on the side of the fuel cell 101, whereas the second fluid discharge pipe 253 constitutes a portion of the split-flow passage 112a of the cooling water circulation passage 112 which portion is on the side of the radiator 105.

The anode-side total enthalpy heat exchanger 117 of the above structure is designed such that, in the first total enthalpy heat exchange cell stack 301A, the fuel gas to be supplied to the fuel cell 101 (hereinafter referred to "supply fuel gas") is fed to the first fluid supply manifold 204 and the fuel gas discharged from the fuel cell 101 (hereinafter referred to as "discharge fuel gas") is fed to the second fluid manifold 206. In each total enthalpy heat exchange cell 202, a total enthalpy heat exchange (an exchange of both heat and moisture) is made between the supply fuel gas flowing in the first fluid passage 217 and the discharge fuel gas flowing in the second fluid passage 228 through the polymer electrolyte membrane 41, so that the supply fuel gas is humidified and heated by the discharge fuel gas. In the second total enthalpy heat exchange cell stack 301B, the supply fuel gas, which has undergone the total enthalpy heat exchange in the first total enthalpy heat exchange cell stack, is fed to the first fluid supply manifold 204, and the cooling water discharged from the fuel cell 101 (hereinafter referred to as "discharge cooling water") is fed to the second fluid manifold 206. In each total enthalpy heat exchange cell 202, a total enthalpy heat exchange is made between the supply fuel gas flowing in the first fluid passage 217 and the discharge cooling water flowing in the second fluid passage 228 through the polymer electrolyte membrane 41, so that the supply fuel gas, which has undergone the total enthalpy heat exchange in the first total enthalpy heat exchange cell stack 301A, is further humidified and heated by the discharge cooling water which has passed through the fuel cell 101, rising in temperature. Then, the supply fuel gas thus humidified and heated is fed to the fuel cell 101.

Next, the configuration of the cathode-side total enthalpy heat exchanger 118 will be described. The cathode-side total enthalpy heat exchanger 118 has basically the same configuration as that of the anode-side total enthalpy heat exchanger 117. Specifically, the cathode-side total enthalpy heat exchanger 118 has a third total enthalpy heat exchange cell stack 301c and a fourth total enthalpy heat exchange cell stack 301D, each cell stack consisting of the total enthalpy heat exchange cell stack 301 shown in FIGS. 8, 9. In the third total enthalpy heat exchange cell stack 301C, the first fluid feed pipe 251 constitutes a portion 107a of the oxidizing gas supply passage 107 on the side of the oxidizing gas supply apparatus 103. And, the first fluid supply manifold 204, the first fluid passage 217 and the first fluid discharge manifold 207 constitute the upstream part of the supply-side oxidizing gas passage 118a of the cathode-side total enthalpy heat exchanger 118 and the first fluid discharge pipe 252 is connected to the inlet of the first fluid supply manifold 204 of the fourth total enthalpy heat exchange cell stack 301D. The second fluid feed pipe 254 constitutes a portion 11a of the oxidizing gas discharge passage 111 on the side of the fuel cell 101. The second fluid supply manifold 206, the second fluid passage 228 and the second fluid discharge manifold 205 constitute a discharge-side oxidizing gas passage 118b of the cathode-side total enthalpy heat exchanger 118. The second fluid discharge pipe 254 constitutes a portion 111b of the oxidizing gas discharge passage 111 on the side of the atmosphere.

In the fourth total enthalpy heat exchange cell stack 301D, the first fluid supply manifold 204, the first fluid passage 217 and the first fluid discharge manifold 207 constitute the downstream part of the supply-side oxidizing gas passage 118a of the cathode-side total enthalpy heat exchanger 118, whereas the second fluid supply manifold 206, the second fluid passage 228 and the second fluid discharge manifold 205 constitute the cooling water passage 118c of the cathode-side total enthalpy heat exchanger 118. The first fluid feed pipe 251 constitutes the first fluid discharge pipe 252 of the third total enthalpy heat exchange cell stack 301C, whereas the first fluid discharge pipe 252 constitutes a portion 107b of the oxidizing gas supply passage 107 on the side of the fuel cell 101. The second fluid feed pipe 254 constitutes a portion of the split-flow passage 112b of the cooling water circulation passage 112 which portion is on the side of the fuel cell 101, whereas the second fluid discharge pipe 253 constitutes a portion of the split-flow passage 112a of the cooling water circulation passage 112 which portion is on the side of the radiator 105.

The cathode-side total enthalpy heat exchanger 118 of the above structure is designed such that, in the first total enthalpy heat exchange cell stack 301C, the oxidizing gas to be supplied to the fuel cell 101 (hereinafter referred to "supply oxidizing gas") is fed to the first fluid supply manifold 204 and the oxidizing gas discharged from the fuel cell 101 (hereinafter referred to as "discharge oxidizing gas") is fed to the second fluid manifold 206. In each total enthalpy heat exchange cell 202, a total enthalpy heat exchange is made between the supply oxidizing gas flowing in the first fluid passage 217 and the discharge oxidizing gas flowing in the second fluid passage 228 through the polymer electrolyte membrane 41, so that the supply oxidizing gas is humidified and heated by the discharge oxidizing gas. In the fourth total enthalpy heat exchange cell stack 301D, the supply oxidizing gas, which has undergone the total enthalpy heat exchange in the third total enthalpy heat exchange cell stack, is fed to the first fluid supply manifold 204, and the discharge cooling water discharged from the fuel cell 101 is fed to the second fluid manifold 206. In each total enthalpy heat exchange cell 202, a total enthalpy heat exchange is made between the supply oxidizing gas flowing in the first fluid passage 217 and the discharge cooling water flowing in the second fluid passage 228 through the polymer electrolyte membrane 41, so that the supply oxidizing gas, which has undergone the total enthalpy heat exchange in the third total enthalpy heat exchange cell stack, is further humidified and heated by the discharge cooling water which has passed through the fuel cell 101, rising in temperature. Then, the supply oxidizing gas thus humidified and heated is fed to the fuel cell 101.

It should be noted that in the following description, the supply fuel gas and the supply oxidizing gas are sometimes generically called "supply reactive gas" and the discharge fuel gas and the discharge oxidizing gas are sometimes generically called "discharge reactive gas".

Next, the characteristic configuration of the invention will be explained.

With reference to FIGS. 1 to 3, the distinctive point of the invention will be described below. The reactive gas is humidified so as to have a relative humidity of 100% in relation to the temperature of the fuel cell 101 (and more particularly, in relation to the corresponding dew-point temperature described later) and then fed to the fuel cell 101. In this specification, the dew point temperature into which the total amount of moisture of the reactive gas is converted is referred to as "corresponding dew-point temperature". Such a concept is introduced into this invention in order to define the total amount of moisture that exists in the reactive gas in states including the case where the relative humidity of the reactive gas exceeds 100% so that the moisture of the reactive gas takes the form of mist. It should be noted that, in this specification, the condition where water in liquid form is thermodynamically able to exist in the reactive gas is called "over-humidification state" and the condition where the relative humidity of the reactive gas is 100% and water in liquid form is not thermodynamically able to exist in the reactive gas is called "full humidification state". By humidifying the reactive gas as described earlier, the regions of the fuel cell 101 in which an electrochemical reaction for power generation (hereinafter referred to as "power generation reaction") occurs are kept in a state where they are entirely humidified to a relative humidity of 100% or more (i.e., full humidification or over-humidification). Thereby, the chemical deterioration of the polymer electrolyte contained in the polymer electrolyte membrane 41, the anode 42B and the cathode 42A is prevented, which leads to an improvement in the service life of the fuel cell 101. As the polymer electrolyte membrane of the fuel cell, a perfluorocarbon sulfonic acid material is used. This polymer electrolyte membrane elicits ion conductivity when it contains moisture. Therefore, this invention implements an operation method which is capable of maintaining the atmosphere of the full humidification or over-humidification over the entire area of the regions of the fuel cell 101 where the power generation reaction occurs, without impairing the efficiency of the fuel cell power generation system 100.

[Findings that Bring About the Present Invention]

The inventors prepared fuels cells that had the configurations shown in FIGS. 1 to 7 and included separators specially made for temperature measurements. They measured the distribution of temperatures in the regions where the power generation reaction actually occurred when operating these fuel cells. The fuel gas and the oxidizing gas were humidified using bubblers instead of the total enthalpy heat exchangers. Herein, the regions where the power generation reaction occurs (hereinafter referred to as "power generation regions" in some cases) are the anode 42B and the cathode 42A.

Figure 10:
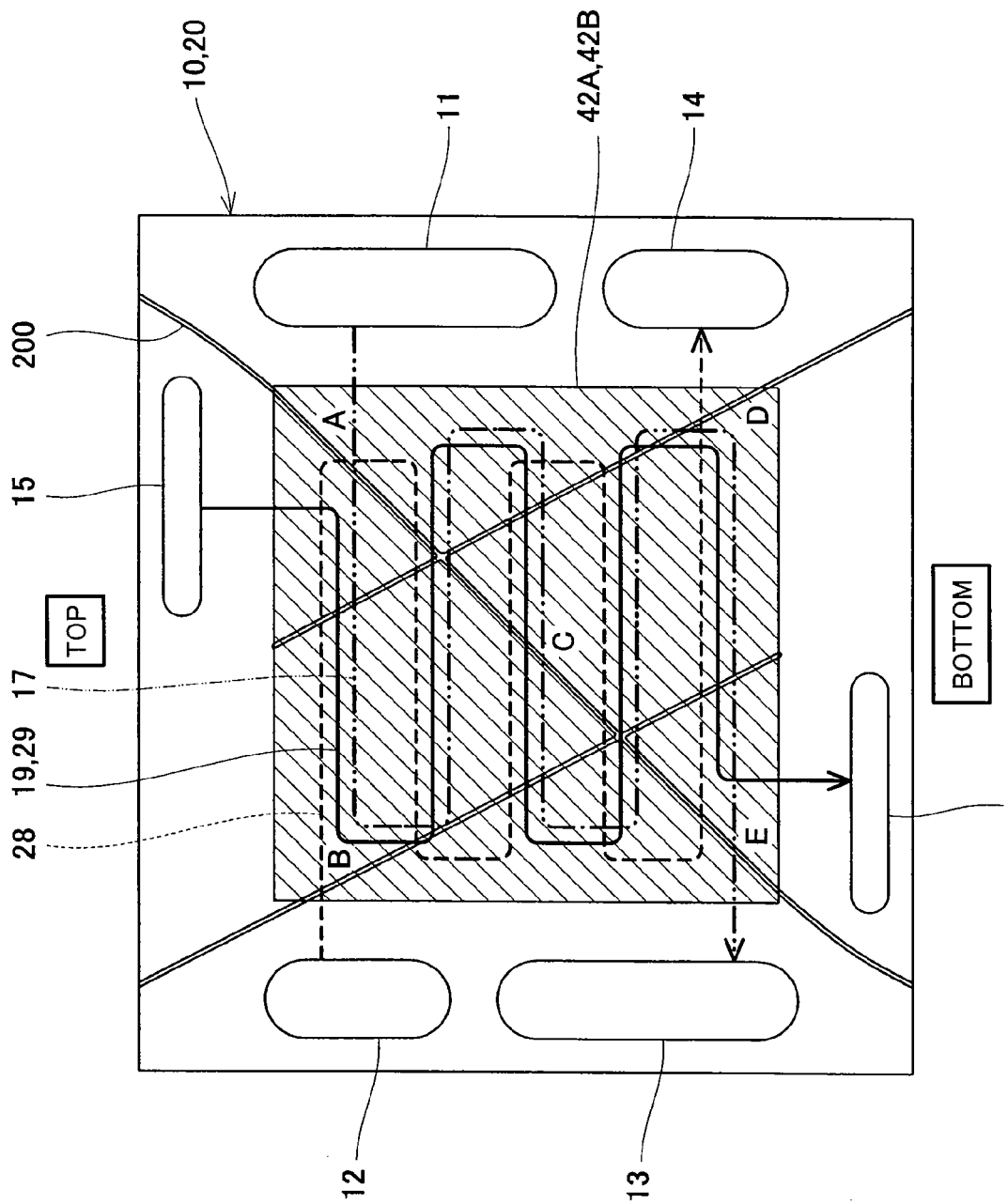
FIG. 10 is a diagrammatic view showing a structure of a separator used for measuring the distribution of temperatures in a cell stack.

FIG. 10 is a diagrammatic view showing a structure of a separator used for measuring a temperature distribution of a cell stack. In FIG. 10, the cathode-side separator 10 and the anode-side separator 20 when viewed in the thickness-wise direction of the cells are perspectively depicted. The passages 17, 19, 28 and 29 of the separators 10, 20, each comprising a plurality of passages are respectively represented by a single line.

As shown in FIG. 10, the cathode-side separator 10 and the anode-side separator 20 are each provided with a small-diameter hole 200 that is formed in parallel with the main face. The hole 200 extends from the end face of each separator 10 (20) to its center or alternatively penetrates through the separator 10 (20) in an oblique direction, extending from one end face to the opposite end face through the center. A thermocouple is inserted in the hole 200 to an appropriate depth to measure temperatures at five positions A to D in each separator 10 (20). The measuring position C is the center of each separator 10 (20) in a plan view. The measuring positions A, B, D, E are within the region of the separator 10 (20) where the cathode 42A and the anode 42B overlap each other in a plan view. In a plan view, the measuring positions A, B, D, E are close to the oxidizing gas inlet manifold aperture 11, the fuel gas inlet manifold aperture 12, the oxidizing gas outlet manifold aperture 13 and the fuel gas outlet manifold aperture 14, respectively. The measuring positions A to E are aligned in this order from the upstream side to the downstream side along the cooling water passages 19, 29 in a plan view of the separators 10, 20.

After examining the result of the temperature distribution measurements, the inventors found the following fact.

Figure 11:
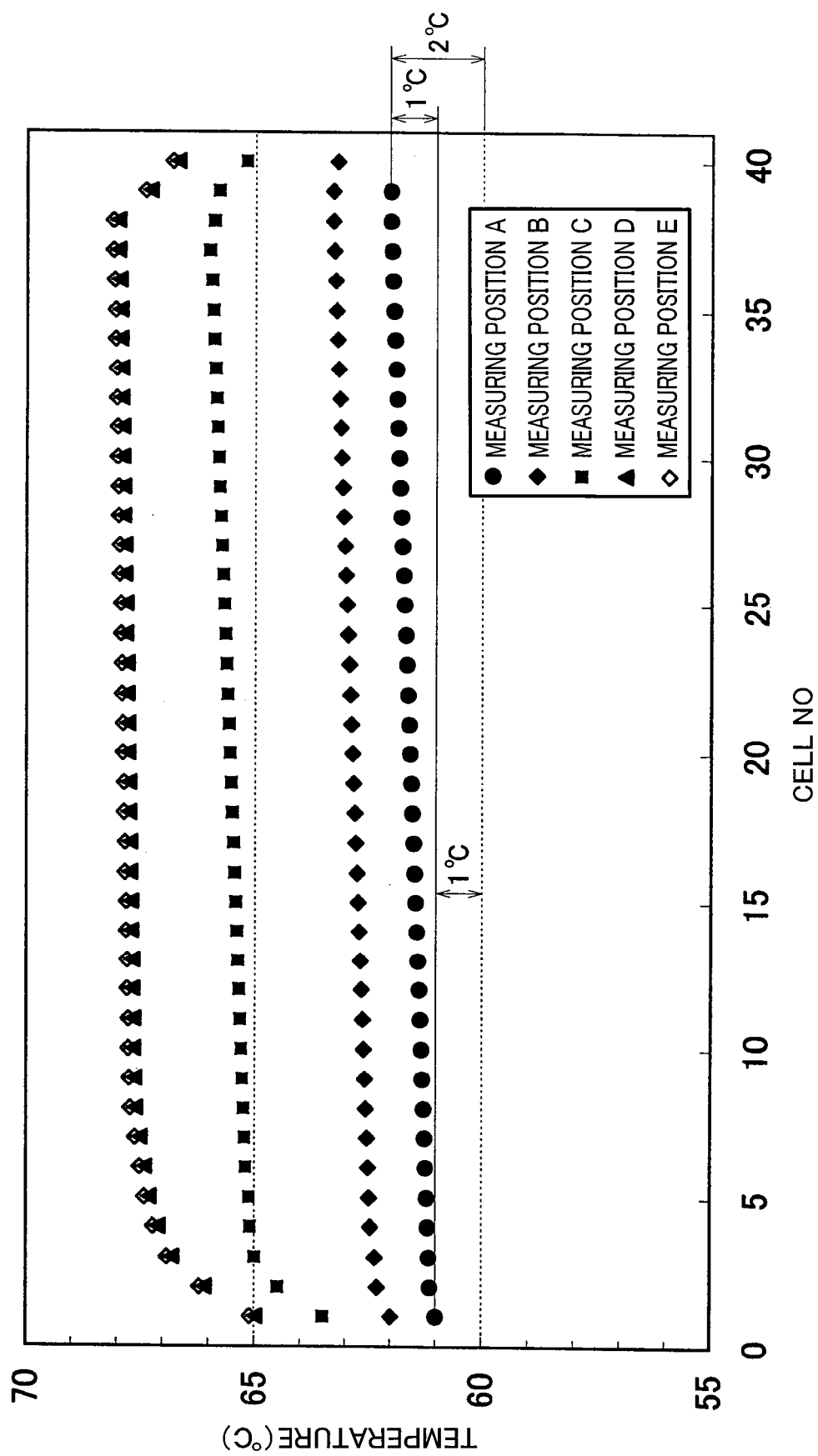
FIG. 11 is a graph showing a temperature distribution of the cell stack when cooling is done for each cell.

FIG. 11 is a graph showing a temperature distribution of the cell stack when cooling is done for each cell. In FIG. 11, Cell No. is plotted on the abscissa whereas the temperature of the cell stack is plotted on the ordinate. The black circle symbol represents a temperature at the measuring position A of each separator 10, 20 shown in FIG. 10. The black diamond symbol represents a temperature at the measuring position B of each separator 10, 20 shown in FIG. 10. The black square symbol represents a temperature at the measuring position C of each separator 10, 20 shown in FIG. 10. The black triangle symbol represents a temperature at the measuring position D of each separator 10, 20 shown in FIG. 10. The white diamond symbol represents a temperature at the measuring position E of each separator 10, 20 shown in FIG. 10. Cell No. is allocated to each of the cells 2 in the order of their positions closer to the cooling water inlet 401 (the outer opening of the through hole of the end plate 3A shown in FIG. 2) of the cell stack 1. In the measurement example shown in FIG. 11 (corresponding to Test No. 1 of FIG. 27 described later), the number of cells in the cell stack 1 is forty.

Referring to FIG. 11, the temperatures in the cells 2 are distributed so as to increase along the cooling water passages 19, 29 toward the downstream side. This is not surprising. Since the cooling water is supplied to the cell stack 1 while controlling the temperature of the cooling water so as to be 60° C. at the cooling water inlet 401 of the cell stack 1 in this temperature measurement, the temperature of the cooling water increases by about 1° C. before the cooling water reaches the regions (which are the anode 42B and the cathode 42A, and more precisely, the regions opposed to each other with the separator 10 (20) held therebetween) where the power generation reaction occurs in the cell 2 (Cell No. 1) closest to the inlet 401, after flowing into the cell stack 1 through the inlet 401. The cell 2 larger in cell number has higher temperature. That is, the cell 2 further from the cooling water inlet 401 of the cell stack 1 has higher temperature. The difference in temperature between the cell 2 (Cell No. 1) closest to the cooling water inlet 401 of the cell stack 1 and the cell 2 (Cell No. 39) that is the second furthest from the inlet 401 was found to be about 1° C. These phenomena are unexpected and totally novel findings to the inventors.

Referring to FIGS. 2, 3 and 10, after supplied to the cell stack 1, the cooling water is distributed, at the cooling water supply manifold 8, to the cooling water passages 19, 29 provided for every specified number of cells (for every cell in this embodiment). After flowing in the cooling water passages 19, 29, the cooling water gathers in the cooling water discharge manifold 9 and is then discharged to the outside of the cell stack 1 through the cooling water discharge manifold 9. In this process, the cooling water, which has entered the cell stack 1, once flows into the cooling water supply manifold 8 and while flowing within the cooling water supply manifold 8, the cooling water exchanges heat with the fuel cell 101 (cell stack 1). Therefore, the cooling water has higher temperature when it reaches each cell 2 than when it is at the inlet 401 of the cell stack 1. In addition, the cooling water supply manifold 8 has an upstream end and a downstream end that are aligned in the stacking direction of the cell stack 1 and the cooling water flows from the upstream end to the downstream end in heat exchange with the cell stack 1, so that the part of the cell stack 1 in the vicinity of the upstream end of the cooling water supply manifold 8 is thought to be higher in temperature than the part of the cell stack 1 in the vicinity of the downstream end of the cooling water supply manifold 8. The fact that both ends of the cell stack 1 are lower in temperature than other parts as shown in FIG. 1I is due to the heat dissipation of the end plates. The same is applied to FIG. 12 described later.

The above-described phenomena mean that if the temperature of the cooling water at the inlet to the cell stack 1 (hereinafter referred to as "cooling water inlet temperature") is the same as the corresponding dew-point temperature of the reactive gas supplied to the cell stack 1, the temperature of the cell stack 1 in the power generation regions becomes about 1° C. or more higher than the cooling water inlet temperature. Therefore, converting it into the dew-point, the reactive gas dries by about 1° C. In view of this, all the regions of the cell stack 1 where the power generation reaction occurs cannot be actually kept in a fully humidified or over-humidified condition, unless the corresponding dew-point temperature of the reactive gas to be supplied is made at least 1° C. higher than the cooling water inlet temperature. Taking account of the temperature difference between the cells 2, it is more desirable to make the corresponding dew-point temperature of the reactive gas to be supplied at least 2° C. higher than the cooling water inlet temperature. Otherwise, all the regions of the cell stack 1 where the power generation reaction occurs cannot be kept in the atmosphere of full humidification or over-humidification. It should however be noted that since the temperature difference between the ends of the cell stack 1 varies depending on the number N of cells in the cell stack 1, it is preferable in view of this to make the corresponding dew-point temperature T1 of the reactive gas at the inlet to the cell stack 1 (hereinafter referred to as "inlet corresponding dew-point temperature T1") at least (1° C.+0.02° C.×(N−1)) higher than the cooling water inlet temperature (hereinafter represented by T2). The detail of this will be explained later.

Since the fuel gas is consumed by the power generation reaction in the anode, the ratio of the amount of moisture to the total amount of fuel gas (hereinafter referred to as "the moisture content ratio of the fuel gas") is smaller in the area closer to the upstream end of the fuel gas passage 28 and larger in the area closer to the downstream end of the same. That is, the corresponding dew-point temperature of the fuel gas increases from the upstream end toward the downstream end in the fuel gas passage 28. On the other hand, water is generated by the power generation reaction also in the cathode and the ratio of the amount of moisture to the total amount of oxidizing gas (hereinafter referred to as "the moisture content ratio of the oxidizing gas") is smaller in the area closer to the upstream end of the oxidizing gas passage 17 and larger in the area closer to the downstream end of the same. That is, the corresponding dew-point temperature of the oxidizing gas increases from the upstream end toward the downstream end in the oxidizing gas passage 18. Regarding the cooling water, as it flows from the cooling water inlet to the cooling water outlet, the amount of heat exchanged between the cooling water and the cell stack 1 increases. Therefore, the cooling water in each cell 2 has a temperature distribution according to which the cooling water increases in temperature from the cooling water inlet to the cooling water outlet.

In each cell (more precisely, in each separator 10 (20)), the most upstream parts of the reactive gas passages 17, 28 where the ratio of the amount of moisture to the total amount of reactive gas (fuel gas and oxidizing gas) (hereinafter this ratio is referred to as "the moisture content ratio of the reactive gas") is the lowest are made to overlap the most upstream parts of the cooling water passages 19, 29 where the temperature of the cooling water is the lowest, when viewed in the thickness-wise direction of the cell 2. In addition, the most downstream parts of the reactive gas passages 17, 28 where the moisture content ratio of the reactive gas is the highest are made to overlap the most downstream parts of the cooling water passages 19, 29 where the temperature of the cooling water is the highest, when viewed in the thickness-wise direction. Thereby, when viewing in the thickness-wise direction of the cell 2, the most upstream parts of the cooling water passages 19, 29 become coincident with the parts of the reactive gas passages 17, 28 where the corresponding dew-point temperature is the lowest and the most downstream parts of the passages 19, 29 become coincident with the parts of the passages 17, 28 where the corresponding dew-point temperature is the highest. As the result, a temperature gradient is so formed in each cell 2 that temperature increases from substantially the most upstream ends of the cooling water passages 19, 29 toward the most downstream ends of the cooling water passages 19, 29 when viewed in the thickness direction of the cell 2, whereas the reactive gas flows from the most upstream ends of the cooling water passages 19, 29 toward the most downstream ends of the same when viewed macroscopically (as a whole). Accordingly, in the reactive gas passages 17, 28, the corresponding dew-point temperature of the reactive gas is distributed so as to increase, together with temperature, from the most upstream end to the most downstream end, whereby the relative humidity of the reactive gas can be kept substantially constant in the passages 17, 28. If the reactive gas satisfies the full humidification or over-humidification condition (i.e., the corresponding dew-point temperature is higher than the temperature of the cell stack 1) at the inlet (inlet manifold apertures 11, 12) to the cell 2 (more precisely, each separator 10, 20), the full humidification or over-humidification condition is established over the entire length of the passages 17, 28, so that all the regions where the power generation reaction of the cell stack 1 occurs can be kept in the atmosphere of full humidification or over-humidification. It should be understood that the above-described arrangement in which "the most upstream parts of the reactive gas passages 17, 28 are located at substantially the same position as the most upstream parts of the cooling water passages 19, 29 when viewed in the thickness-wise direction of the cell 2 and the most downstream parts of the reactive gas passages 17, 28 are located at substantially the same position as the most downstream parts of the cooling water passages 19, 29 when viewed in the thickness-wise direction of the cell 2" is called "the reactive gas temperature rising gradient arrangement" in the invention.

In principle, it is impossible to humidify and heat the supply fuel gas and the supply oxidizing gas utilizing the exhaust heat of the fuel cell 101 like the present embodiment such that the corresponding dew-point temperatures of the supply fuel gas and the supply oxidizing gas become higher than the temperature (hereinafter referred to as "cooling water outlet temperature) of the cooling water at the outlet (the outer opening of the through hole of the end plate 3B shown in FIG. 2) 402 of the cell stack 1. However, if the above configuration is employed, the corresponding dew-point temperature of the reactive gas to be supplied to the fuel cell 101 is allowed to be lower than the cooling water outlet temperature so that it becomes possible in principle to humidify and heat the supply fuel gas and the supply oxidizing gas utilizing the exhaust heat of the fuel cell 101.

It should be understood that, since the amount of water to be generated by the reaction is dependent on current density and the flow rates of the fuel gas and oxidizing gas at their outlet of the cell stack 1 on a dry gas basis are dependent on the utilization factor of the fuel gas (Uf) and the utilization factor of the oxidizing gas (Uo) respectively, it is calculated from current density and the utilization factors of the fuel gas and the oxidizing gas what temperature ΔT should be in order to cause the full humidification or over-humidification over the entire area (i.e., all the regions where the power generation reaction occurs) of the surfaces of the electrodes (the anode 42B and the cathode 42A), where (the cooling water outlet temperature T3)−(the cooling water inlet temperature T2)=ΔT. However, since there simultaneously occur between the anode 42B and the cathode 42A the phenomenon in which water moves from the anode 42B side to the cathode 42A side, accompanying the movement of protons caused by the reaction and the phenomenon called "back diffusion" in which the generated water moves from the cathode 42A side to the anode 42B side, the corresponding dew-point temperatures of the total moisture of the anode 42B and the total moisture of the cathode 42A, which are calculated from current density and the utilization factors of the fuel gas and the oxidizing gas, slightly differ from their actual values.

Therefore, the following measurement was made. Specifically, when the cooling water inlet temperature was set to 60° C. and the fuel gas and oxidizing gas both having a corresponding dew-point temperature of 64° C. and a gas temperature of 64° C. (relative humidity=100%) were supplied taking account of the rise in temperature caused by the heat exchanges at the fuel gas supply manifold 5 and the oxidizing gas supply manifold 4 and others, a measurement was made to obtain the corresponding dew-point temperatures of the fuel gas and oxidizing gas at their outlets of the cell stack 1 (hereinafter referred to as "outlet corresponding dew-point temperature"). As a result, where steam reforming gas was used as the fuel gas, current density was 0.2 A/cm², the utilization factor (Uf) of the fuel gas was 75% and the utilization factor (Uo) of the oxidizing gas was 50%, it was found from the actual measurement that the outlet corresponding dew-point temperature of the fuel gas was 79° C. and the outlet corresponding dew-point temperature of the oxidizing gas was 72.5° C., while the outlet corresponding dew-point temperatures of the fuel gas and the oxidizing gas on a calculation basis being 75.8° C. and 73.6° C., respectively. This has proved that unless ΔT is 12.5° C. or less, the entire area of the electrode surfaces cannot be kept in the full humidification or over-humidification condition.

Where current density was 0.07 A/cm², the utilization factor (Uf) of the fuel gas was 70% and the utilization factor (Uo) of the oxidizing gas was 45% in the above-described fuel cell 101, the actual outlet corresponding dew-point temperatures of the fuel gas and the oxidizing gas were found to be 82° C. and 71° C., respectively, while the calculated outlet corresponding dew-point temperatures of the total moisture of the fuel gas and the total moisture of the oxidizing gas being 75.4° C. and 73.1° C., respectively. In this case, it is understood that unless ΔT is 11° C. or less, the full humidification or over-humidification cannot be established over the entire area of the electrode surfaces. There is such a tendency that as current density increases, the outlet corresponding dew-point temperatures of the fuel gas and the oxidizing gas become closer to each other and that as the difference between the outlet corresponding dew-point temperatures of the fuel gas and the oxidizing gas increases, it becomes difficult to increase ΔT, because the cooling wager outlet temperature has to be limited to a value equal to or lower than the lower one of the outlet corresponding dew-point temperatures of the fuel gas and the oxidizing gas. From this, it was found to be ideal that the outlet corresponding dew-point temperature of the total moisture of the fuel gas is equal to the outlet corresponding dew-point temperature of the total moisture of the oxidizing gas.

It was supposed that in the fuel cell 101 described above, the cooling water inlet temperature was set to 66° C.; the fuel gas and oxidizing gas both having a corresponding dew-point temperature of 70° C. (relative humidity=100%) were supplied; steam reforming gas was used as the fuel gas; current density was 0.7 A/cm²; the utilization factor (Uf) of the fuel gas was 75%; and the utilization factor (Uo) of the oxidizing gas was 50%. Where the outlet corresponding dew-point temperatures of the fuel gas and the oxidizing gas were equal to each other under the above condition, they were found to be about 79° C. on a calculation basis. Even in this case, it was found that unless ΔT was 13° C. or less, the full humidification or over-humidification could not be established over the entire area of the electrode surfaces. In this situation, the outlet corresponding dew-point temperature can be increased, by increasing the utilization factor (Uo) of the oxidizing gas. For instance, when the utilization factor (Uo) of the oxidizing gas was made to be 60% under the same condition as just mentioned above, the outlet corresponding dew-point temperature became about 80° C.; and when the utilization factor (Uo) of the oxidizing gas was made to be 70% under the same condition, the outlet corresponding dew-point temperature became about 81° C. However, it was found to be necessary to set ΔT to 15° C. or less in both cases.

When the reactive gas is humidified and heated making efficient use of the exhaust heat of the fuel cell 1101 like the present embodiment in the fuel cell power generation system 100, it is impossible in principle to humidify or heat the reactive gas so as to have a corresponding dew-point temperature higher than the cooling water outlet temperature. Therefore, it is beneficial, in view of easy humidification and heating of the reactive gas, to increase $\Delta T$ as much as possible in order to supply the reactive gas having a corresponding dew-point temperature 2° C. higher than the cooling water inlet temperature based on the above findings. However, there is a limit in increasing $\Delta T$ with the intention of fully humidifying or over-humidifying the entire surface of the electrodes as described earlier. Therefore, in reality, it is desirable for the full humidification or over-humidification over the entire electrode surface in any cases to limit $\Delta T$ to about 10° C. or less in the light of the temperature fluctuation range (e.g., ±2° C.) of the temperature control performed in the actual fuel cell power generation system 100.

In addition, it has been found that when the reactive gas to be fed to the fuel cell 101 is humidified and heated making efficient use of the exhaust heat of the fuel cell 101 in the fuel cell power generation system 100, the relationship of $T2 \leq T1 \leq T3$ (T3 represents the cooling water outlet temperature) is established provided that the reactive gas passages are formed in the above-described "reactive gas temperature rising gradient arrangement" and specified conditions (e.g., reactive gas temperature before humidification/heating and heat exchange efficiency) are further satisfied.

Where the corresponding dew-point temperature of the reactive gas at the outlet of the cell stack 1 (hereinafter referred to as "outlet corresponding dew-point temperature") is represented by T4, the moisture corresponding to T4−T3 is discharged as dew drops since the temperature of the reactive gas at the outlet of the cell stack 1 is equal to the cooling water outlet temperature T3. Therefore, when the supply reactive gas is humidified and heated only by a total enthalpy heat exchange between the supply reactive gas and the discharge reactive gas, the heat to be used as latent heat for evaporating dew drops for humidification is additionally needed to carry out effective humidification/heating of the supply reactive gas. The inventors got the idea of utilizing the heat carried by the cooling water (discharge cooling water) discharged from the cell stack 1 as a heat source for generating the heat corresponding to the latent heat, so that the total enthalpy heat exchange can be more efficiently carried out.

The inventors have also found the following fact. When humidifying and heating the supply reactive gas only by the total enthalpy heat exchange between the supply reactive gas and the discharge reactive gas without use of the heat carried by the discharge cooling water (this case corresponds to a fourth embodiment described later), increased efficiency can be obtained by increasing the capacity of the total enthalpy heat exchanger. However, in the case of a practical total enthalpy heat exchanger, the difference (hereinafter referred to as "heat-exchangeable temperature difference") between the outlet temperature T3 of the cooling water and the inlet corresponding dew-point temperature T1 of the reactive gas, which gases are heat-exchangeable, is limited to approximately $T3-T1 \geq 4°$ C.

The inventors have also found that, where the cooling fluid is water, the total enthalpy heat of the supply reactive gas is directly exchangeable with that of the discharge cooling water (this case corresponds to a third embodiment describer later), but the heat exchangeable temperature difference is limited to approximately $T3-T1 \geq 2°$ C. even in this case.

The inventors have also found that, where the supply reactive gas is humidified and heated, utilizing a total enthalpy heat exchange between the supply reactive gas and the discharge reactive gas and utilizing the heat carried by the discharge cooling water as the heat source for the heat corresponding to the latent heat (this case corresponds to the second embodiment), the limit of the heat exchangeable temperature difference is approximately $T3-T1 \geq 2°$ C.

They have also found that, where the supply reactive gas and the discharge reactive gas are humidified and heated by a total enthalpy heat exchange and the supply reactive gas which has been humidified and heated is further subjected to a total enthalpy heat exchange with the discharge cooling water (this case corresponds to the present embodiment), the limit of the heat exchangeable temperature difference can be improved to approximately $T3-T \geq 1°$ C.

Accordingly, it has been proved desirable to satisfy all the operating conditions i.e., $T2 \leq T1 \leq T3$; $T3-T2 \leq 10°$ C.; $T1-T2 \geq 2°$ C.; $T3-T1 \geq 1°$ C. when the reactive gas to be supplied to the fuel cell 101 is humidified and heated by making efficient use of the exhaust heat of the fuel cell 101.

Additional findings are as follows.

When the reactive gas is humidified and heated by use of the exhaust heat of the fuel cell 101, the optimum method needs to be selected depending on the fuel cell power generation system. For instance, when taking the method of humidifying and heating the supply reactive gas through a simple total enthalpy heat exchange between the supply reactive gas and the discharge cooling water, the quality of the heat of the cooling water degrades. Therefore, in cases where heat of the highest possible quality needs to be used in a hot-water supply system etc. like the cogeneration system, it is desirable to choose the method in which the supply reactive gas and the discharge reactive gas are first subjected to a total enthalpy heat exchange and then, the supply reactive gas after the total enthalpy heat exchange further exchanges total enthalpy heat with the discharge cooling water. In cases where the cooling medium is other substances than water (e.g., antifreezing fluids), the total enthalpy heat of the discharge cooling medium cannot be directly exchanged with that of the supply reactive gas. Therefore, it is desirable for such cases to choose the method in which while the supply reactive gas and the discharge reactive gas being subjected to a total enthalpy heat exchange, the supply reactive gas after the total enthalpy heat exchange simply exchanges heat with the discharge cooling water.

After another investigation, they have found the following fact. If the supply fuel gas originally contains a certain amount of moisture like the case where the supply fuel gas is steam reforming gas, it is basically enough to make a total enthalpy heat exchange with the discharge fuel gas. However, in some cases, a fuel gas having higher corresponding dew-point temperature can be supplied by a process according to which the supply fuel gas after subjected to total enthalpy heat exchange is further brought into heat exchange with the discharge cooling water and only the heat of the discharge cooling water is efficiently utilized as the latent heat.

Next, a finding based on another view point will be explained.

If the atmosphere of the full humidification or over-humidification is maintained in all the regions where the power generation reaction occurs, the risk of flooding increases. To solve this, the passage for the reactive gas is so formed as to allow the reactive gas to flow without defying gravity, thereby making efficient use of gravity for discharging generated water and dew condensation water. As the result, flooding can be inhibited.

Since the glass transition temperature of the polymer electrolyte membrane 41 is about 90° C., the cooling water outlet temperature T3 is preferably 90° C. or less in view of the durability and creep resistance of the polymer electrolyte membrane 41. In addition, it was found from the result of the duration test that a more preferable cooling water outlet temperature T3 is 80° C. or less.

In cases where the fuel cell power generation system 100 is used as a home-use cogeneration system, the higher the temperature of the heat source for the supply reactive gas is, the better. However, in view of durability and, more particularly, the decrease of the durability of the polymer electrolyte membrane 41, the heat source preferably has the lowest possible temperature that is not lower than 0° C. When utilizing the heat of the cogeneration system as a hot water supply system, the temperature of the stored hot water is preferably 60° C. or more in view of prevention of the growth of Legionella bacteria in the hot water tank. To obtain stored hot water having a temperature of 60° C. by a heat exchange between the supply hot water and the cooling water, the temperature of the cooling water needs to be about 63° C. However, this cooling water drops in temperature when it exchanges total enthalpy heat or heat with the reactive gas. In view of this, the cooling water outlet temperature T3 needs to be about 3° C. higher. That is, the cooling water outlet temperature T3 is preferably 66° C. or more.

Where steam reforming gas is used as the fuel gas, the corresponding dew-point temperature T1 of the fuel gas is preferably 50° C. or more in view of the CO poisoning resistance properties of the catalyst of the anode.

While the findings described above are associated with cases where cooling is done for each cell, the inventor additionally examined cases where cooling was done for every two cells.

Figure 12:
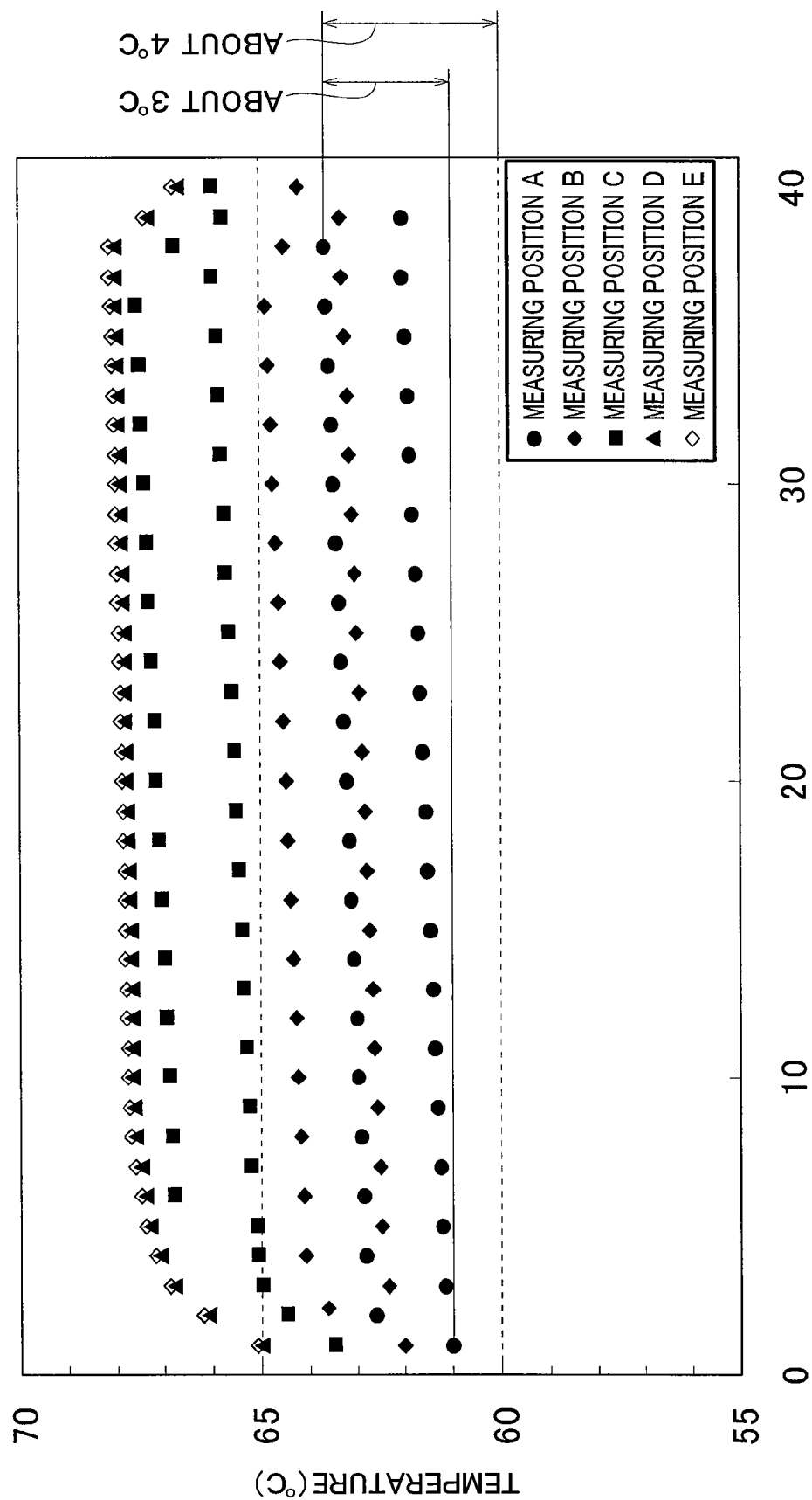
FIG. 12 is a graph showing a temperature distribution of the cell stack when cooling is done for every two cells.

FIG. 12 is a graph showing, according one measurement example, a temperature distribution of the cell stack when cooling is done for every two cells. In FIG. 12, Cell No. is plotted on the abscissa and the temperature of the cell stack is plotted on the ordinate. Measurements of the temperature of the cell stack were made similarly to the cases where cooling was done for each cell. It was found from the examination on the measurements that, in the case of cooling every two cells, the difference between the temperatures of both ends of the cell stack was about 2° C. when current density was about 0.1 A/cm² to 0.3 A/cm². When current density was 0.3 A/cm² or more, the temperature distribution broadened. As seen from FIG. 12, when current density was 0.5 A/cm², the temperature distribution in the stacking direction extended over the range of about 4° C., and when current density was 1.0 A/cm², the temperature distribution in the stacking direction extended over the range of about 6° C. It will be understood from this that when cooling is done for every two cells, even if the fuel cell 101 is used with current density ranging from about 0.1 A/cm² to 0.3 A/cm², all the regions where the power generation reaction occurs cannot be maintained in the atmosphere of the full humidification or over-humidification unless a supply gas having corresponding dew-point temperature that is about 4° C. or more higher than the cooling fluid inlet temperature is supplied.

It should be noted that the temperature difference between both ends of the cell stack varies depending on the number N of cells in the cell stack 1. Taking this into account, it is preferable to make the corresponding dew-point temperature T1 of the reactive gas (3° C.+0.02° C.×(N−1)) or more higher than the cooling water inlet temperature. This will be hereinafter fully explained.

[Examination on Preferable Corresponding Dew-point Temperature T1 for the Reactive Gas]

First of all, there will be explained the case where cooling is done for each cell.

It has been noted, in the above description, that where cooling is done for each cell, the corresponding dew-point temperature T1 is preferably equal to or higher than the cooling water inlet temperature T2+(1° C.+0.02° C.×(N−1)). This will be examined in more detail with reference to additional data.

Figure 20:
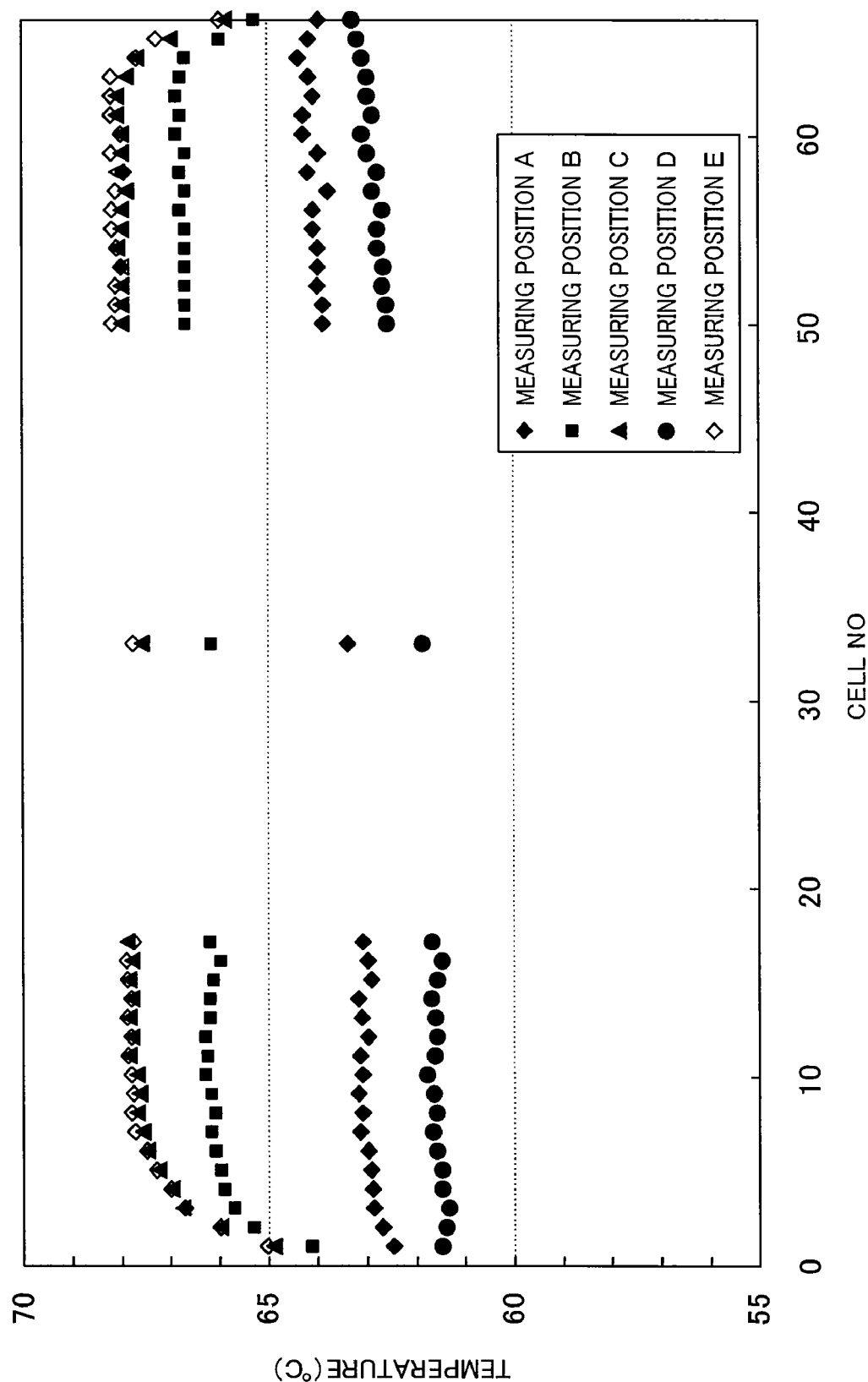
FIG. 20 is a graph showing, according to another measurement example, a temperature distribution of the cell stack where cooling is done for each cell.

FIG. 20 is a graph showing, according to another measurement example, a temperature distribution of the cell stack where cooling is done for each cell.

The measurement example of FIG. 20 is the same as that of FIG. 11 except that the number of cells in the cell stack 1 shown in FIG. 20 is 66. The temperatures of the cells located in the middle of the cell stack 1 are not indicated, because the temperatures of these cells have the same tendency as that of the temperatures of the cells located at both ends of the cell stack 1 and therefore measurement on these cells were skipped.

The measuring conditions for these measurement examples are as follows.

In the measurement examples, the cooling water inlet temperature T2 is 60° C.; the cooling water outlet temperature T3 is 68° C.; and the difference ΔT between the cooling water inlet temperature T2 and the cooling water outlet temperature T3 is 8° C.

The utilization factor Uf of the fuel gas is 75%, whereas the utilization factor Uo of the oxidizing gas is 40%.

Each passage (passage groove) of the oxidizing gas passage 17 has an equivalent diameter of 0.99 mm, whereas each passage (passage groove) of the fuel gas passage 18 has an equivalent diameter of 0.99 mm.

The flow velocity of the fuel gas at the outlet of the passage is 4.4 m/s, whereas the flow velocity of the oxidizing gas at the outlet of the passage is 4.5 m/s.

The pressure loss of the oxidizing gas in the oxidizing gas passage 17 is 4 kPa, whereas the pressure loss of the fuel gas in the fuel gas passage 28 is 6 kPa.

Next, there will be explained the conditional expression which the corresponding dew-point temperature T1 should satisfy.

In FIGS. 11 and 20, the temperatures (unit ° C.) T at the measuring positions A and B are approximated by a straight line based on the cooling water inlet temperature T2 (60° C. in these measurement examples), the straight line being represented by:

$$T = X° \text{ C.} + Y° \text{ C.} \times (N-1)$$

where N is the number of cells.

The temperature difference between both ends of the cell stack is proportional to the difference ΔT between the cooling water outlet temperature T3 and the cooling water inlet temperature T2, and in these measurement examples, ΔT=8° C. Therefore, T can be approximated by a straight line represented by:

$$T = X° \text{ C.} + Y° \text{ C.} \times (N-1) \times \Delta T/8° \text{ C.}$$

Therefore, the conditional expression which the corresponding dew-point temperature T1 should satisfy is:

$$T1 \geq T2 + (X° \text{ C.} + Y° \text{ C.} \times (N-1) \times \Delta T/8° \text{ C.}).$$

This linear approximation can be obtained by statistically processing the measurement data. Examples of the statistical method include the regression method and the method of least squares. Herein, the method of least squares is employed.

The values of the constant X and the coefficient Y in this conditional expression are obtained from the measurement examples shown in FIGS. 11, 20.

FIG. 27 is a table showing the values of the constant X and coefficient Y of the conditional expression together with current density, which conditional expression should be satisfied by the corresponding dew-point temperature T1 when cooling is done for each cell.

In FIG. 27, "cathode" represents that the constant X and coefficient Y are associated with the measurement data obtained at the measuring position A, whereas "anode" represents that the constant X and coefficient Y are associated with the measurement data obtained at the measuring position B. The measuring position A corresponds to the inlet area of the oxidizing gas passage. The measuring position B corresponds to the inlet area of the fuel gas passage. In the present embodiment (the present measurement example), the oxidizing gas supply manifold 4, the fuel gas supply manifold 5 and the cooling fluid supply manifold 8 are formed on the periphery of the upper half (one half) of the cell stack 1 when viewed in the stacking direction of the cells 2. The oxidizing gas discharge manifold 7, the fuel gas discharge manifold 6 and the cooling fluid discharge manifold 9 are formed on the periphery of the lower half (the other half) of the cell stack 1 when viewed in the stacking direction of the cells 2. The oxidizing gas supply manifold 4 is located closer to the cooling fluid supply manifold 8 than the fuel gas supply manifold 5 (see FIG. 2). Therefore, the temperature of the measurement point A corresponding to the inlet area of the oxidizing gas passage is higher than the temperature of the measurement point B corresponding to the inlet area of the fuel gas passage. Therefore, the constant X and the coefficient Y should be obtained for each of the oxidant and fuel gases, whereby the conditional expression that should be satisfied by the corresponding dew-point temperature 1 can be properly set for each of the oxidizing gas and the fuel gas.

In these measurement examples, X ranges from 1.0 to 1.5 and Y ranges from 0.02 to 0.027 in the case of the oxidizing gas (cathode). In the case of the fuel gas (anode), X ranges from 2.0 to 2.5 and Y ranges from 0.02 to 0.023. Therefore, for the reactive gas (the oxidizing gas or the fuel gas), X ranges from 1.0 to 2.5 and Y ranges from 0.02 to 0.027.

Since current density was $0.160 A/cm^2$ (rated) in these two measurement examples, the dependence of the constant X and coefficient Y on the current density could not be confirmed. It is conceivable theoretically as well as on a measurement data basis that the dependence of the constant X and coefficient Y on the number N of cells does not exist. This is also applicable to the following case where cooling is done for every two cells.

Next, the case where cooling is done for every two cells will be discussed.

It has been noted, in the above description, that where cooling is done for every two cells, the corresponding dew-point temperature T1 is preferably equal to or higher than the cooling water inlet temperature $T2+(3° C.+0.02° C.\times(N-1))$. This will be examined in more detail with reference to additional data.

FIGS. 21 to 26 are graphs each showing, according to another measurement example, a temperature distribution of the cell stack where cooling is done for every two cells.

FIGS. 21 to 26 show measurement examples where current density is $0.300 A/cm^2$, where current density is $0.250 A/cm^2$, where current density is $0.160 A/cm^2$ (rated), where current density is $0.116 A/cm^2$, where current density is $0.078 A/cm^2$, and where current density is $0.050 A/cm^2$, respectively.

These measurement examples are the same as the measurement example of FIG. 12 except that the number of cells in the cell stack 1 is 54. The temperatures of the cells located in the middle of the cell stack 1 are not indicated, because the temperatures of these cells have the same tendency as that of the temperatures of the cells located at both ends of the cell stack 1 and therefore measurements on these cells were skipped.

In these measurement examples, Cell No. is allocated to the cells 2 in the order of their positions closer to the cooling water outlet 402 (the outer opening of the through hole of the end plate 3B shown in FIG. 2) of the cell stack 1 (this order is opposite to that of the measurement example shown in FIG. 12). The notation of graphic symbols of FIGS. 21 to 26 differs from that of FIG. 12. More specifically, in FIGS. 21 to 26, the black diamond symbol represents a temperature at the measuring position A of each separator 10, 20 shown in FIG. 10. The black square symbol represents a temperatures at the measuring position B of each separator 10, 20 shown in FIG. 10. The black triangle symbol represents a temperature at the measuring position C of each separator 10, 20 shown in FIG. 10. The black circle symbol represents a temperature at the measuring position D of each separator 10, 20 shown in FIG. 10. The white diamond symbol represents a temperature at the measuring position E of each separator 10, 20 shown in FIG. 10.

The measuring conditions (test conditions) for these measurement examples are as follows.

In all of the measurement examples, the cooling water inlet temperature T2 is 60° C.; the cooling water outlet temperature T3 is 68° C.; and the difference ΔT between the cooling water inlet temperature T2 and the cooling water outlet temperature T3 is 8° C.

Figure 21:
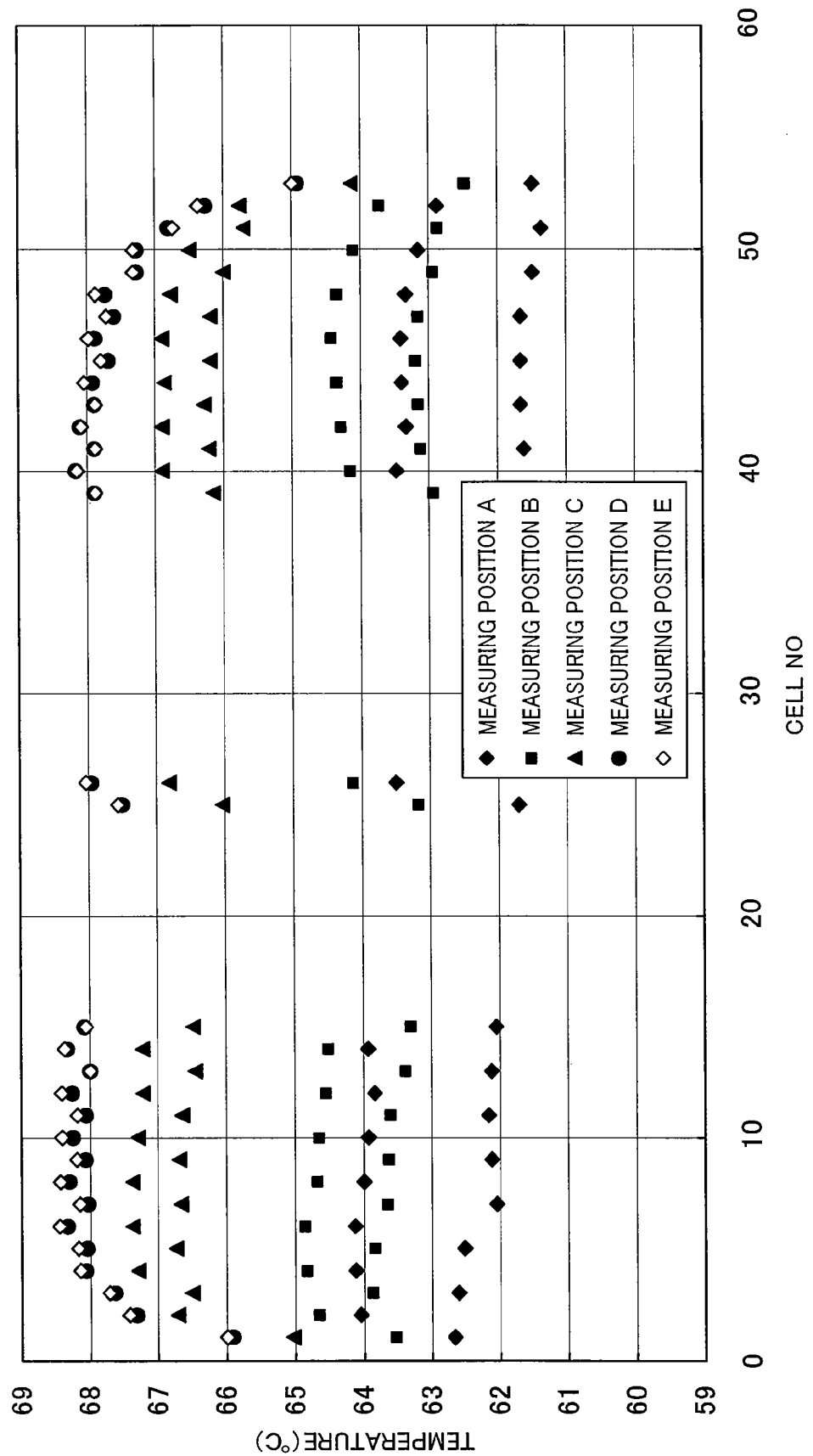
FIG. 21 is a graph showing, according to another measurement example, a temperature distribution of the cell stack where cooling is done for every two cells.
Figure 22:
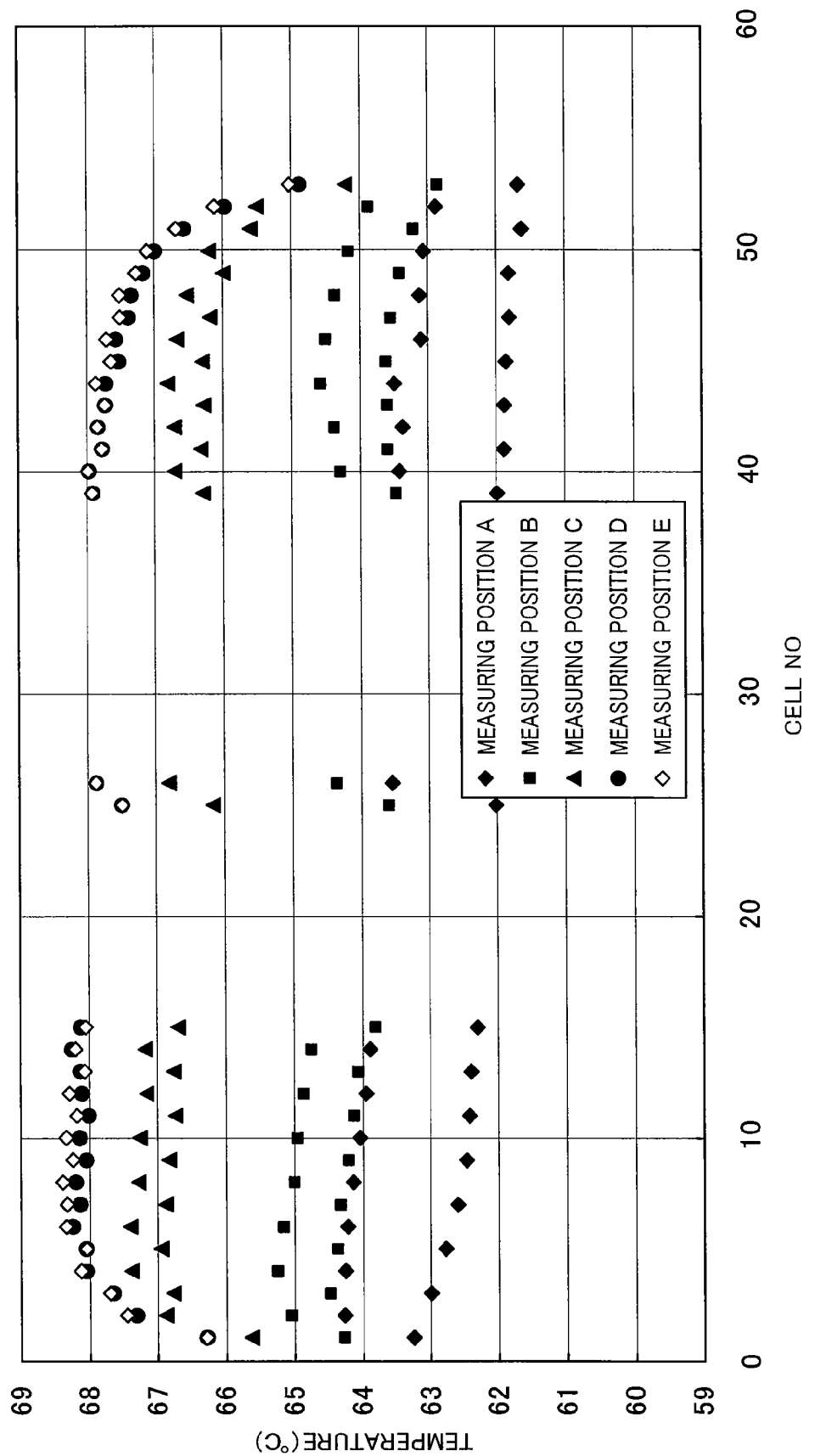
FIG. 22 is a graph showing, according to another measurement example, a temperature distribution of the cell stack where cooling is done for every two cells.
Figure 23:
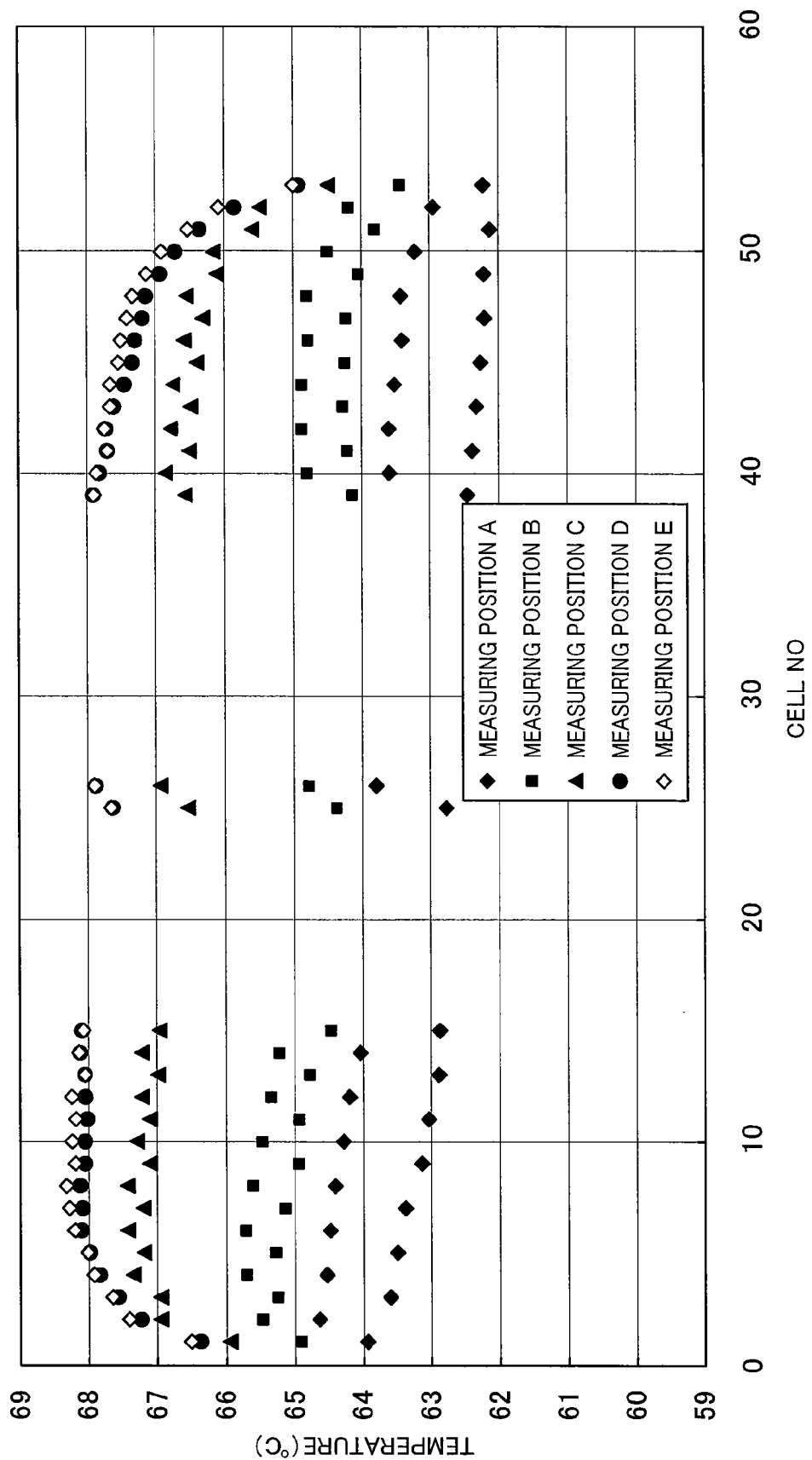
FIG. 23 is a graph showing, according to another measurement example, a temperature distribution of the cell stack where cooling is done for every two cells.
Figure 24:
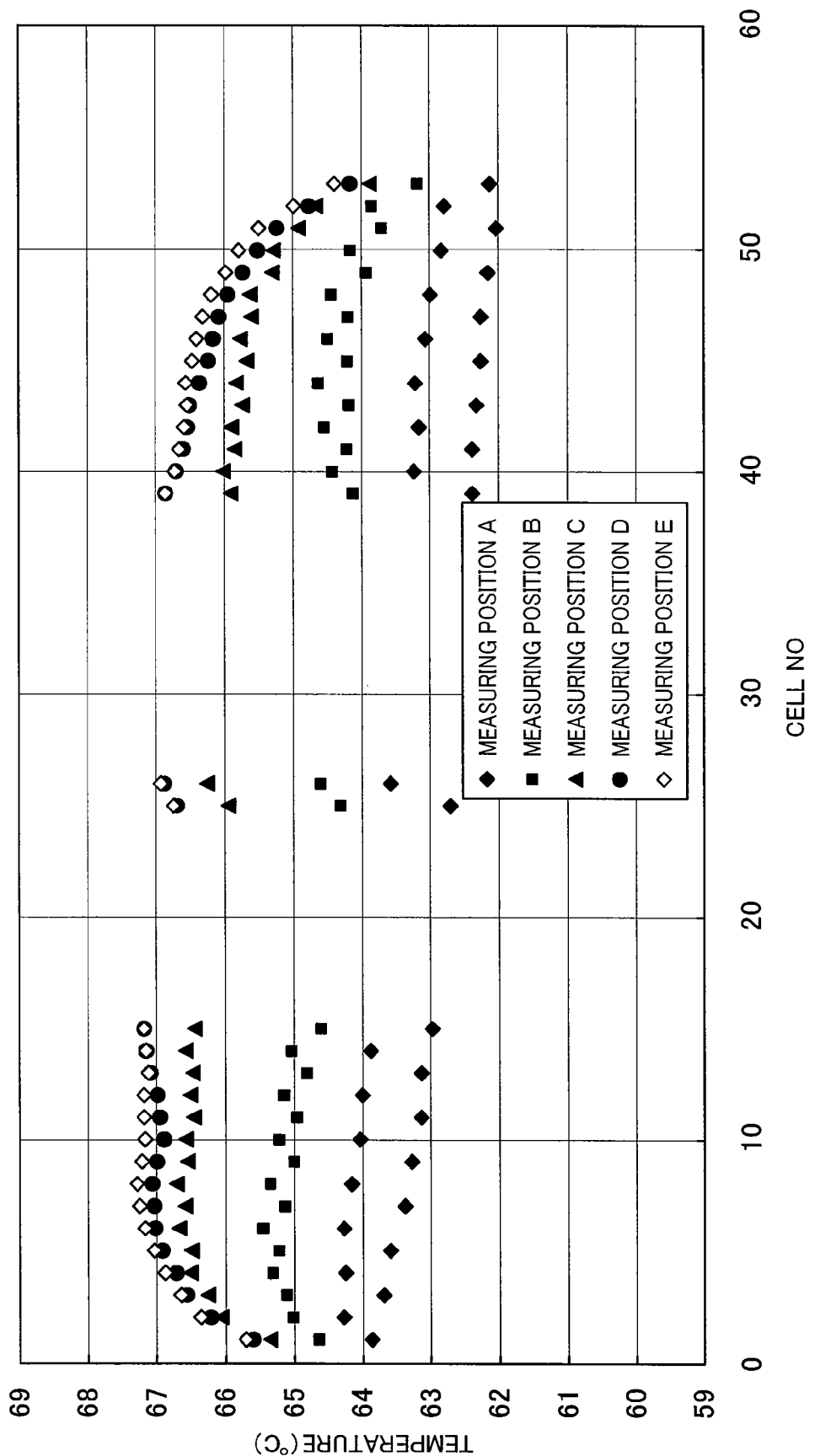
FIG. 24 is a graph showing, according to another measurement example, a temperature distribution of the cell stack where cooling is done for every two cells.
Figure 25:
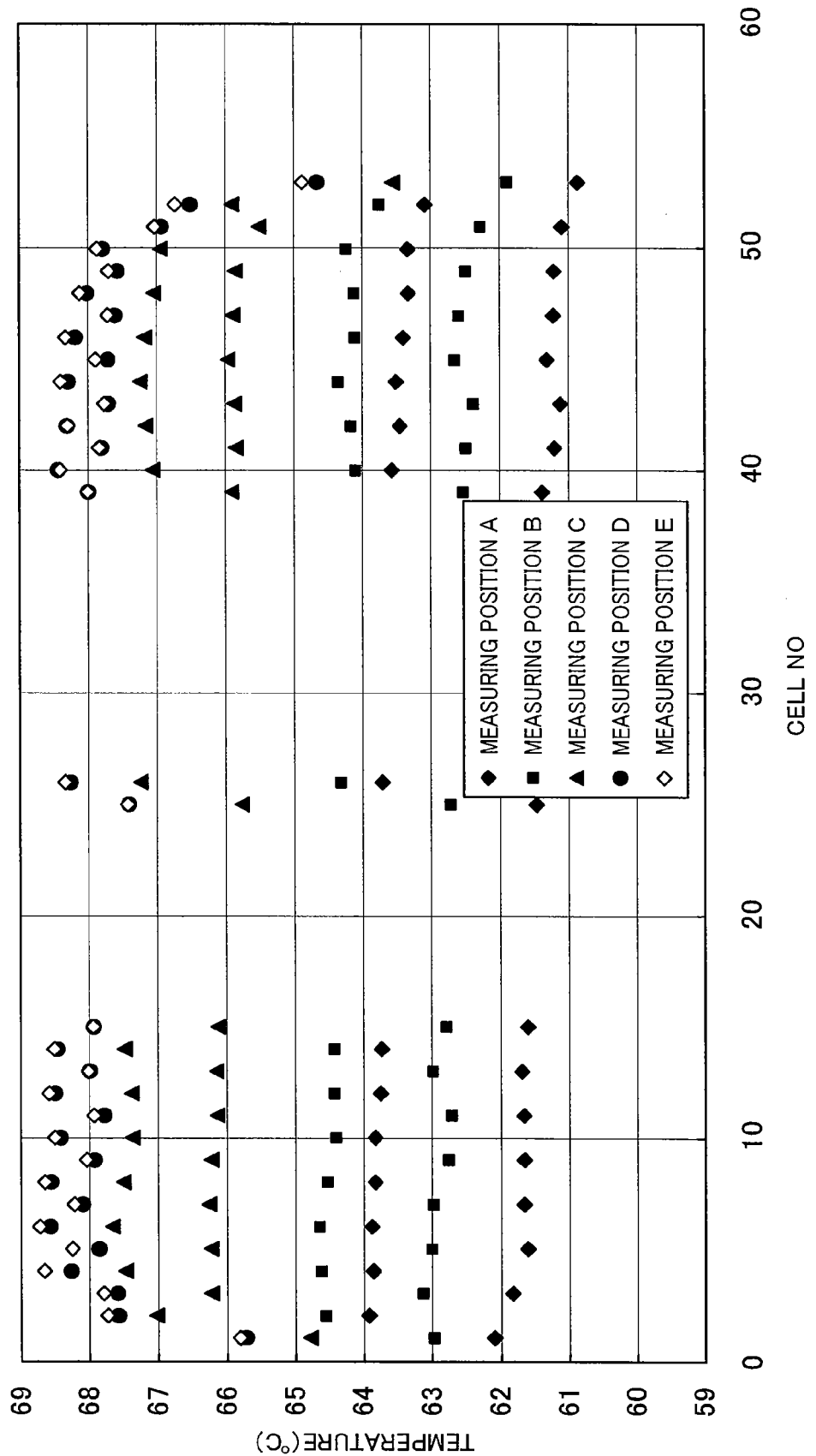
FIG. 25 is a graph showing, according to another measurement example, a temperature distribution of the cell stack where cooling is done for every two cells.
Figure 26:
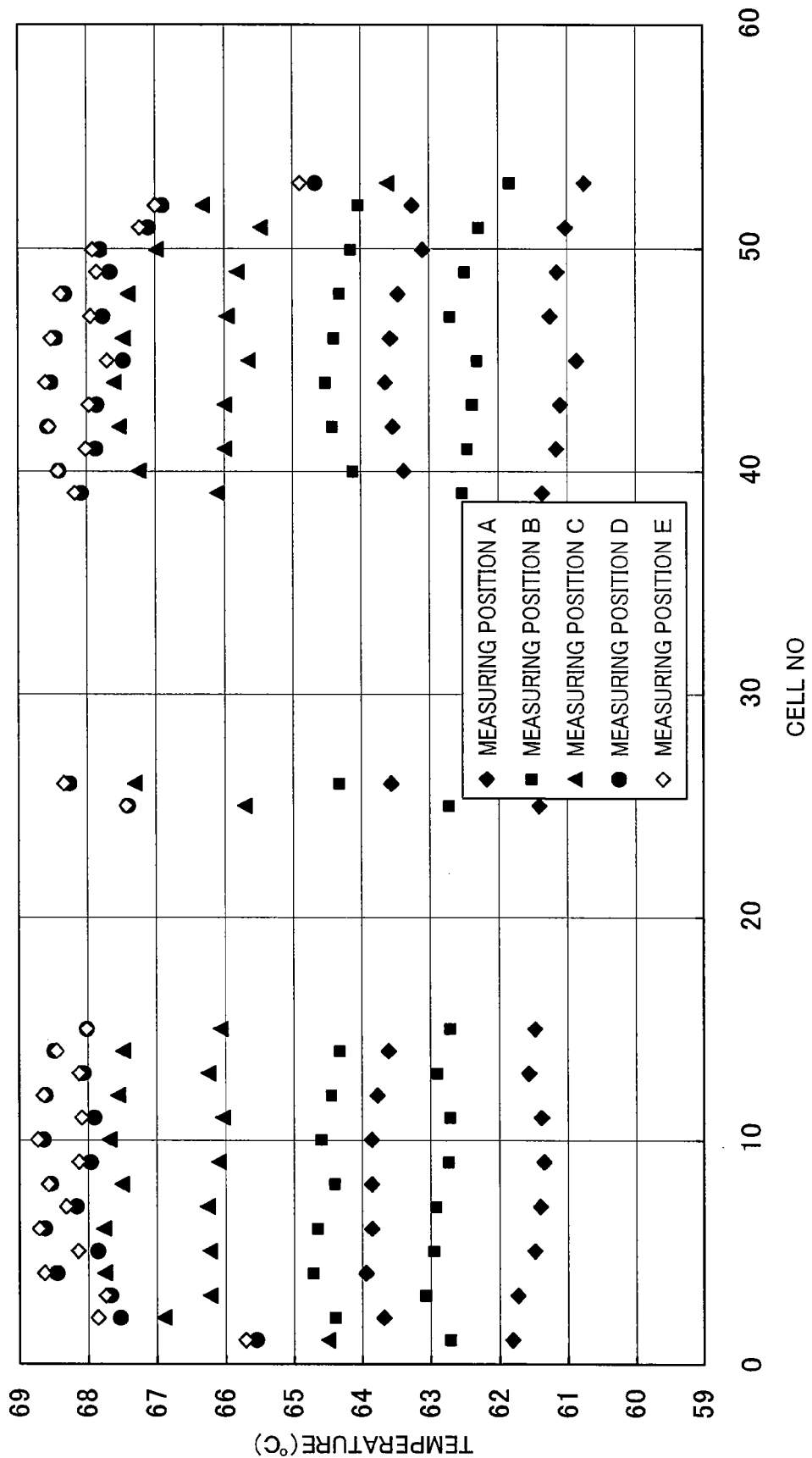
FIG. 26 is a graph showing, according to another measurement example, a temperature distribution of the cell stack where cooling is done for every two cells.

In the measurement examples shown in FIGS. 21 to 23, the utilization factor Uf of the fuel gas is 72.5%, whereas the utilization factor Uo of the oxidizing gas is 52.5%. In the measurement example shown in FIG. 24, the utilization factor Uf of the fuel gas is 72.5%, whereas the utilization factor Uo of the oxidizing gas is 47.5%. In the measurement example shown in FIG. 25, the utilization factor Uf of the fuel gas is 67.5%, whereas the utilization factor Uo of the oxidizing gas is 42.5%. In the measurement example shown in FIG. 26, the utilization factor Uf of the fuel gas is 67.5%, whereas the utilization factor Uo of the oxidizing gas is 42.5%.

In all the measurement examples, the equivalent diameter of each passage (passage groove) of the oxidizing gas passage 17 is 0.99 mm, whereas the equivalent diameter of each passage (passage groove) of the fuel gas passage 28 is 0.99 mm.

In the measurement example shown in FIG. 23, the flow velocity of the fuel gas at the inlet of the passage is 4.4 m/s, whereas the flow velocity of the fuel gas at the outlet of the passage is 2.2 m/s. The flow velocity of the oxidizing gas at the inlet of the passage is 4.26 m/s, whereas the flow velocity of the oxidizing gas at the outlet of the passage is 4.15 m/s. In the measurement example shown in FIG. 21, the flow velocity of the fuel gas at the outlet of the passage is 4.1 m/s, whereas the flow velocity of the oxidizing gas at the outlet of the passage is 7.7 m/s. The flow velocity of the fuel gas at the inlet of the passage and the flow velocity of the oxidizing gas at the inlet of the passage in the measurement example of FIG. 21 can be calculated from the utilization factor Uf of the fuel gas, the utilization factor Uo of the oxidizing gas and current density of each measurement example and the gas flow velocities of the measurement example of FIG. 23. The flow velocity of the fuel gas at the inlet of the passage; the flow velocity of the fuel gas at the outlet of the passage; the flow velocity of the oxidizing gas at the inlet of the passage; and the flow velocity of the oxidizing gas at the outlet of the passage in the measurement examples of FIGS. 22, 24, 25 and 26 can be calculated from the same. Therefore, they are omitted in this specification. Current density in the measurement examples of FIGS. 21 to 26 is as shown in FIG. 28.

In the measurement example of FIG. 21, the pressure loss of the fuel gas and the pressure loss of the oxidizing gas in the cell stack 1 are 13.8 kPa and 11.4 kPa, respectively. In the measurement example of FIG. 22, the pressure loss of the fuel gas and the pressure loss of the oxidizing gas in the cell stack 1 are 11.9 kPa and 9.7 kPa, respectively. In the measurement example of FIG. 23, the pressure loss of the fuel gas and the pressure loss of the oxidizing gas in the cell stack 1 are 9.6 kPa and 6.0 kPa, respectively. In the measurement example of FIG. 24, the pressure loss of the fuel gas and the pressure loss of the oxidizing gas in the cell stack 1 are 5.9 kPa and 4.9 kPa, respectively. In the measurement example of FIG. 25, the pressure loss of the fuel gas and the pressure loss of the oxidizing gas in the cell stack 1 are 4.6 kPa and 3.7 kPa, respectively. In the measurement example of FIG. 26, the pressure loss of the fuel gas and the pressure loss of the oxidizing gas in the cell stack 1 are 3.6 kPa and 2.7 kPa, respectively.

In these measurement examples in which cooling is done for every two cells, the following conditional expression must be satisfied by the corresponding dew-point temperature T1 like the measurement examples in which cooling is done for each cell.

$$T1 \geq T2 + (X° C. + Y° C. \times (N-1) \times \Delta T/8° C.)$$

The measurement data was theoretically processed by the method of least squares similarly to the measurement examples in which cooling was done for each cell.

The values of the constant X and coefficient Y of this conditional expression were obtained from the measurement examples shown in FIGS. 21 to 26.

FIG. 28 is a table showing the values of the constant X and coefficient Y of the conditional expression together with current density, which conditional expression should be satisfied by the corresponding dew-point temperature T1 when cooling is done for every two cells.

In FIG. 28, Test Nos. 1 to 6 indicate the measurement examples of FIGS. 21 to 26, respectively. The meanings of "cathode" and "anode" are the same as those of FIG. 27.

In the measurement examples, X ranges from 2.8 to 3.3 and Y ranges from 0.013 to 0.033 in the case of the oxidizing gas (cathode). In the case of the fuel gas (anode), X ranges from 3.7 to 4.2 and Y ranges from 0.013 to 0.030. Therefore, for the reactive gas (the oxidizing gas or the fuel gas), X ranges from 2.8 to 4.2 and Y ranges from 0.013 to 0.033.

Roughly speaking, as current density increases, the constant X slightly increases and the coefficient Y decreases in these measurement examples. In these measurement examples, since current density is changed to a limit assumable for actual operation, the conditional expression which should be satisfied by the corresponding dew-point temperature T1 can be properly set by selecting appropriate values for the constant X and the coefficient Y from the above ranges in consideration of current density.

[Preferable Flow Velocity of the Reactive Gas and Pressure Loss]

Figure 29:
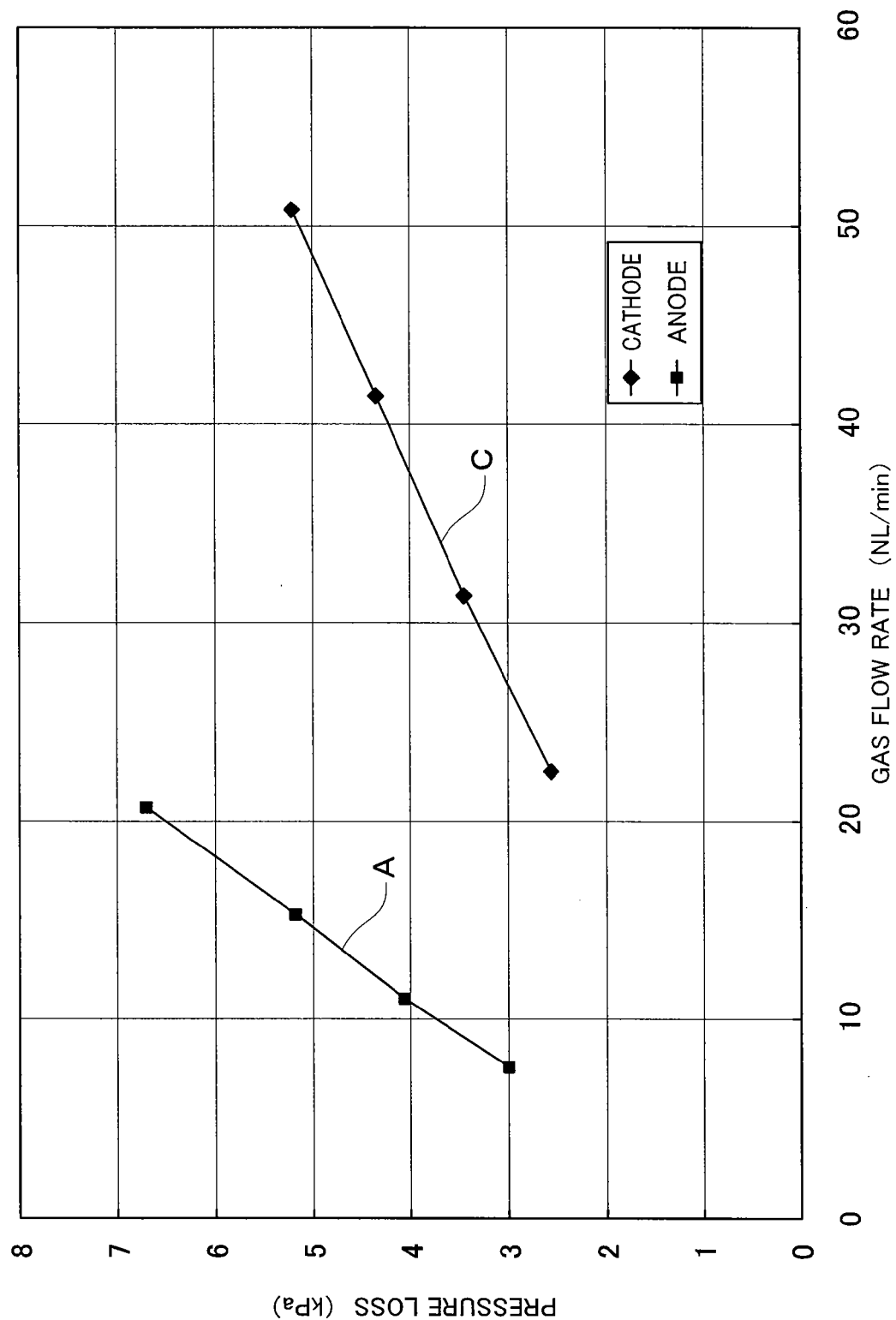
FIG. 29 is a graph showing one example of the relationship between gas flow rate and pressure loss.

FIG. 29 is a graph showing one example of the relationship between gas flow rate and pressure loss.

The cell stack used in this measurement example does not differ from those of the above cases except that the number of cells is 54.

In FIG. 29, "cathode" represents the pressure loss of the oxidizing gas in the cell stack 1, whereas "anode" represents the pressure loss of the fuel gas in the cell stack 1. The graphical symbols on the pressure loss curve C corresponding to "cathode" and on the pressure loss curve A corresponding to "anode" indicate, in the order of increasing gas flow rate, the case where the output is 30% of the rated output, the case where the output is 50% of the rated output, the case where the output is 75% of the rated output, and the case where the output is 100% of the rated output.

Where the output is 30% of the rated output, current density is 0.05 A/cm$^2$, the utilization factor Uf of the fuel gas is 62.5%, and the utilization factor Uo of the oxidizing gas is 37.5%. Where the output is 50% of the rated output, current density is 0.078 A/cm$^2$, the utilization factor Uf of the fuel gas is 67.5%, and the utilization factor Uo of the oxidizing gas is 42.5%. Where the output is 75% of the rated output, current density is 0.116 A/cm$^2$, the utilization factor Uf of the fuel gas is 72.5%, and the utilization factor Uo of the oxidizing gas is 47.5%. Where the output is 100% of the rated output, current density is 0.16 A/cm$^2$, the utilization factor Uf of the fuel gas is 72.5%, and the utilization factor Uo of the oxidizing gas is 52.5%.

As apparent from FIG. 29, the pressure loss of the reactive gas is proportional to the flow rate of the reactive gas. Since the flow rate of the reactive gas is proportional to the flow velocity of the reactive gas, the pressure loss of the reactive gas is proportional to the flow velocity of the reactive gas. As current density increases, the flow velocity of the reactive gas increases and the pressure loss of the reactive gas increases.

The invention is characterized in that the power generation regions 42A, 42B are entirely maintained in the atmosphere of the full humidification or over-humidification. Therefore, if the flow velocity of the reactive gas flowing in the passages 17, 28 located in the power generation regions 42A, 42B is below a specified value, flooding will occur, interfering with power generation.

On the other hand, if the flow velocity of the reactive gas increases, the pressure loss of the reactive gas in the cell stack 1 also increases as seen from FIG. 29, so that the pressure required for supplying the reactive gas (hereinafter referred to as "supply pressure") becomes too great. Therefore, the present embodiment is designed such that the flow velocity (hereinafter referred to as "outlet gas flow velocity" in some cases) of the fuel gas at the outlet (the part connected to the fuel gas outlet manifold aperture 24) of the fuel gas passage 28 is controlled so as to be not less than 1.8 m/s nor more than 4.1 m/s, whereas the flow velocity (hereinafter referred to as "outlet gas flow velocity" in some cases) of the oxidizing gas at the outlet (the part connected to the oxidizing gas outlet manifold aperture 13) of the oxidizing gas passage 17 is controlled so as to be not less than 2.8 m/s nor more than 7.7 m/s.

Of the above lower limits and upper limits, the upper limits were determined based on an empirical rule in the light of the performance of the auxiliary machines (herein, the fuel feeding pump and the oxidizing gas feeding blower) with respect to the pressure supplied by the reactive gas.

Of the above lower limits and upper limits, the lower limits were obtained from an experiment. In this experiment, five types of cell stacks having the same overall structure as that of the cell stacks used in the measurements described earlier were prepared. These five cell stacks were different in the configurations of the fuel gas passage 28 and oxidizing gas passage 17. Whether or not flooding had occurred in these cell stacks was judged in such a way that the utilization factor Uf of the fuel gas, the utilization factor Uo of the oxidizing gas and current density were varied thereby varying the outlet gas flow velocity and pressure loss and then it was determined whether power generation could be stably performed in each cell stack.

Figure 31:
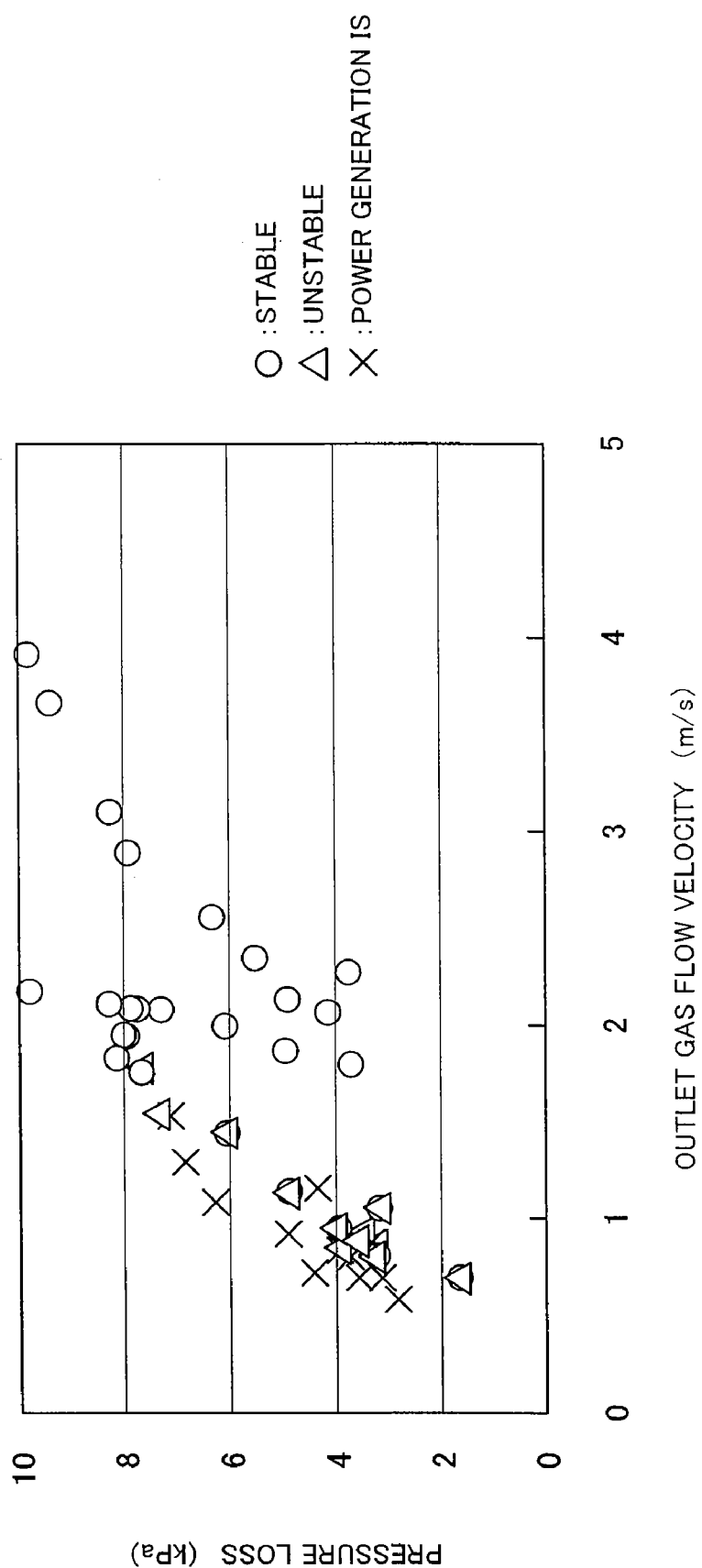
FIG. 31 is a graph showing the relationship between the outlet flow velocity and pressure loss of a fuel gas and the occurrence/non-occurrence of flooding.
Figure 32:
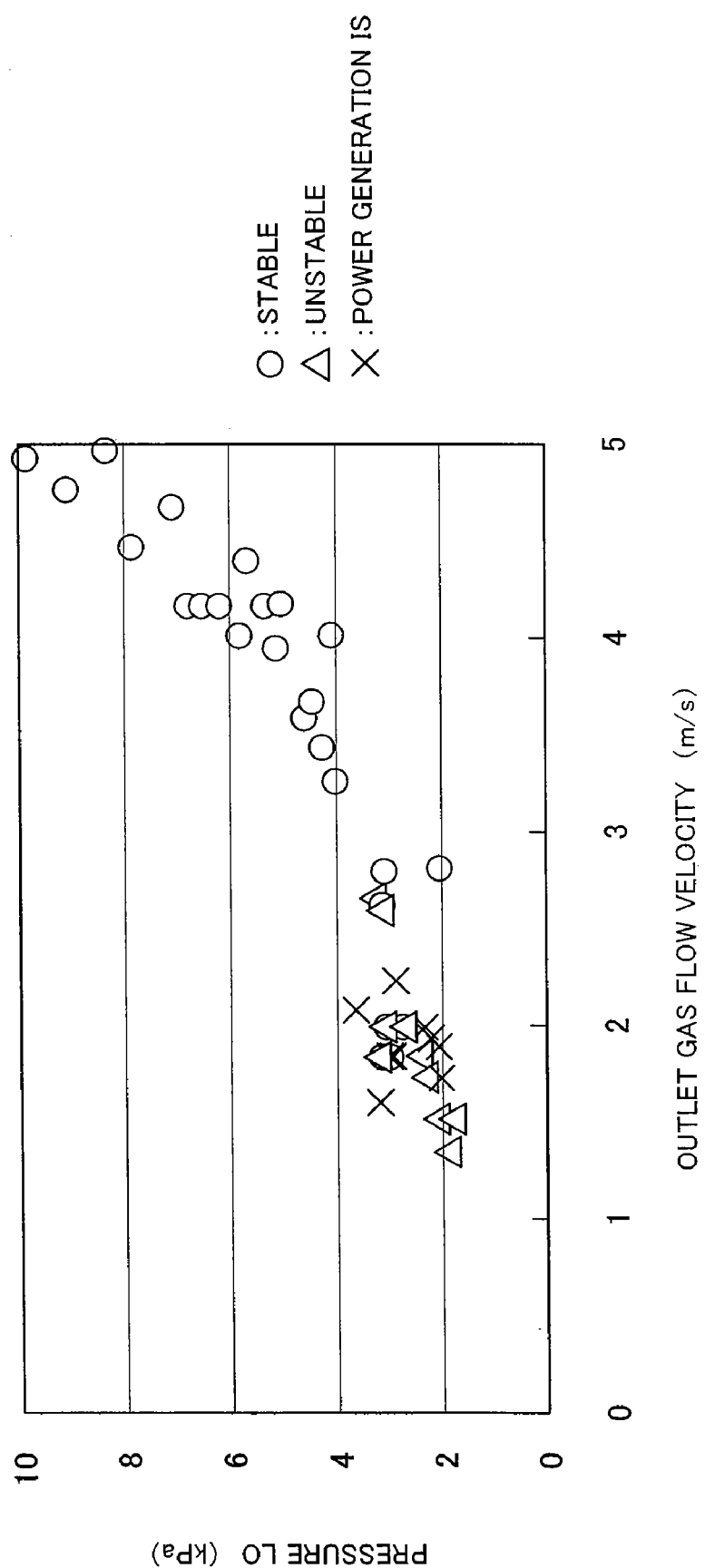
FIG. 32 is a graph showing the relationship between the outlet flow velocity and pressure loss of an oxidizing gas and the occurrence/non-occurrence of flooding.

FIG. 31 is a graph showing the relationship between the outlet flow velocity and pressure loss of the fuel gas and the occurrence/non-occurrence of flooding. FIG. 32 is a graph showing the relationship between the outlet flow velocity and pressure loss of the oxidizing gas and the occurrence/non-occurrence of flooding.

In FIGS. 31, 32, the circle symbol indicates that power generation was stably done, that is, no flooding occurred. The triangle symbol indicates that power generation was unstably done because of occurrence of flooding. The cross symbol indicates that power generation was impossible because of occurrence of flooding.

It is obvious from FIG. 31 that the outlet gas flow velocity of the fuel gas is preferably 1.8 m/s or more. It is obvious from FIG. 32 that the outlet gas flow velocity of the oxidizing gas is preferably 2.8 m/s or more.

In this case, it is a premise that the fuel cell 101 is operated with a fuel gas utilization factor of 60% or more, an oxidizing gas utilization factor of not less than 40% nor more than 80%, and a current density of not less than 0.15 A/cm$^2$ nor more than 0.30 A/cm$^2$. That is, the above gas flow velocity ranges are valid under these operating conditions. It should be noted that the flow velocities of the gases are controlled so as to increase as current density increases.

Concretely, the flow velocities of the fuel gas and the oxidizing gas are controlled in the following way.

The flow velocity of the fuel gas Va is described by:

$$Va = Qa/Sa$$

where Qa is the flow rate of the fuel gas and Sa is the sectional area of the fuel gas passage 28.

Herein, Qa represents the total flow rate of gas obtained by summing up the flow rate of unused oxidizing gas at the outlet of the fuel gas passage 28, the flow rate of gas calculated based on the assumption that all the supplied moisture is vapor and the flow rate of gas calculated based on the assumption that all the moisture generated by the power generation reaction is vapor. The flow rate of the unused fuel gas is obtained by multiplying the flow rate of the supplied fuel gas with the utilization factor of the fuel gas. Sa represents the sectional area of the fuel gas passage 28 located in the vicinity of the outlet and, more particularly, the sum of the sectional areas of the passages (flow grooves). Each passage (flow groove) is so formed as to have an equivalent diameter (i.e., the diameter of a circle equivalent to the sectional area) of not less than 0.78 mm nor more than 1.30 mm.

The flow velocity of the oxidizing gas Vc is described by:

$$Vc = Qc/Sc$$

where Qc is the flow rate of the oxidizing gas and Sc is the sectional area of the oxidizing gas passage 17.

Herein, Qc represents the total flow rate of gas obtained by summing up the flow rate of unused oxidizing gas at the outlet of the oxidizing gas passage 17, the flow rate of gas calculated based on the assumption that all the supplied moisture is vapor and the flow rate of gas calculated based on the assumption that all the moisture generated by the power generation reaction is vapor. The flow rate of the unused oxidizing gas is obtained by multiplying the flow rate of the supplied oxidizing gas with the utilization factor of the oxidizing gas. Sc represents the sectional area of the oxidizing gas passage 17 located in the vicinity of the outlet and, more particularly, the sum of the sectional areas of the passages (flow grooves). Each passage (flow groove) is so formed as to have an equivalent diameter of not less than 0.78 mm nor more than 1.30 mm.

Therefore, the flow velocity Va of the fuel gas and the fuel velocity Vc of the oxidizing gas are controlled by controlling the flow rate of the supply fuel gas, the utilization factor of the fuel gas, the flow rate of the supply oxidizing gas, the unitization factor of the oxidizing gas, and the corresponding dew-point temperature T1 of the fuel gas and the oxidizing gas with the control unit 108.

Next, the pressure loss of the reactive gas will be explained.

In order to prevent flooding, it is desirable to increase the pressure loss of the reactive gas in the reactive gas passages 17, 28. However, if the pressure loss is excessive, the supply pressure of the reactive gas becomes too great.

Therefore, in the present embodiment, the pressure loss of the reactive gas in the cell stack 1 is controlled so as to be not less than 2 kPa nor more than 10 kPa.

Of the above upper limit and lower limit, the upper limit was determined based on an empirical rule in the light of the performance of the auxiliary machines with respect to the pressure supplied by the reactive gas.

Of the above lower limit and upper limit, the lower limit was obtained from the above experiment together with the outlet gas flow rate. It is obvious from FIG. 31 that the pressure loss of the fuel gas in the cell stack is preferably 3.6 kPa or more. It is obvious from FIG. 32 that the pressure loss of the oxidizing gas in the cell stack is preferably 2.0 kPa or more. Therefore, when regarding the fuel gas and the oxidizing gas on a dominant conception basis, i.e., a reactive gas basis, the pressure loss is preferably 2.0 kPa or more.

In the measurement examples of FIGS. 21 and 22, the value of the pressure loss of the reactive gas is out of this preferable range. The reason for this is that special overload operation is performed in order to obtain data on the temperature distribution of the cell stack. Generally, such overload operation is not performed in a cogeneration system.

As has been described above, occurrence of flooding can be prevented by controlling the flow velocity and pressure loss of the reactive gas, while keeping the entire area of the power generation regions 42A, 42B in the atmosphere of full humidification or over-humidification.

[Effective Range for the Rated Power of Fuel Cell]

The above-described examination on the conditional expression that should be satisfied by the corresponding dew-point temperature T1 was done using a fuel cell having a rated power of DC 1.2 kW. However, this result is theoretically applicable to (valid for) other fuel cells of different rated powers. Concretely, it is highly possible to apply the result to fuel cells having a rated power of DC 0.4 kW to 2.4 kW. Further, this result can be made applicable, for instance, to fuel cells having a rated power of up to DC 5 kW by simply increasing the number of cells stacked in the cell stack.

From the above view point, the operating conditions for the fuel cell power generation system are summarized as follows.

It is desirable for the fuel cell power generation system 101 to satisfy the following expression when it is in operation.

$T1 \geq T2+1°$ C. [Operating Condition 1]

Further, it is preferable to satisfy $T1 \geq T2+(X° C.+Y° C. \times (N-1) \times \Delta T/8° C.)$ where X=1 to 2.5 and Y=0.02 to 0.027 [Operating Condition 2].

It is preferable to satisfy $T3-T2 \leq 15°$ C. [Operating Condition 3] and further satisfy $T3-T2 \leq 10°$ C. [Operating Condition 4].

It is preferable to satisfy $T2 \leq T1 \leq T3$ [Operating Condition 5].

It is also preferable to satisfy T3−T1≧1° C. [Operating Condition 6]. It is preferable to satisfy 90° C.≧T3≧66° C. [Operating Condition 7], T1≧50° C. [Operating Condition 8] and 80° C.≧T3≧66° C. [Operating Condition 9].

In the case where cooling is done for every two cells, it is preferable to satisfy T1≧T2+(X° C.+Y° C.×(N−1)×ΔT/8° C.) where X=2.8 to 4.2 and Y=0.013 to 0.033 [Operating Condition 10].

Based on the findings described above, the fuel cell power generation system 100 is configured so as to satisfy [Operating Condition 1] to [Operating Condition 9] in the present embodiment.

More concretely, in the cathode-side separator 10 and the anode-side separator 20 shown in FIGS. 1 to 9, the reactive gas passages 17, 28 and the cooling water passages 19, 29 are formed in "the reactive gas temperature rising gradient arrangement". Humidification and heating of the reactive gas is done by means of the total enthalpy heat exchangers 117, 118, in which the supply reactive gas and discharge reactive gas are humidified and heated through a total enthalpy heat exchange and the supply reactive gas which has been humidified and heated further exchanges total enthalpy heat with the discharge cooling water, whereby the heat exchangeable temperature difference T3−T1 becomes about 1° C. In addition, the maximum cooling capability of the cooling system 104 relative to the maximum heat value of the cell stack 1 is set such that the temperature difference between the cooling water outlet temperature T3 and the cooling water inlet temperature T2 satisfies the requirement T3−T2≦10° C. Then, the temperature of the cooling water is adjusted such that the cooling water outlet temperature T3 satisfies the requirement 80° C.≧T3≧66° C. At that time, the concrete cooling water outlet temperature T3 is determined taking account of the specified output current density of the fuel cell 101. The temperature adjustment of the cooling water is made by the control unit 108 controlling at least either the heat radiation amount of the radiator 105 of the cooling system 104 or the flow rate of the cooling water circulating pump 109. The temperature control of the cooling water is performed by the control unit 108 performing feedback control of the cooling water inlet temperature T2 and the cooling water outlet temperature T3 based on the detection values of the temperature sensors TS1 and TS2 that detect the cooling water inlet temperature T2 and the cooling water outlet temperature T3, respectively.

The passages (passage grooves) of the oxidizing gas passage 17 and the fuel gas passage 28 are formed so as to have an equivalent diameter of 0.78 mm to 1.30 mm or less. The control unit 108 controls the oxidizing gas supply apparatus 103 to feed the oxidizing gas such that the flow velocity of the oxidizing gas in the oxidizing gas passage 17 falls within the range of from 2.8 m/s to 7.7 m/s and the pressure loss of the oxidizing gas in the cell stack 1 is 2 kPa to 10 kPa. The control unit 108 controls the fuel gas supply apparatus 102 to feed the fuel gas such that the flow velocity of the fuel gas in the fuel gas passage 28 falls within the range of from 1.8 m/s to 4.1 m/s and the pressure loss of the fuel gas in the cell stack 1 is 2 kPa to 10 kPa.

Next, the operation of the fuel cell power generation system 100 of the above configuration will be explained. The fuel cell power generation system 100 is operated, being controlled by the control unit 108 and has a start-up mode, operation mode and stop mode. In the start-up mode, a series of specified start-up operations are sequentially performed, thereby smoothly starting the fuel cell power generation system 100. In the operation (power generation operation) mode, normal power generation is performed. In the stop mode, a series of specified stopping operations are performed thereby smoothly bringing the fuel cell power generation system 100 to a stop. In this embodiment, the known operations are performed in the start-up mode and the stop mode. Therefore, a description of these modes is omitted herein and only the operation mode will be explained below.

Referring to FIGS. 1 to 9, in the operation mode, the fuel gas (supply fuel gas) is fed from the fuel gas supply apparatus 102 to the anode 42B of the fuel cell 101. Meanwhile, the oxidizing gas (supply oxidizing gas) is fed from the oxidizing gas supply apparatus 103 to the cathode 42A of the fuel cell 101. Then, the power generation reaction occurs in the anode 42B and the cathode 42A so that electric power and heat (exhaust heat) are generated. The unreacted fuel gas (discharge fuel gas) and oxidizing gas (discharge oxidizing gas), which have not been consumed by the power generation reaction, are discharged from the fuel cell 101. Meanwhile, the fuel cell 101 is cooled by the cooling water circulating in the cooling water circulation passage 112 of the cooling system 104.

In this process, the supply fuel gas exchanges total enthalpy heat with the discharge fuel gas in the anode-side total enthalpy heat exchanger 117 and then exchanges total enthalpy heat with the cooling water (discharge cooling water) that has passed through the fuel cell 101, whereby the fuel gas is humidified and heated such that its corresponding dew-point temperature T1 at the inlet of the fuel cell 101 (i.e., inlet corresponding dew-point temperature) has a specified value.

Meanwhile, the supply oxidizing gas exchanges total enthalpy heat with the discharge oxidizing gas in the cathode-side total enthalpy heat exchanger 118 and then exchanges total enthalpy heat with the discharge cooling water, whereby the oxidizing gas is humidified and heated such that that its inlet corresponding dew-point temperature T1 has a specified value.

The control unit 108 adjusts the cooling water inlet temperature T2 and the cooling water outlet temperature T3 by controlling the heat radiation amount of the radiator 105 of the cooling system 104 and the flow rate of the cooling water circulating pump 106 based on the detection values of the inlet temperature sensor TS1 and the outlet temperature sensor TS2. In this case, the cooling water inlet temperature T2 is determined according to the cooling capacity (heat radiation amount) of the cooling system relative to the heat generation amount of the fuel cell 101, whereas the temperature difference ΔT between the cooling water inlet temperature T2 and the cooling water outlet temperature T3 is determined according to the flow rate of the cooling water. After the cooling water outlet temperature T3 is determined, the inlet corresponding dew-point temperature T1 of the supply fuel gas and the supply oxidizing gas is determined substantially in compliance with the heat exchangeable temperature difference T3−T1 for each of the anode-side total enthalpy heat exchanger 117 and the cathode-side total enthalpy heat exchanger 118. That is, the cooling water outlet temperature T3, the cooling water inlet temperature T2 and the inlet corresponding dew-point temperature T1 of the fuel gas and the oxidizing gas can be controlled by controlling the heat radiation amount of the radiator 105 of the cooling system 104 and the flow rate of the cooling water circulating pump 106 of the cooling system 104. It should be noted that since the amount of exhaust heat of the fuel cell 101 varies according to variations in the output of the fuel cell 101, the control unit 108 performs the above-described temperature control of the cooling water while varying the cooling capacity of the cooling system 104 according to the variations in the amount of exhaust heat. In this way, the fuel cell power generation system 100 is operated, being controlled by the control unit 108 in the operation mode so as to meet [Operating Condition 1] to [Operating Condition 9] described earlier. Thereby, all the regions of the fuel cell 101 where power generation occurs can be kept in the atmosphere of the full humidification or over-humidification. As a result, degradation of the polymer electrolyte membrane 41 of the MEA 43 can be inhibited, which leads to an improvement in the service life of the fuel cell 101.

Next, the effect of the above-described characteristic configuration of the present embodiment will be explained based on the test results of the examples described later.

Figure 13:
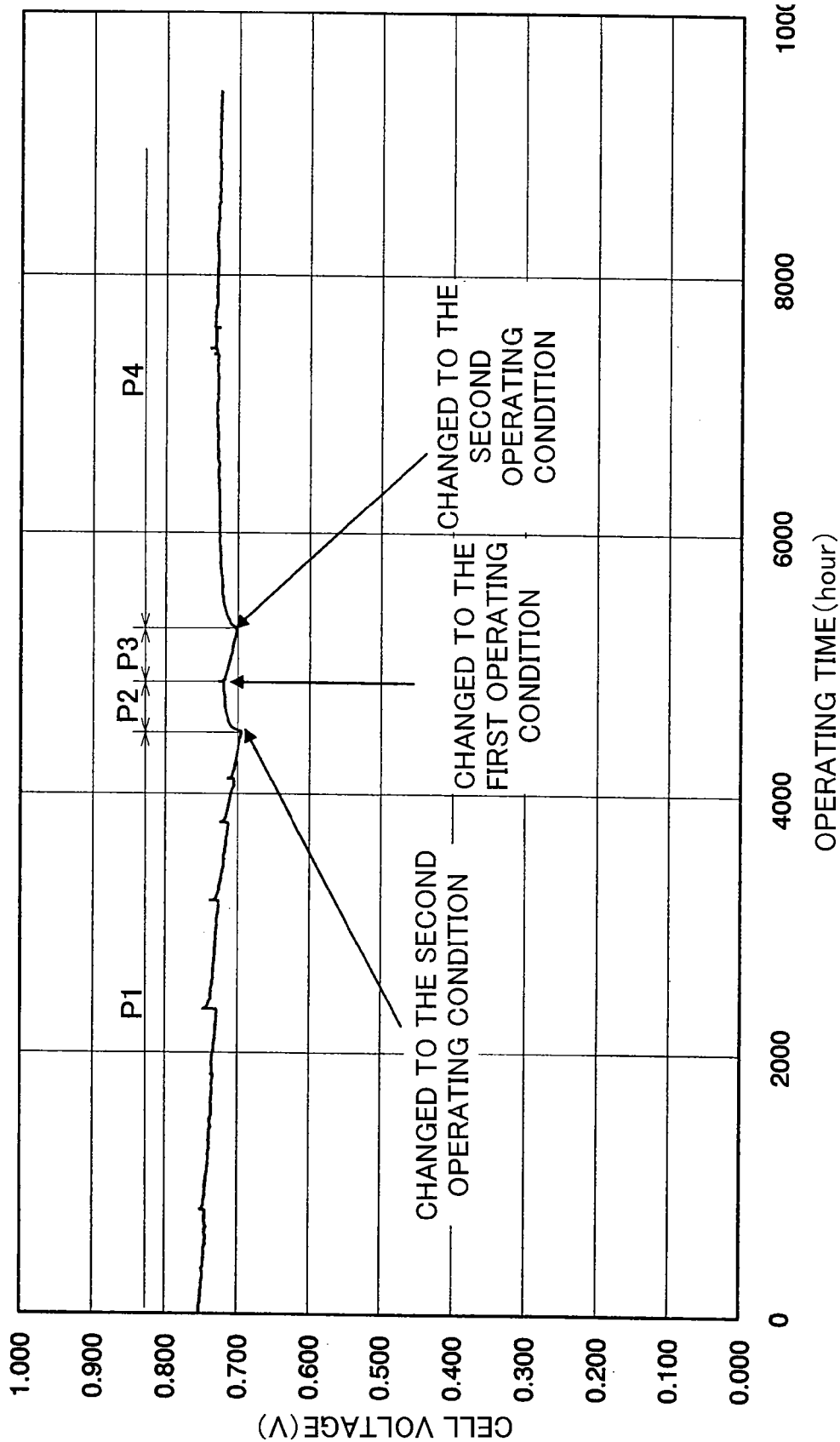
FIG. 13 is a graph showing the result of a life test conducted on the fuel cell constructed according to the first embodiment of the invention.

FIG. 13 is a graph showing the result of a life test conducted on the fuel cell. In FIG. 13, operating time is plotted on the abscissa whereas cell voltage is plotted on the ordinate.

This test was conducted on the fuel cell power generation system 100 when it is operated with the operating condition being switched between a first operating condition and a second operating condition, the system 100 being constructed according to the embodiment of the invention except that the total enthalpy heat exchangers 117, 118 are not used as the hardware. In the fuel cell power generation system 100 of this example, bubblers were used in place of the total enthalpy heat exchangers 117, 118 and these bubblers humidify and heat the fuel gas and the oxidizing gas such that they have a specified inlet corresponding dew-point temperature T1. Therefore, the inlet corresponding dew-point temperature T1 of the fuel gas and the oxidizing gas was properly controlled similarly to when the fuel cell power generation system 100 of the embodiment of the invention (shown in FIG. 1) is operated. The flow velocity of the fuel gas in the fuel gas passage 28 was controlled so as to fall within the range of from 1.8 m/s to 4.1 m/s, whereas the flow velocity of the oxidizing gas in the oxidizing gas passage 17 was controlled so as to fall within the range of from 2.8 m/s to 7.7 m/s. The pressure losses of the oxidizing gas and the fuel gas in the cell stack 1 were controlled so as to be within the range of from 2 kPa to 10 kPa.

Herein, the first operating condition is for a comparative example which does not satisfy T1≧T2+1° C. [Operating Condition 1]. More specifically, the cooling water inlet temperature T2 is 64° C., the cooling water outlet temperature T3 is 69° C., and the inlet corresponding dew-point temperature T1 of the fuel gas and the oxidizing gas is 64° C. The second operating condition is for the invention that satisfies T1≧T2+(X° C.+Y° C.×(N−1)×ΔT/8° C.) where X=1 to 2.5 and Y=0.02 to 0.027 [Operating Condition 2 (and Operating Condition 1)]. More specifically, the cooling water inlet temperature T2 is 61° C., the cooling water outlet temperature T3 is 69° C., and the inlet corresponding dew-point temperature T1 of the fuel gas and the oxidizing gas is 64° C.

In a period P1, that is, until about 4400 hours had elapsed since a start of the operation, the fuel cell power generation system 100 was operated under the first operating condition that did not satisfy [Operating Condition 1]. Then, cell voltage gradually dropped. After that, the system 100 was operated under the second operating condition that satisfied [Operating Condition 2 (and Operating Condition 1)] during a second period P2 of about 400 hours. Then, cell voltage gradually rose (recovered). After that, the system 100 was again operated under the first condition that did not satisfy [Operating Condition 1], during a third period P3 of about 400 hours. Cell voltage gradually dropped again. The system 100 was again operated under the second operating condition that satisfied [Operating Condition 2 (and Operating Condition 1)] during a fourth period P4 that lasted about 9400 hours from the start of the operation. Then, cell voltage recovered again, so that the initial cell voltage could be kept after an elapse of about 9400 hours since the start of the operation.

This has proved that while use of the conventional operating method causes the performance (cell voltage) of the fuel cell 101 to drop, shortening the service life of the fuel cell 101, use of the operating method of the invention (i.e., the operating method that satisfies [Operating Condition 1] and [Operating Condition 2]) leads to an improvement in the service life of the fuel cell 101 because the performance of the fuel cell 101 recovers and is maintained as it is after dropping once.

SECOND EMBODIMENT

Figure 14:
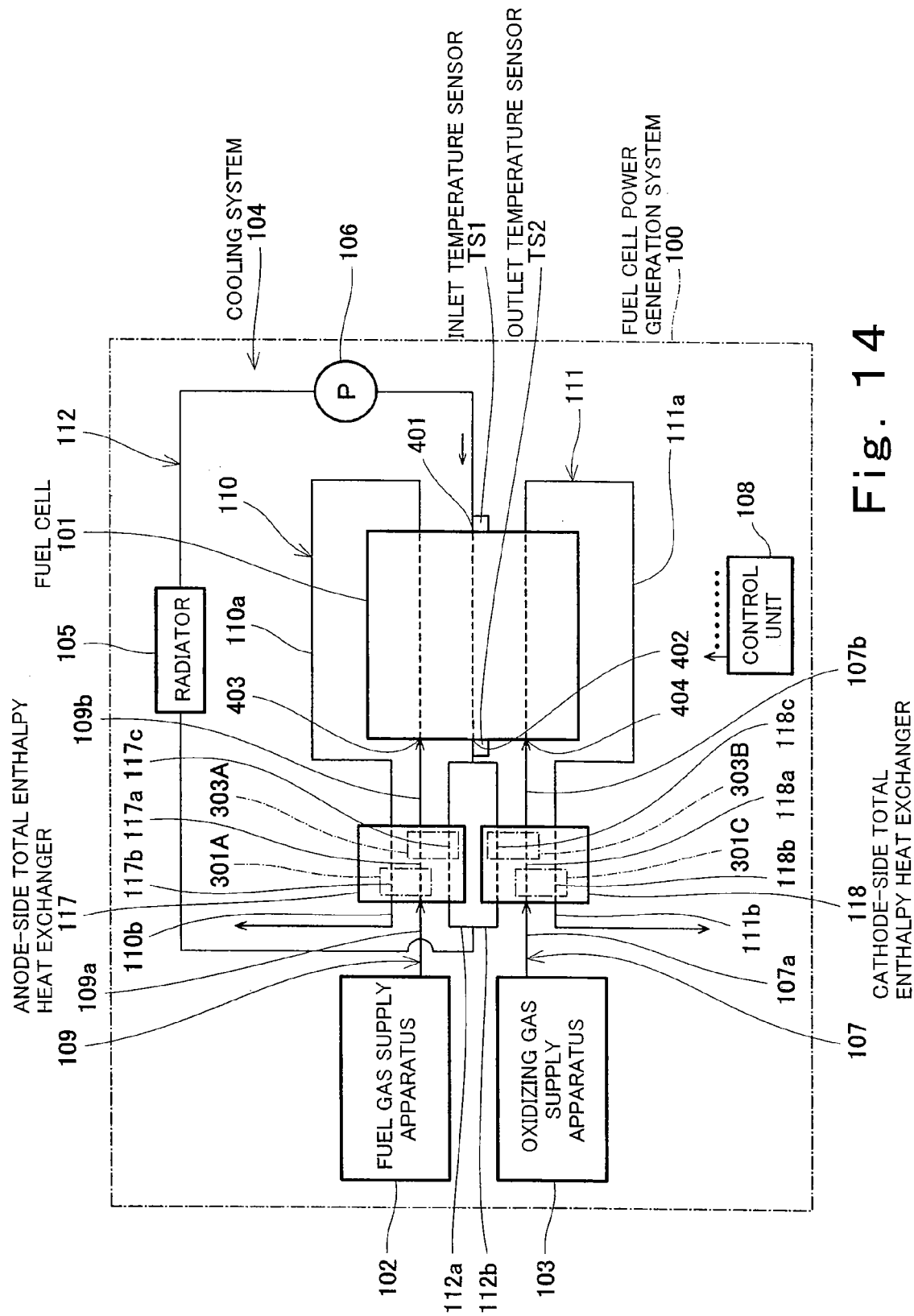
FIG. 14 is a block diagram diagrammatically showing a configuration of a polymer electrolyte fuel cell power generation system according to a second embodiment of the invention.

FIG. 14 is a block diagram diagrammatically showing a configuration of a polymer electrolyte fuel cell power generation system according to a second embodiment of the invention. In FIG. 14, the parts thereof identical to or corresponding to FIG. 1 are identified by the same reference numerals.

As shown in FIG. 14, in the anode-side total enthalpy heat exchanger 117 and cathode-side total enthalpy heat exchanger 118 of the second embodiment, total enthalpy heat is exchanged between the supply reactive gas and the discharge reactive gas and the supply reactive gas that has been subjected to the total enthalpy heat exchange then simply exchanges heat with the discharge cooling water. In the cell stack 1 shown in FIGS. 2, 3, cooling is done for every two cells. Except the above points, the second embodiment is similar to the first embodiment described earlier.

Explaining this embodiment in detail, the anode-side total enthalpy heat exchanger 117 has, in the structure shown in FIG. 1, an anode-side heat exchanger for cooling water 303A in place of the second total enthalpy heat exchange cell stack 301B. As shown in FIGS. 14, 8, 9, in the first total enthalpy heat exchange cell stack 301A, the first fluid supply manifold 204, the first fluid passage 217 and the first fluid discharge manifold 207 constitute the fuel gas passage 117a of the anode-side total enthalpy heat exchanger 117, whereas the second fluid supply manifold 205, the second fluid passage 228 and the second fluid discharge manifold 206 constitute the fuel gas passage 117b of the anode-side total enthalpy heat exchanger 117. The first fluid feed pipe 251 constitutes the portion 109a of the fuel gas supply passage 109 on the side of the fuel gas supply apparatus 102, and the first fluid discharge pipe 252 is connected to the inlet of the secondary passage of the anode-side heat exchanger for cooling water 303A. The second fluid feed pipe 253 constitutes the portion 110a of the fuel gas discharge passage 110 on the side of the fuel cell 101 and the second fluid discharge pipe 254 constitutes the portion 110b of the fuel gas discharge passage 110 on the side of the atmosphere.

The anode-side heat exchanger for cooling water 303A has a known configuration in which heat exchange is possible between a fluid flowing in the primary passage and a fluid flowing in the secondary passage, and the primary passage constitutes the cooling water passage 117c of the anode-side total enthalpy heat exchanger 117. Both ends of the primary passage are connected to the split-flow passage 112a of the cooling water circulation passage 112. The inlet of the secondary passage is connected to one end of the first fluid discharge pipe 252 the other end of which is connected to the first fluid discharge manifold 207 of the total enthalpy heat exchange cell stack 301 as described earlier. The outlet of the secondary passage is connected to the portion 109b of the fuel gas supply passage 109 on the side of the fuel cell 101. Thus, the secondary passage constitutes a part of the fuel gas passage 117a of the anode-side total enthalpy heat exchanger 117.

The anode-side total enthalpy heat exchanger 117 of the above-described configuration is formed such that, in the first total enthalpy heat exchange cell stack 301A, the supply fuel gas to be fed to the fuel cell 101 is supplied to the first fluid supply manifold 204, whereas the discharge fuel gas discharged from the fuel cell 101 is supplied to the second fluid supply manifold 205. Then, in each total enthalpy heat exchange cell 202, total enthalpy heat is exchanged between the supply fuel gas flowing in the first fluid passage 217 and the discharge fuel gas flowing in the second fluid passage 228 through the polymer electrolyte membrane 41, so that the supply fuel gas is humidified and heated by the discharge fuel gas. In the anode-side heat exchanger for cooling water 303A, heat is exchanged between the cooling water flowing in the primary passage and the supply fuel gas flowing in the secondary passage, so that the supply fuel gas after the total enthalpy heat exchange is further heated by the cooling water which rose in temperature when passing through the fuel cell 101. The supply fuel gas thus humidified and heated is supplied to the fuel cell 101.

Next, the configuration of the cathode-side total enthalpy heat exchanger 118 will be described. The cathode-side total enthalpy heat exchanger 118 of the second embodiment has, in its configuration shown in FIG. 1, a cathode-side heat exchanger for cooling water 303B in place of the fourth total enthalpy heat exchange cell stack 301D. In the third total enthalpy heat exchange cell stack 301C, the first fluid feed pipe 251 constitutes the portion 107a of the oxidizing gas supply passage 107 on the side of the oxidizing gas supply apparatus 103. The first fluid supply manifold 204, the first fluid passage 217 and the first fluid discharge manifold 207 constitute the oxidizing gas passage 118a of the cathode-side total enthalpy heat exchanger 118. The first fluid discharge pipe 252 is connected to the inlet of the secondary passage of the cathode-side heat exchanger for cooling water 303B. In addition, the second fluid feed pipe 253 constitutes the portion 111a of the oxidizing gas discharge passage 111 on the side of the fuel cell 101. The second fluid supply manifold 205, the second fluid passage 228 and the second fluid discharge manifold 206 constitute the oxidizing gas passage 118b of the cathode-side total enthalpy heat exchanger 118. The second fluid discharge pipe 254 constitutes the portion 111b of the oxidizing gas discharge passage 111 on the side of the atmosphere.

The cathode-side heat exchanger for cooling water 303B has a known configuration in which heat exchange is possible between a fluid flowing in the primary passage and a fluid flowing in the secondary passage, and the primary passage constitutes the cooling water passage 118c of the cathode-side total enthalpy heat exchanger 118. Both ends of the primary passage are connected to the split-flow passage 112b of the cooling water circulation passage 112. The inlet of the secondary passage is connected to one end of the first fluid discharge pipe 252 the other end of which is connected to the first fluid discharge manifold 207 of the total enthalpy heat exchange cell stack 301 as described earlier. The outlet of the secondary passage is connected to the portion 107b of the oxidizing gas supply passage 107 on the side of the fuel cell 101. Thus, the secondary passage constitutes a part of the oxidizing gas passage 118a of the cathode-side total enthalpy heat exchanger 118.

The cathode-side total enthalpy heat exchanger 118 of the above-described configuration is formed such that, in the third total enthalpy heat exchange cell stack 301C, the oxidizing gas to be fed to the fuel cell 101 (hereinafter referred to as "supply oxidizing gas") is supplied to the first fluid supply manifold 204, whereas the oxidizing gas discharged from the fuel cell 101 (hereinafter referred to as "discharge oxidizing gas") is supplied to the second fluid supply manifold 205. Then, in each total enthalpy heat exchange cell 202, total enthalpy heat is exchanged between the supply oxidizing gas flowing in the first fluid passage 217 and the discharge oxidizing gas flowing in the second fluid passage 228 through the polymer electrolyte membrane 41, so that the supply oxidizing gas is humidified and heated by the discharge oxidizing gas. In the cathode-side heat exchanger for cooling water 303B, heat is exchanged between the cooling water flowing in the primary passage and the supply oxidizing gas flowing in the secondary passage, so that the supply oxidizing gas after the total enthalpy heat exchange is further heated by the cooling water which rose in temperature when passing through the fuel cell 101. The supply oxidizing gas thus humidified and heated is supplied to the fuel cell 101.

The cell stack 1 shown in FIG. 3 has alternate layers of the cells 2 that have the cooling water passages 19, 29 in the cathode-side separator 10 and the anode-side separator 20 and the cells 2 that do not have the cooling water passages 19, 29 in the cathode-side separator 10 and the anode-side separator 20.

The control unit 108 controls the inlet corresponding dew-point temperature T1 of the reactive gas and the inlet temperature T2 of the cooling water so as to satisfy $T1 \geq T2+(3° C.+0.02° C. \times (N \times 1)$ [Operating Condition 10].

Thereby, all the regions of the fuel cell 101 where the power generation reaction occurs can be kept in the atmosphere of the full humidification or over-humidification. As a result, degradation of the polymer electrolyte membrane 41 is prevented so that the service life of the fuel cell 101 increases. In addition, the configurations of the anode-side heat exchanger for cooling water 303A and the cathode-side heat exchanger for cooling water 303B are simplified.

Although the fuel cell power generation system 100 has both the anode-side total enthalpy heat exchanger 117 and the cathode-side total enthalpy heat exchanger 118 in the above description, either of them may be omitted for simplification.

THIRD EMBODIMENT

Figure 15:
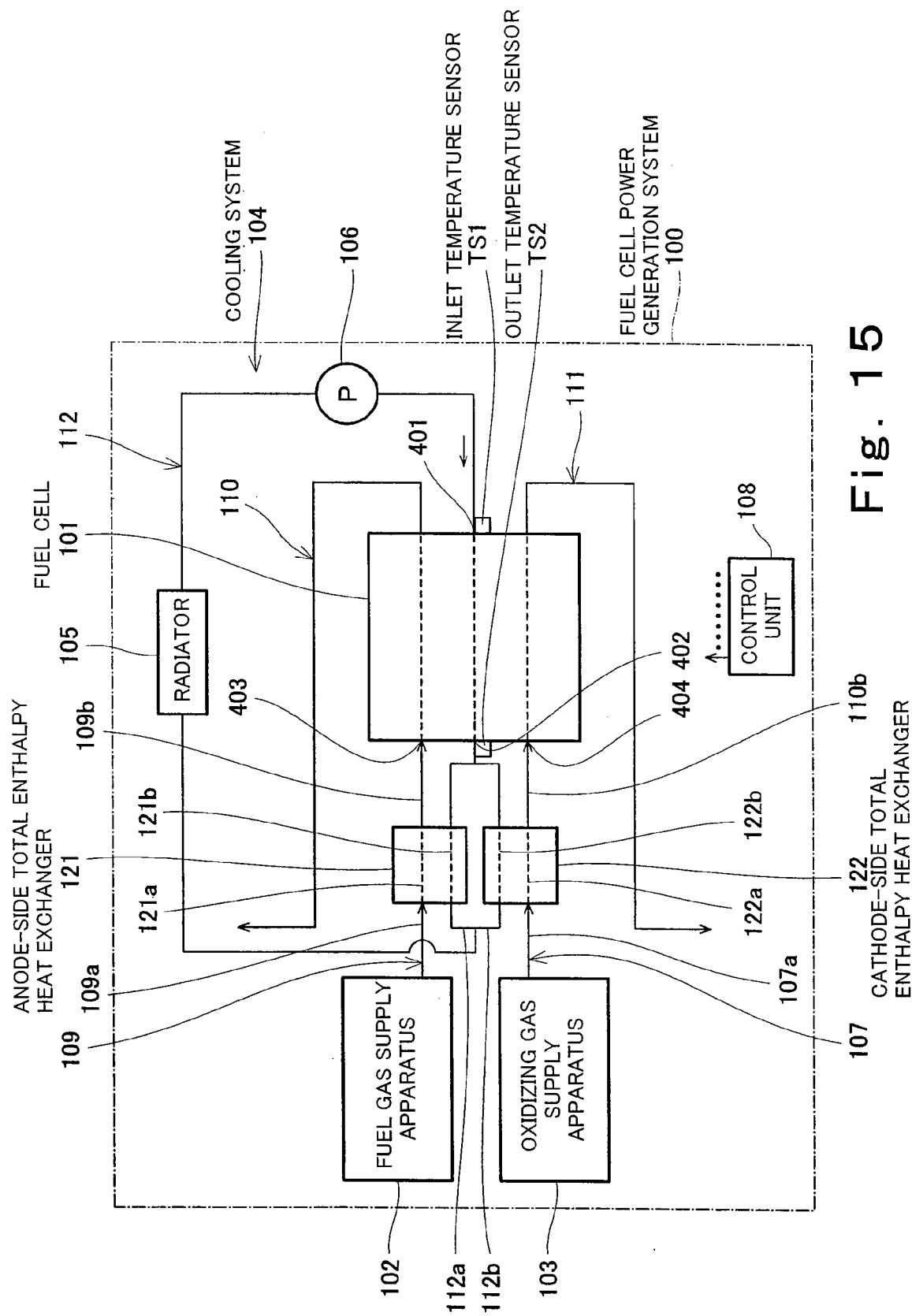
FIG. 15 is a block diagram diagrammatically showing a configuration of a polymer electrolyte fuel cell power generation system according to a third embodiment of the invention.

FIG. 15 is a block diagram diagrammatically showing a configuration of a fuel cell power generation system according to a third embodiment of the invention. In FIG. 15, the parts thereof identical to or corresponding to FIG. 1 are identified by the same reference numerals.

As shown in FIG. 15, the system of the third embodiment has an anode-side total enthalpy heat exchanger 121 and cathode-side total enthalpy heat exchanger 122 which make a total enthalpy heat exchange only between the reactive gas and the cooling water in place of the anode-side total enthalpy heat exchanger 117 and cathode-side total enthalpy heat exchanger 118 which are shown in FIG. 1 and make a total enthalpy heat exchange not only between the reactive gases but also between the reactive gas and the cooling water. Except this point, the third embodiment is similar to the first embodiment.

Concretely, the anode-side total enthalpy heat exchanger 121 has exactly the same configuration as that of the second total enthalpy heat exchange cell stack 301B of the anode-side total enthalpy heat exchanger 117 of the first embodiment. Therefore, a detailed explanation of it is skipped herein. In the anode-side total enthalpy heat exchanger 121, the supply fuel gas flowing in the supply-side fuel gas passage 121a is humidified and heated in total enthalpy heat exchange with the discharge cooling water flowing in the cooling water passage 121b.

The cathode-side total enthalpy heat exchanger 122 has exactly the same configuration as that of the fourth total enthalpy heat exchange cell stack 301D of the cathode-side total enthalpy heat exchanger 118 of the first embodiment. Therefore, a detailed explanation of it is skipped herein. In the cathode-side total enthalpy heat exchanger 122, the supply oxidizing gas flowing in the supply-side oxidizing gas passage 122a is humidified and heated in total enthalpy heat exchange with the discharge cooling water flowing in the cooling water passage 122b.

In this case, the heat exchangeable temperature difference for each of the anode-side total enthalpy heat exchanger 121 and the cathode-side total enthalpy heat exchanger 122 is about $T3-T1 \geqq 2°$ C.

The fuel cell power generation system of the third embodiment having the above configuration can achieve the same effect as that of the fuel cell power generation system of the first embodiment.

For simplification, either the anode-side total enthalpy heat exchanger 121 or the cathode-side total enthalpy heat exchanger 122 may be omitted.

FOURTH EMBODIMENT

Figure 16:
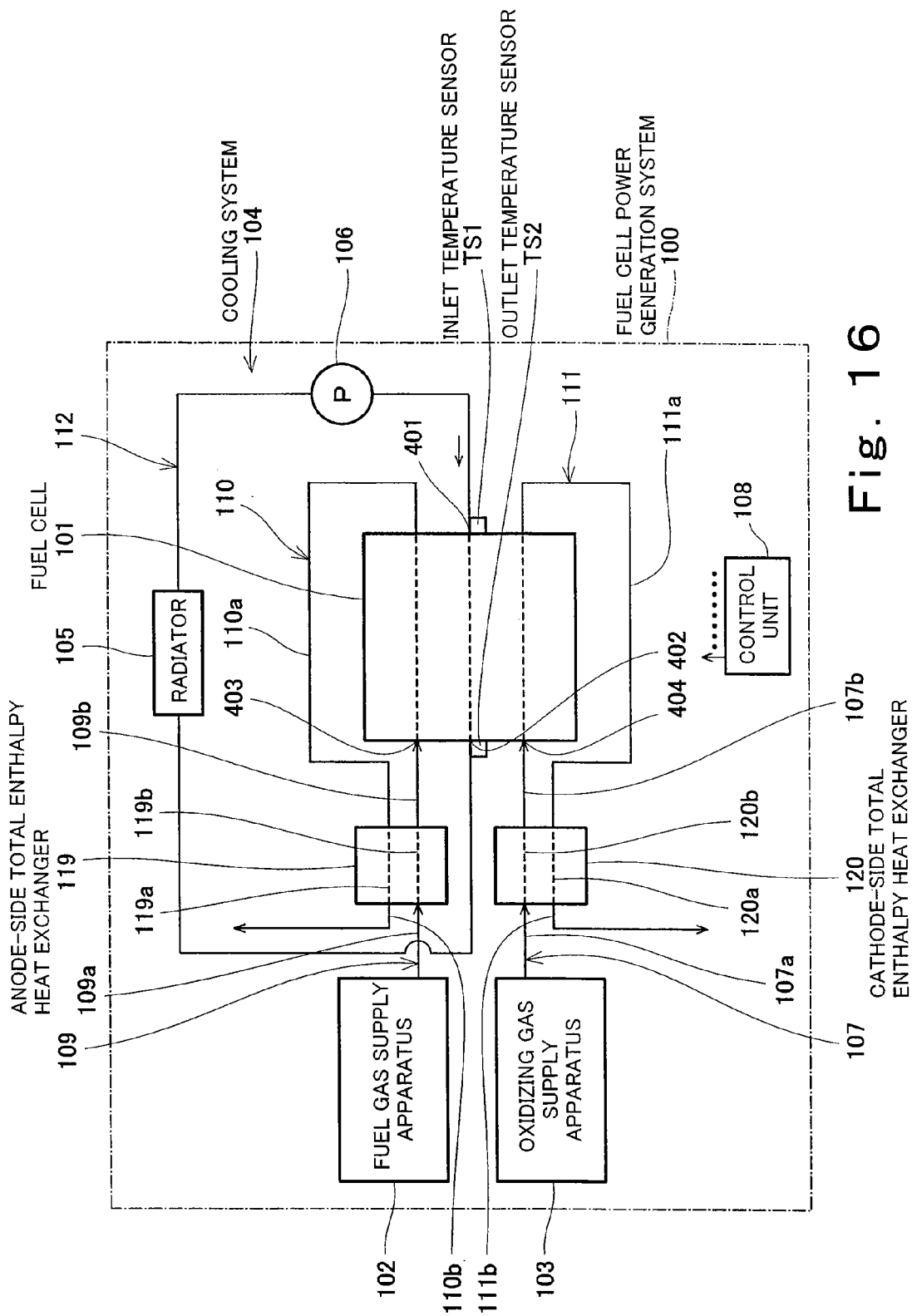
FIG. 16 is a block diagram diagrammatically showing a configuration of a polymer electrolyte fuel cell power generation system according to a fourth embodiment of the invention.

FIG. 16 is a block diagram diagrammatically showing a configuration of a fuel cell power generation system according to a fourth embodiment of the invention. In FIG. 16, the parts thereof identical to or corresponding to FIG. 1 are identified by the same reference numerals.

As shown in FIG. 16, the system of the fourth embodiment has an anode-side total enthalpy heat exchanger 119 and cathode-side total enthalpy heat exchanger 120 which make a total enthalpy heat exchange only between the reactive gas on the supply-side and the same reactive gas on the discharge side, in place of the anode-side total enthalpy heat exchanger 117 and cathode-side total enthalpy heat exchanger 118 which are shown in FIG. 1 and make a total enthalpy heat exchange not only between the reactive gases but also between the reactive gas and the cooling water. Except this point, the fourth embodiment is similar to the first embodiment.

Concretely, the anode-side total enthalpy heat exchanger 119 has exactly the same configuration as that of the first total enthalpy heat exchange cell stack 301A of the anode-side total enthalpy heat exchanger 117 of the first embodiment. Therefore, a detailed explanation of it is skipped herein. In the anode-side total enthalpy heat exchanger 119, the supply fuel gas flowing in the supply-side fuel gas passage 119a is humidified and heated in total enthalpy heat exchange with the discharge fuel gas flowing in the discharge-side fuel gas passage 119b.

The cathode-side total enthalpy heat exchanger 120 has exactly the same configuration as that of the third total enthalpy heat exchange cell stack 301C of the cathode-side total enthalpy heat exchanger 118 of the first embodiment. Therefore, a detailed explanation of it is skipped herein. In the cathode-side total enthalpy heat exchanger 122, the supply oxidizing gas flowing in the supply-side oxidizing gas passage 122a is humidified and heated in total enthalpy heat exchange with the discharge oxidizing gas flowing in the discharge oxidizing gas passage 122b.

In this case, the heat exchangeable temperature difference for each of the anode-side total enthalpy heat exchanger 119 and the cathode-side total enthalpy heat exchanger 120 is about $T3-T1 \geqq 4°$ C.

The fuel cell power generation system of the fourth embodiment having the above configuration can achieve the same effect as that of the fuel cell power generation system of the first embodiment.

For simplification, either the anode-side total enthalpy heat exchanger 119 or the cathode-side total enthalpy heat exchanger 120 may be omitted.

FIFTH EMBODIMENT

Figure 17:
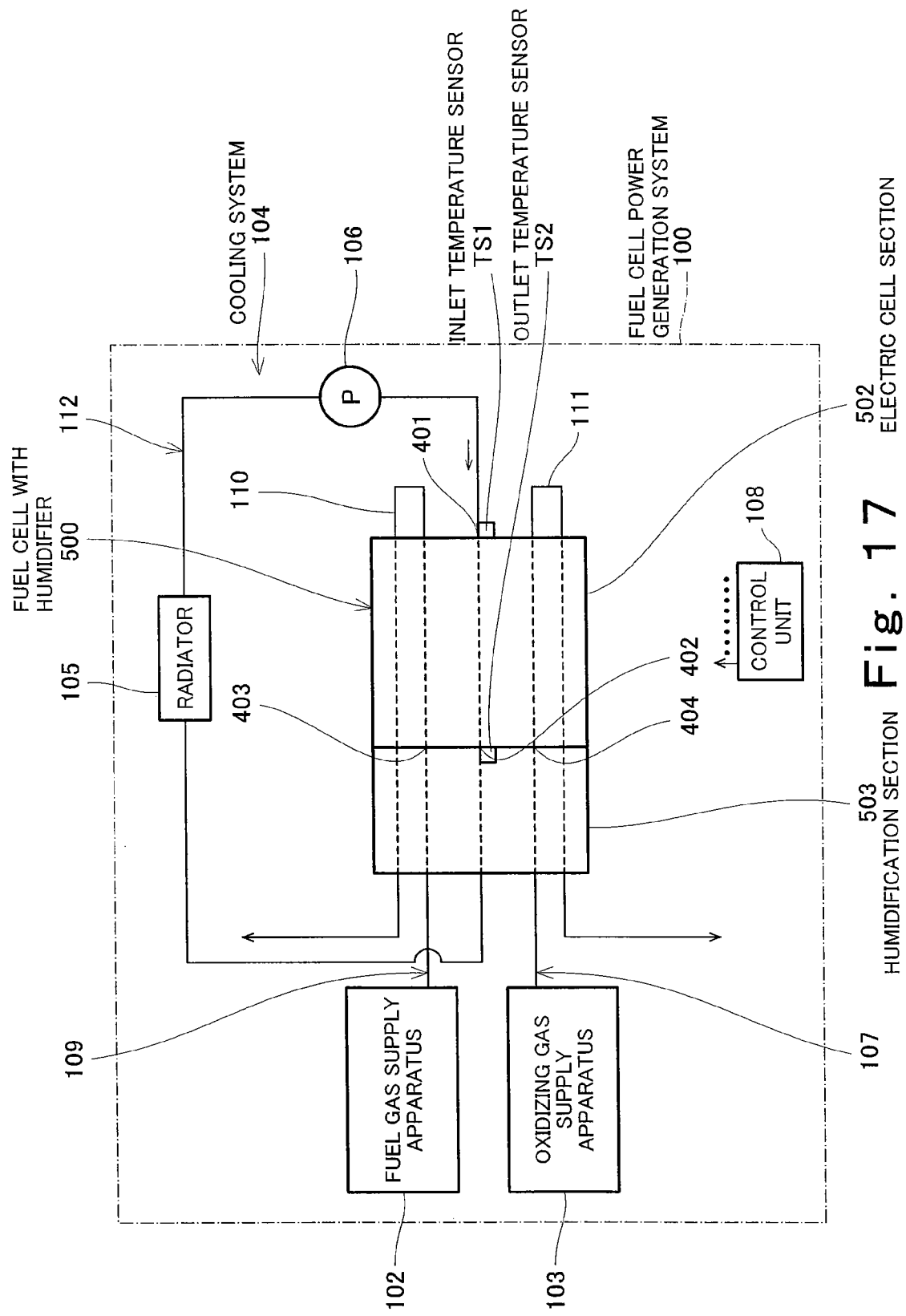
FIG. 17 is a block diagram diagrammatically showing a configuration of a polymer electrolyte fuel cell power generation system according to a fifth embodiment of the invention.
Figure 18:
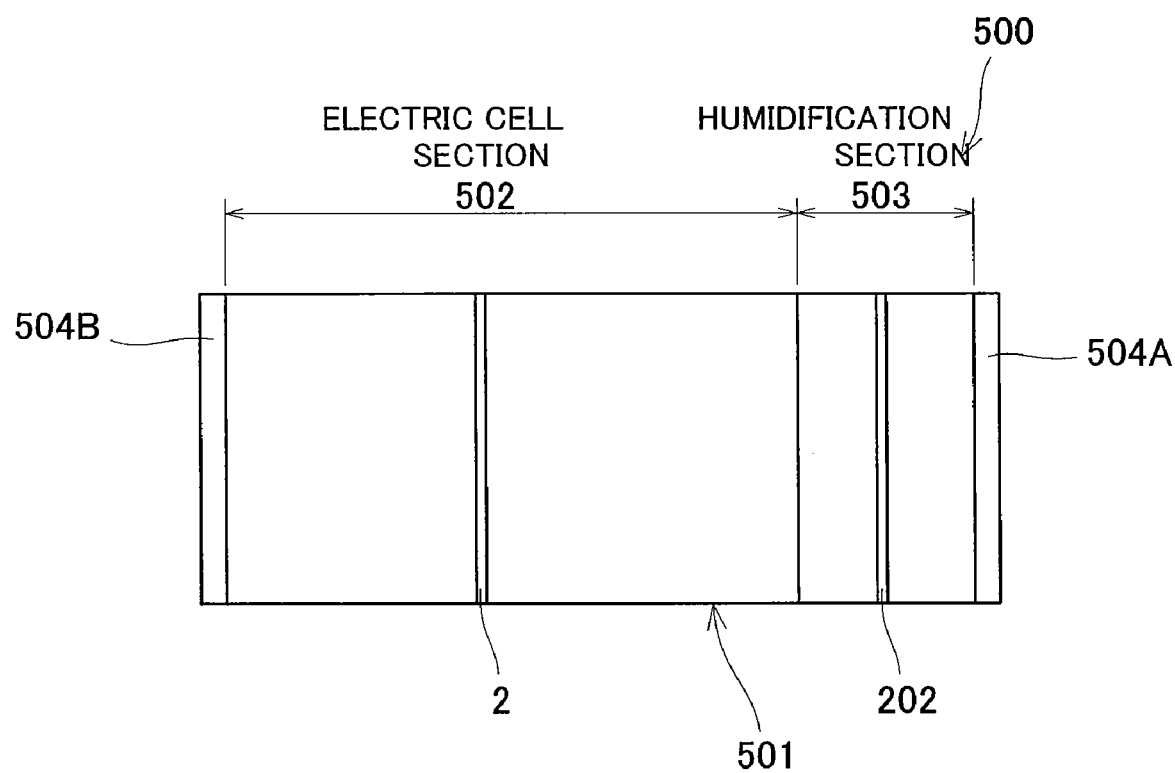
FIG. 18 is a side view diagrammatically showing a configuration of a fuel cell with humidifier for use in the fuel cell power generation system of FIG. 17.
Figure 19A:
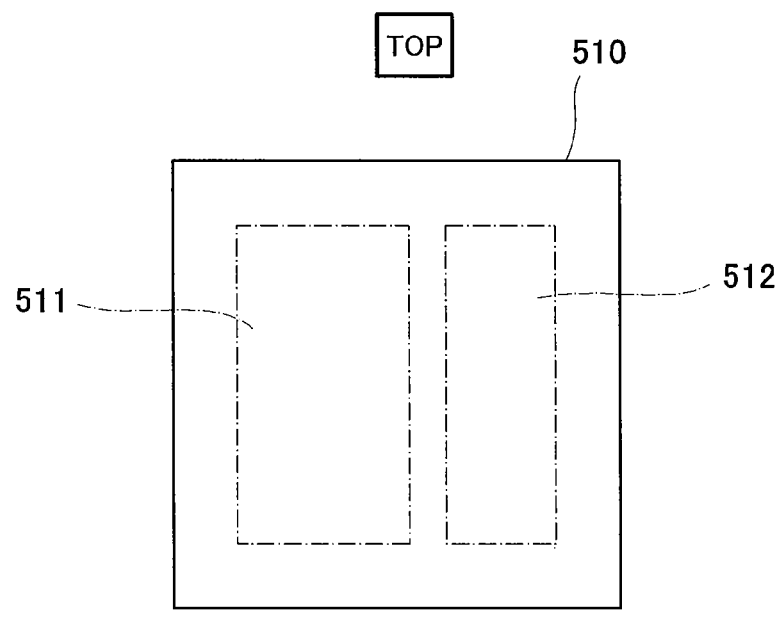
FIG. 19(a) is a front view of a first separator and FIG. 19(b) is a front view of a second separator.
Figure 19B:
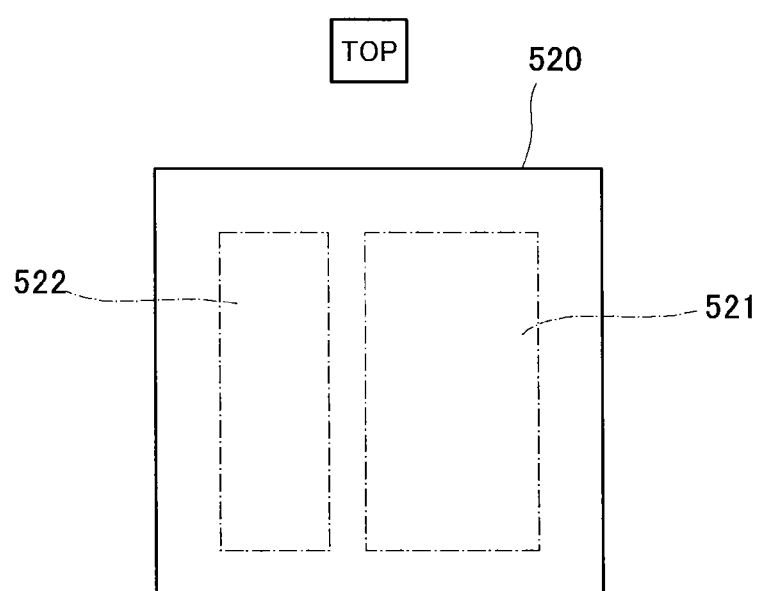

FIG. 17 is a block diagram diagrammatically showing a configuration of a fuel cell power generation system according to a fifth embodiment of the invention. FIG. 18 is a side view diagrammatically showing a configuration of a fuel cell with humidifier for use in the fuel cell power generation system of FIG. 17. FIG. 19 is views showing separators that constitute the fuel cell with humidifier of FIG. 18, wherein FIG. 19(a) is a front view of a first separator and FIG. 19(b) is a front view of a second separator. In FIG. 17, the parts thereof identical to or corresponding to FIG. 1 are identified by the same reference numerals. In FIG. 18, the parts thereof identical to or corresponding to FIGS. 2, 8 are identified by the same reference numerals.

As shown in FIG. 17, the fuel cell power generation system 100 of the fifth embodiment has a fuel cell with humidifier 500 instead of the fuel cell 101 shown in FIG. 1. The fifth embodiment is the same as the first embodiment except this point.

The fuel cell with humidifier 500 is formed such that while total enthalpy heat is being exchanged between the supply fuel gas and the discharge fuel gas, these gases are brought into simple heat exchange with the discharge cooling water, and while total enthalpy heat is being exchanged between the supply oxidizing gas and the discharge oxidizing gas, these gases are brought into simple heat exchange with the discharge cooling water.

As shown in FIG. 18, the fuel cell power generation system 100 has an electric cell section 502 having the same configuration as that of the cell laminate 201 of the fuel cell 101 shown in FIG. 1 and a humidification section 503. The humidification section 503 has similar configuration to that of the total enthalpy heat exchange cell stack 302 shown in FIG. 8. In the electric cell section 502, the cells 2 are stacked. In the humidification section 503, total enthalpy heat exchange cells 202 are stacked. A pair of end plates 504A, 504B are arranged on both ends of the laminate constituted by the cells 2 and the total enthalpy heat exchange cells 202. Thus, a fuel-cell—humidifier-integrated cell stack 501 is formed.

The total enthalpy heat exchange cell 202 of this embodiment has the same configuration as in FIG. 9 except that it has a first separator 510 shown in FIG. 19(a) and a second separator 520 shown in FIG. 19(b) in place of the first separator 210 and the second separator 220.

As shown in FIG. 19(a), a supply oxidizing gas passage 511 and a supply fuel gas passage 512 are formed on the front face of the first separator 510. In FIG. 19(a), the supply oxidizing gas passage 511 and the supply fuel gas passage 512 are represented by their respective regions where they are formed (the regions enclosed by chain line). These regions are formed so as to overlap the region where the polymer electrolyte membrane 4 of the fake MEA 243 (see FIG. 9) is exposed when viewed from the thickness-wise direction (stacking direction) of the total enthalpy heat exchange cells 202 and so as to be laterally aligned with a space therebetween. A cooling water passage (not shown) is formed on the back face of the first separator 510 similarly to the cooling water passage 19 of the cathode-side separator 10 shown in FIG. 3. At proper positions on the periphery of the first separator 510, there are formed (i) an inlet manifold aperture and an outlet manifold aperture (not shown) connected to the upstream end and downstream end, respectively, of the supply oxidizing gas passage 511; (ii) an inlet manifold aperture and an outlet manifold aperture (not shown) connected to the upstream end and downstream end, respectively, of the supply fuel gas passage 512; and (iii) an inlet manifold aperture and an outlet manifold aperture (not shown) connected to the upstream end and downstream end, respectively, of the cooling water passage.

As shown in FIG. 19(b), a discharge oxidizing gas passage 521 and the discharge fuel gas passage 522 are formed on the front face of the second separator 520. In FIG. 19(b), the discharge oxidizing gas passage 521 and the discharge fuel gas passage 522 are represented by their respective regions where they are formed (the regions enclosed by chain line). These regions are formed so as to overlap the region where the polymer electrolyte membrane 4 of the fake MEA 243 (see FIG. 9) is exposed when viewed from the thickness-wise direction of the total enthalpy heat exchange cells 202 and so as to be laterally aligned with a space therebetween. In addition, the discharge oxidizing gas passage 521 and the discharge fuel gas passage 522 are formed so as to substantially overlap the supply oxidizing gas passage 511 and supply fuel gas passage 512 of the first separator 510 when viewed from the thickness-wise direction of the total enthalpy heat exchange cells 202. A cooling water passage (not shown) is formed on the back face of the second separator 520 similarly to the cooling water passage 29 of the anode-side separator 20 shown in FIG. 3. At proper positions on the periphery of the second separator 520, there are provided (i) an inlet manifold aperture and an outlet manifold aperture (not shown) connected to the upstream end and downstream end, respectively, of the discharge oxidizing gas passage 521; (ii) an inlet manifold aperture and an outlet manifold aperture (not shown) connected to the upstream end and downstream end, respectively, of the discharge fuel gas passage 522; and (iii) an inlet manifold aperture and an outlet manifold aperture (not shown) connected to the upstream end and downstream end, respectively, of the cooling water passage.

Formed so as to pass through the humidification section 503 and the electric cell section 502 in the whole area of the fuel-cell—humidifier-integrated cell stack 501 are (1) a supply fuel gas supply manifold (not shown) for supplying the supply fuel gas; (2) a supply fuel gas discharge manifold (not shown) for discharging the supply fuel gas; (3) a discharge fuel gas supply manifold (not shown) for supplying the discharge fuel gas; (4) a discharge fuel gas discharge manifold (not shown) for discharging the discharge fuel gas; (5) a supply oxidizing gas supply manifold (not shown) for supplying the supply oxidizing gas; (6) a supply oxidizing gas discharge manifold (not shown) for discharging the supply oxidizing gas; (7) a discharge oxidizing gas supply manifold (not shown) for supplying the discharge oxidizing gas; (8) a discharge oxidizing gas discharge manifold (not shown) for discharging the discharge oxidizing gas; (9) a cooling water supply manifold (not shown) for supplying the cooling water; and (10) a cooling water discharge manifold (not shown) for discharging the cooling water. These manifolds are formed such that the manifold apertures (including the manifold apertures noted above) respectively corresponding to the manifolds are formed in the first separator 210, fake MEA 243 and second separator 220 of the humidification section 503 as well as in the cathode-side separator 10, MEA 43 and anode-side separator 20 of the electric cell section 502 so as to be communicated with one another.

The fuel cell with humidifier 500 having the above-described configuration is formed such that, in the total enthalpy heat exchange cell stack 202 of the humidification section 503, the supply fuel gas flowing in the supply fuel gas passage 512 of the first separator 510 exchanges total enthalpy heat with the discharge fuel gas flowing in the discharge fuel gas passage 522 of the second separator 520 through the polymer electrolyte membrane 4 (see FIG. 9). In addition, the supply oxidizing gas flowing in the supply oxidizing gas passage 511 of the first separator 510 exchanges total enthalpy heat with the discharge oxidizing gas flowing in the discharge oxidizing gas passage 521 of the second separator 520 through the polymer electrolyte membrane 4 (see FIG. 9). At that time, the supply fuel gas and the supply oxidizing gas are heated together with the discharge fuel gas and the discharge oxidizing gas by means of the discharge cooling water flowing in the cooling water passage of the first separator 510 and the cooling water passage of the second separator 520 (they are not shown and constitute one cooling water passage).

According to the fifth embodiment, although the heating efficiency of the discharge cooling water when heating the supply fuel gas and the supply oxidizing gas slightly decreases compared to the first embodiment because the discharge cooling water also heats the discharge fuel gas and the discharge oxidizing gas, the supply fuel gas and supply oxidizing gas can be humidified and heated by making efficient use of the moisture and exhaust heat discharged from the electric cell section 502. In addition, since the humidification section 503 and the electric cell section 502 are integrally formed, a small-sized fuel cell power generation system can be produced.

SIXTH EMBODIMENT

Figure 30:
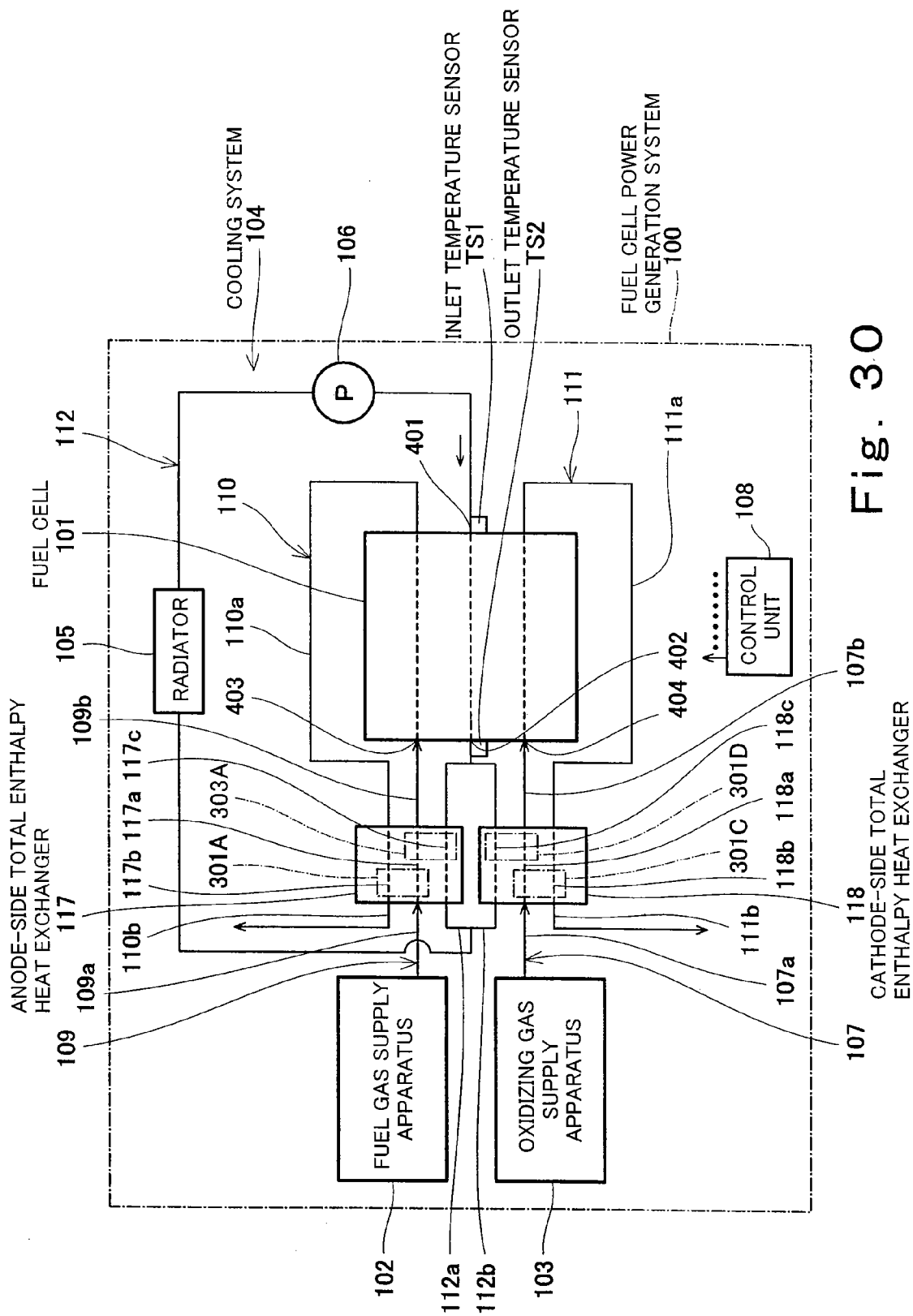
FIG. 30 is a block diagram diagrammatically showing a configuration of a polymer electrolyte fuel cell power generation system according to a sixth embodiment of the invention.

FIG. 30 is a block diagram diagrammatically showing a configuration of a polymer electrolyte fuel cell power generation system according to a sixth embodiment of the invention. In FIG. 30, the parts thereof identical to or corresponding to FIG. 1 are identified by the same reference numerals. As shown in FIG. 30, the anode-side total enthalpy heat exchanger 117 of the sixth embodiment has an anode-side heat exchanger for cooling water 303A instead of the second total enthalpy heat exchange cell stack 301B shown in the configuration of FIG. 1. The sixth embodiment is the same as the second embodiment except this point.

According to this arrangement, in the anode-side total enthalpy heat exchanger 117, the supply fuel gas exchanges total enthalpy heat with the discharge fuel gas and then, the supply fuel gas after the total enthalpy heat exchange simply exchanges heat with the discharge cooling water. In the cathode-side total enthalpy heat exchanger 118, the supply oxidizing gas exchanges total enthalpy heat with the discharge oxidizing gas and then, the supply oxidizing gas after the total enthalpy heat exchange exchanges total enthalpy heat with the discharge cooling water, like the first embodiment Where the anode-side total enthalpy heat exchanger 117 and the cathode-side total enthalpy heat exchanger 118 are designed such that total enthalpy heat is exchanged between the supply reactive gas and the discharge reactive gas and then, the supply reactive gas after the total enthalpy heat exchange is brought into simple heat exchange with the discharge cooling water like the second embodiment, the supply reactive gas which has been increased in temperature by being heated by the discharge reactive gas is further heated by the sensible heat of the discharge cooling water. Therefore, if the amount of moisture (the amount of water in a liquid state) in the supply reactive gas is insufficient, the amount of heat transferred from the discharge cooling water to the supply reactive gas, that is, heating ability decreases, compared to the case where the supply reactive gas is heated by both the sensible heat and latent heat of the discharge cooling water by a total enthalpy heat exchange between the supply reactive gas and the discharge cooling water. Herein, since the utilization factor of the fuel gas is high, the discharge fuel gas contains a large amount of dew concentration water and therefore the supply fuel gas which has exchanged total enthalpy heat with this discharge fuel gas also contains a large amount of moisture. Hence, even though heat is simply exchanged between the supply fuel gas and the discharge cooling water, the heating ability of the discharge cooling water does not drop. On the other hand, since the utilization factor of the oxidizing gas is low, the discharge oxidizing gas contains a small amount of moisture and the supply oxidizing gas, which has exchanged total enthalpy heat with the discharge oxidizing gas, also contains a small amount of moisture. However, as the supply oxidizing gas is subjected to total enthalpy heat exchange with the discharge cooling water, it is sufficiently heated by the discharge cooling water.

According to the sixth embodiment, the configuration of either the anode-side total enthalpy heat exchanger 117 or the cathode-side total enthalpy heat exchanger 118 can be simplified without causing a drop in the heating ability of the discharge cooling water with respect to the reactive gas.

EXAMPLES

Fuel cell power generation systems having the configurations shown in FIGS. 1 to 9 respectively were prepared as examples corresponding to the embodiments of the invention.

Herein, only the configurations of the fuel cell 101, anode-side total enthalpy heat exchanger 117 and cathode-side total enthalpy heat exchanger of FIGS. 1 to 9 will be concretely explained. Other parts have known configurations.

First of all, a process of preparing the anode 42B and the cathode 42A (hereinafter referred to as "electrodes") will be described.

An acetylene black powder carrying 25 wt % platinum particles having an average particle size of about 30 Å was used as a catalyst. This catalytic powder was dispersed in isopropanol, thereby producing a solution. This solution was mixed with a dispersion solution prepared by dispersing perfluorocarbon sulfonic acid in ethyl alcohol, thereby preparing a catalytic paste.

Meanwhile, a carbon cloth (produced by TORAY under the name of "TGP-H-090") having an outer size of 12 cm×12 cm and thickness of 220 μm was subjected to water-repellent finishing to form a gas diffusion layer. A mixture of a carbon black powder (produced by Denki Kagaku Kogyo K.K. under the name of "DENKA BLACKFX-35") and a PTFE aqueous dispersion (produced by Daikin under the name of "D-1") was applied to the surface of the carbon cloth where a catalytic layer would be formed and then burnt at 400° C. for 30 minutes, thereby applying a water-repellent layer. The catalytic paste was applied by screen printing to the surface of the carbon cloth to which the water-repellent layer had been applied, thereby forming a catalytic layer. The carbon cloth having the catalytic layer was used as an electrode. The amount of platinum contained in the electrode in which the catalytic layer was formed was 0.3 mg/cm$^2$ and the amount of perfluorocarbon sulfonic acid of it was 1.0 mg/cm$^2$.

Then, a perfluorocarbon sulfonic acid film (produced by DUPONT under the name of "Nafion 112" (registered trade mark)) having an outer size of 20 cm×20 cm was used as the polymer electrolyte membrane 41. A pair of electrodes was joined by hot pressing to both sides of the polymer electrolyte membrane 41 such that the catalytic layer is brought into contact with the polymer electrolyte membrane 41, thereby producing the MEA 43. Herein, a 30 μm-thick thin film made of perfluorocarbon sulfonic acid was used as the polymer electrolyte membrane.

80 wt % an artificial graphite powder having an average particle size of 100% m and 5 wt % carbon black were mixed with 15 wt % phenol resin before thermosetting, thereby preparing a compound. This compound was introduced into a die to which the shape of the separator had been transferred and then hot-pressed at 180° C. to harden the phenol resin, whereby the electrically conductive molded separators 10, 20 shown in FIGS. 4 to 7 were prepared. FIGS. 4 to 6 show the shapes of the gas passage grooves formed on the front faces (inner faces) of the separators 10, 20. The separators 10, 20 have a size of 20 cm×20 cm and thickness of 3 mm, whereas the passages 17, 28 for the reactive gas are grooved so as to have a width of 1.2 mm and depth of 0.7 mm.

Then, the oxidizing gas manifold apertures 21, 23 and the fuel gas manifold apertures 22, 24 were formed in the separators 10, 20.

FIGS. 5, 7 show the shapes of the cooling water passages 19, 29 that are formed on the back face (outer face) of the separator 19 shown in FIGS. 4, 6. The cooling water passages 19, 29 take the form of a groove having a depth of 0.7 mm.

Next, the manifold apertures for the cooling water, fuel gas, oxidizing gas were formed in the polymer electrolyte membrane 41 of the MEA 43. An O-ring-shaped fluid sealing member produced by Viton was bonded to the periphery of the electrode portion located at the center and the periphery of each of the manifold apertures 11 to 16, thereby forming a gasket.

The MEA 43 was sandwiched by the anode-side separator 20 and cathode-side separator 10 thus formed, thereby forming the cell 2. The cell laminate 201 was prepared by stacking forty cells 2. Then, a power collecting plate made from copper whose surface is gold-plated, an insulating plate made from PPS and the end plates 3A, 3B prepared by cutting SUS were placed at both ends of the cell laminate 201 and then fixed by a fastening rod. The fastening pressure applied at that time was 100 kgf/cm$^2$ per area of the electrode.

In this way, the fuel cell 101 (cell stack 1) was prepared.

The anode-side total enthalpy heat exchanger 117 and the cathode-side total enthalpy heat exchanger 118 were prepared in the production process similar to that of the fuel cell 101 described above.

The life test, which has been described in the first embodiment with reference to FIG. 13, was made, using the fuel cell power generation system 100 thus prepared in Example 1.

As a result, it was found that the service life of the fuel cell 101 could be increased as described earlier in the first embodiment.

Although the reactive gas is humidified and heated so as to have a specified corresponding dew-point temperature by the total enthalpy heat exchange with either the reactive gas or cooling water discharged from the fuel cell 101 in the first to third embodiments, this may be carried out by an ordinary humidifier such as bubblers.

Although the anode-side total enthalpy heat exchanger 117 (119, 121) is formed separately from the cathode-side total enthalpy heat exchanger 118 (120, 122) in the first to third embodiments, these heat exchangers may be integrally formed. It is also possible to make these separators integral with the cell stack 1. In this case, since the anode-side total enthalpy heat exchanger 117 (119, 121), the cathode-side total enthalpy heat exchanger 118 (120, 122) and the cell stack have the same basic configuration, they can be made integral easily.

Although the anode-side total enthalpy heat exchanger 117 (121) and the cathode-side total enthalpy heat exchanger 118 (122) are connected to the cooling water circulation passage 112 of the cooling system 104 in parallel in the first and second embodiments, the anode-side total enthalpy heat exchanger 117 (121) and the cathode-side total enthalpy heat exchanger 118 (122) may be serially connected to the cooling water circulation passage 112 of the cooling system 104.

Although the cooling water passage 19 (29) is provided for each cell or every two cells in the first to third embodiments, it may be provided for every three or more cells.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function maybe varied substantially without departing from the spirit of the invention and all modifications which come within the scope of the appended claims are reserved.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A polymer electrolyte fuel cell power generation system comprising:
   a fuel cell having (I) a cell stack formed by stacking a plurality of cells each having (i) an MBA having a polymer electrolyte membrane, an anode and a cathode, the anode being formed on one face of the polymer electrolyte membrane and the cathode being formed on the other face of the polymer electrolyte membrane, (ii) an electrically-conductive, thermally-conductive plate-like anode-side separator which is disposed on one side of the MEA such that the front face of the anode-side separator is in contact with the anode and which has a groove-like fuel gas passage in a region of the front face, the region being in contact with the anode, and (iii) an electrically-conductive, thermally-conductive plate-like cathode-side separator which is disposed on the other side of the MEA such that the front face is in contact with the cathode and which has a groove-like oxidizing gas passage in a region of the front face, the region being in contact with the cathode, (II) an inlet of fuel gas, (III) an inlet of oxidizing gas, (IV) an inlet of a cooling fluid, (V) an outlet of the cooling fluid, and (VI) a power generation region constituted by the anode and the cathode;
   a fuel gas supply apparatus for feeding the fuel gas to the inlet of the fuel gas;
   an oxidizing gas supply apparatus for feeding the oxidizing gas to the inlet of the oxidizing gas;
   a cooling fluid supply system for causing the cooling fluid to flow through the inlet of the cooling fluid, a cooling fluid path and the outlet of the cooling fluid, thereby cooling the fuel cell; and
   a control unit,
   wherein a fuel gas supply manifold, a fuel gas discharge manifold, an oxidizing gas supply manifold, an oxidizing gas discharge manifold, a cooling fluid supply manifold and a cooling fluid discharge manifold are disposed within the cell stack so as to extend in a stacking direction of the cells,
   wherein the fuel gas passage of each of the anode-side separators is formed so as to connect the fuel gas supply manifold to the fuel gas discharge manifold,
   wherein the oxidizing gas passage of each of the cathode-side separators is formed so as to connect the oxidizing gas supply manifold to the oxidizing gas discharge manifold,
   wherein a cooling fluid passage is formed for each cell or every two cells so as to connect the cooling fluid supply manifold to the cooling fluid discharge manifold in a region located on the back face of at least either the anode-side separator or the cathode-side separator, the region overlapping the power generation regions when viewed in the stacking direction of the cells
   wherein the upstream end of the fuel gas supply manifold is communicated with the inlet of the fuel gas and the downstream end of the fuel gas discharge manifold is communicated with the outside,
   wherein the upstream end of the oxidizing gas supply manifold is communicated with the inlet of the oxidizing gas and the downstream end of the oxidizing gas discharge manifold is communicated with the outside,
   wherein the upstream end of the cooling fluid supply manifold is communicated with the inlet of the cooling fluid and the downstream end of the cooling fluid discharge manifold is communicated with the outlet of the cooling fluid,
   wherein the respective most upstream portions of the fuel gas passage and the oxidizing gas passage and the most upstream portion of the cooling fluid passage are located at approximately the same position when viewed from the stacking direction of the cells, and the respective most downstream portions of the fuel gas passage and the oxidizing gas passage and the most downstream portion of the cooling fluid passage are located at approximately the same position when viewed from the stacking direction of the cells, and
   wherein when electric power is generated accompanied with heat generation by a reaction between the fuel gas and the oxidizing gas within the power generation regions of the fuel cell, and in a case where the cooling fluid passage is formed for each cell on the back face of at least either the anode-side separator or the cathode-side separator, the control unit controls a temperature (hereinafter referred to as "cooling fluid inlet temperature") of the cooling fluid at the inlet of the cooling fluid through the cooling fluid supply system so as to simultaneously satisfy a first requirement in which $T1 \geq T2 + 2°$ C. is established, a second requirement in which $T3 - T2 \leq 15°$ C. is established, and a third requirement in which $T1 \geq T2 + (X° \text{ C.} + Y° \text{ C.} \times (N-1) \times \Delta T/8° \text{ C.})$ is established, X is a value ranging from 1 to 2.5, and Y is a value ranging from 0.02 to 0.027 where T1 is a dew-point temperature (hereinafter referred to as "inlet corresponding dew-point temperature") into which the total amount of moisture of at least either the fuel gas or the oxidizing gas at the inlet thereof is converted, T2 is the cooling fluid inlet temperature, T3 is a temperature (hereinafter referred to as "cooling fluid outlet temperature") of the cooling fluid at the outlet of the cooling fluid, $\Delta T$ is $T3-T2$, and N is the number of cells stacked in the cell stack, and
   when electric power is generated accompanied with heat generation by a reaction between the fuel gas and the oxidizing gas within the power generation regions of the fuel cell, and in a case where the cooling fluid passage is formed for every two cells on the back face of at least either the anode-side separator or the cathode-side separator, the control unit controls the cooling fluid inlet temperature through the cooling fluid supply system so as to simultaneously satisfy the first requirement, the second requirement, and a fourth requirement in which T1≧T2+(X° C.+Y° C.×(N−1)×ΔT/8° C.) is established, X is a value ranging from 2.8 to 4.2, and Y is a value ranging from 0.013 to 0.033.

2. The polymer electrolyte fuel cell power generation system according to claim 1, further comprising a dew point adjusting device for adjusting the inlet corresponding dew-point temperature of at least either of the fuel gas and the oxidizing gas.

3. The polymer electrolyte fuel cell power generation system according to claim 1,
wherein the fuel gas supply manifold, the oxidizing gas supply manifold, and the cooling fluid supply manifold are formed on the periphery of one half of the cell stack when viewed in the stacking direction of the cells, whereas the fuel gas discharge manifold, the oxidizing gas discharge manifold, and the cooling fluid discharge manifold are formed on the periphery of the other half of the cell stack when viewed in the stacking direction of the cells, and
wherein said requirement for the gas flowing in one of the fuel gas supply manifold and the oxidizing gas supply manifold, which is closer to the cooling fluid supply manifold, is such that X is a value ranging from 1.0 to 1.5 and Y is a value ranging from 0.02 to 0.027, whereas said requirement for the gas flowing in the other one of the fuel gas supply manifold and the oxidizing gas supply manifold, which is farther from the cooling fluid supply manifold, is such that X is a value ranging from 2.0 to 2.5 and Y is a value ranging from 0.02 to 0.023.

4. The polymer electrolyte fuel cell power generation system according to claim 1,
wherein the fuel gas supply manifold, the oxidizing gas supply manifold, and the cooling fluid supply manifold are formed on the periphery of one half of the cell stack when viewed in the stacking direction of the cells, whereas the fuel gas discharge manifold, the oxidizing gas discharge manifold, and the cooling fluid discharge manifold are formed on the periphery of the other half of the cell stack when viewed in the stacking direction of the cells, and
wherein said requirement for the gas flowing in one of the fuel gas supply manifold and the oxidizing gas supply manifold, which is closer to the cooling fluid supply manifold, is such that X is a value ranging from 2.8 to 3.3 and Y is a value ranging from 0.013 to 0.033, whereas said requirement for the gas flowing in the other one of the fuel gas supply manifold and the oxidizing gas supply manifold, which is farther from the cooling fluid supply manifold, is such that X is a value ranging from 3.7 to 4.2 and Y is a value ranging from 0.013 to 0.030.

5. The polymer electrolyte fuel cell power generation system according to claim 1,
wherein the control unit controls the cooling fluid outlet temperature during the power generation to satisfy T3−T2≦10° C.

6. The polymer electrolyte fuel cell power generation system according to claim 1, the system further comprising:
a dew-point adjusting device for making a total enthalpy heat exchange at least between the fuel gas supplied to the fuel cell (hereinafter referred to as "supply fuel gas") and the fuel gas discharged from the fuel cell (hereinafter referred to as "discharge fuel gas") or between the oxidizing gas supplied to the fuel cell (hereinafter referred to as "supply oxidizing gas") and the oxidizing gas discharged from the fuel cell (hereinafter referred to as "discharge oxidizing gas"), so that the inlet corresponding dew-point temperature of the gas that has been subjected to the total enthalpy heat exchange is adjusted.

7. The polymer electrolyte fuel cell power generation system according to claim 6,
wherein the inlet corresponding dew-point temperature of at least either the fuel gas or the oxidizing gas, the cooling fluid inlet temperature and the outlet of the cooling fluid temperature have values that satisfy T2≦T1≦T3 during the power generation.

8. The polymer electrolyte fuel cell power generation system according to claim 7,
wherein the dew-point adjusting device is configured so as to satisfy T3−T1≧1° C. during the power generation.

9. The polymer electrolyte fuel cell power generation system according to claim 7,
wherein the dew-point adjusting device is configured so as to satisfy T3−T1≧2° C. during the power generation.

10. The polymer electrolyte fuel cell power generation system according to claim 8,
wherein the dew-point adjusting device makes a total enthalpy heat exchange at least between the supply fuel gas and the discharge fuel gas or between the supply oxidizing gas and the discharge oxidizing gas and then makes a total enthalpy heat exchange between the gas that has been subjected to the total enthalpy heat exchange and the cooling fluid discharged from the fuel cell to supply the fuel cell with the gas that has exchanged total enthalpy heat with the cooling fluid.

11. The polymer electrolyte fuel cell power generation system according to claim 7,
wherein the dew-point adjusting device is configured so as to satisfy T3−T1≧4° C. during the power generation.

12. The polymer electrolyte fuel cell power generation system according to claim 7,
wherein the dew-point adjusting device makes a total enthalpy heat exchange at least between the supply fuel gas and the discharge fuel gas or between the supply oxidizing gas and the discharge oxidizing gas and then makes simply a heat exchange between the gas that has been subjected to the total enthalpy heat exchange and the cooling fluid discharged from the fuel cell to supply the fuel cell with the gas that has exchanged heat with the cooling fluid.

13. The polymer electrolyte fuel cell power generation system according to claim 11,
wherein the dew-point adjusting device makes a total enthalpy heat exchange at least between the supply fuel gas and the cooling fluid discharged from the fuel cell or between the supply oxidizing gas and the cooling fluid discharged from the fuel cell to supply the fuel cell with the gas that has been subjected to the total enthalpy heat exchange.

14. The polymer electrolyte fuel cell power generation system according to claim 1,
wherein the cooling fluid supply system comprises:
a cooling fluid circulation passage connected to both ends of the cooling fluid path of the fuel cell so as to form a closed passage;

a cooling fluid circulator for causing the cooling fluid to circulate through the closed passage, the cooling fluid circulator being provided within the cooling fluid circulation passage; and a radiator placed between the outlet of the cooling fluid of the fuel cell and the cooling fluid circulator within the cooling fluid circulation passage, for emitting the heat of the cooling fluid.

15. The polymer electrolyte fuel cell power generation system according to claim 1, wherein the control unit controls, during the power generation, the cooling fluid outlet temperature so as to satisfy T4≧T3 where T4 is a dew-point temperature (hereinafter referred to as "outlet corresponding dew-point temperature) into which the total amount of moisture of at least either the fuel gas or oxidizing gas at its outlet of the fuel cell is converted.

16. The polymer electrolyte fuel cell power generation system according to claim 5, wherein the control unit controls, during the power generation, the cooling fluid inlet temperature so as to satisfy 50° C.≧T2≧70° C.

17. The polymer electrolyte fuel cell power generation system according to claim 1, wherein the control unit controls, during the power generation, the cooling fluid outlet temperature so as to satisfy 5° C.≦T3−T2.

18. The polymer electrolyte fuel cell power generation system according to claim 1, wherein the control unit controls, during the power generation, the flow of the cooling fluid through the cooling fluid supply system such that the power generation regions are entirely over-humidified or full humidified.

19. The polymer electrolyte fuel cell power generation system according to claim 1, wherein the control unit controls, during the power generation, the fuel gas supply apparatus such that the fuel gas is supplied with its flow velocity at an outlet of the fuel gas passage being not less than 1.8 m/s nor more than 4.1 m/s.

20. The polymer electrolyte fuel cell power generation system according to claim 19, wherein the control unit controls, during the power generation, the supply of the fuel gas such that the pressure loss of the fuel gas in the fuel gas path is not less than 2 kPa nor more than 10 kPa.

21. The polymer electrolyte fuel cell power generation system according to claim 19, wherein the fuel gas passage is composed of a plurality of passage grooves and the equivalent diameter of the passage grooves is not less than 0.78 mm nor more than 1.30 mm.

22. The polymer electrolyte fuel cell power generation system according to claim 1, wherein the control unit controls, during the power generation, the oxidizing gas supply apparatus such that the oxidizing gas is supplied with its flow velocity at an outlet of the oxidizing gas passage being not less than 2.8 m/s nor more than 7.7 m/s.

23. The polymer electrolyte fuel cell power generation system according to claim 22, wherein the control unit controls, during the power generation, the supply of the oxidizing gas such that the pressure loss of the oxidizing gas in the oxidizing gas path is not less than 2 kPa nor more than 10 kPa.

24. The polymer electrolyte fuel cell power generation system according to claim 22, wherein the oxidizing gas passage is composed of a plurality of passage grooves and the equivalent diameter of the passage grooves is not less than 0.78 mm nor more than 1.30 mm.

25. The polymer electrolyte fuel cell power generation system according to claim 1, wherein the fuel gas passage, the oxidizing gas passage and the cooling fluid passage are formed so that the fuel gas, the oxidizing gas and the cooling fluid flow without defying gravity.

* * * * *

UNITED STATES PATENT AND TRADEMARK OFFICE
CERTIFICATE OF CORRECTION

PATENT NO. : 7,611,786 B2  Page 1 of 1
APPLICATION NO. : 11/320126
DATED : November 3, 2009
INVENTOR(S) : Kazuhito Hatoh et al.

It is certified that error appears in the above-identified patent and that said Letters Patent is hereby corrected as shown below:

On page 2 of the patent, the second instance of "U.S. PATENT DOCUMENTS" should read
-- FOREIGN PATENT DOCUMENTS -- and the following references should be listed thereunder:

| | | |
|---|---|---|
| JP | 06-096789 | 4/1994 |
| JP | 06-132038 | 5/1994 |
| JP | 2000-113899 | 4/2000 |
| JP | 2000-251913 | 9/2000 |
| JP | 2002-343395 | 11/2002 |
| JP | 2003-017105 | 1/2003 |
| JP | 2004-031073 | 1/2004 |
| JP | 2004-185938 | 7/2004 |
| JP | 3596332 | 9/2004 |
| WO | 00/65678 | 11/2000 |
| WO | 02/47190 | 6/2002 |

Signed and Sealed this

Thirteenth Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,611,786 B2
APPLICATION NO. : 11/320126
DATED : November 3, 2009
INVENTOR(S) : Hatoh et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 979 days.

Signed and Sealed this

Twelfth Day of October, 2010

David J. Kappos
*Director of the United States Patent and Trademark Office*